(12) United States Patent
Yacobi

(10) Patent No.: US 8,996,863 B2
(45) Date of Patent: *Mar. 31, 2015

(54) ATTRIBUTE-BASED ACCESS-CONTROLLED DATA-STORAGE SYSTEM

(71) Applicant: Yacov Yacobi, Mercer Island, WA (US)

(72) Inventor: Yacov Yacobi, Mercer Island, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/159,377

(22) Filed: Jan. 20, 2014

(65) Prior Publication Data

US 2014/0201520 A1 Jul. 17, 2014

Related U.S. Application Data

(63) Continuation-in-part of application No. 13/282,265, filed on Oct. 26, 2011, now Pat. No. 8,635,464.

(60) Provisional application No. 61/419,515, filed on Dec. 3, 2010, provisional application No. 61/498,367, filed on Jun. 17, 2011, provisional application No. 61/528,648, filed on Aug. 29, 2011.

(51) Int. Cl.
*H04L 29/06* (2006.01)
*G06F 21/00* (2013.01)
*H04L 9/08* (2006.01)
*H04L 9/30* (2006.01)

(52) U.S. Cl.
CPC ............ *H04L 63/045* (2013.01); *H04L 63/064* (2013.01); *G06F 21/00* (2013.01); *H04L 9/0836* (2013.01); *H04L 9/088* (2013.01); *H04L 9/3073* (2013.01)

USPC .......................................... 713/158; 380/277

(58) Field of Classification Search
CPC . G06F 12/1408; G06F 21/6227; G06F 12/14; G06F 21/72; G06F 21/62
USPC ................................................... 713/190–174
See application file for complete search history.

(56) References Cited

U.S. PATENT DOCUMENTS

| | | | |
|---|---|---|---|
| 2008/0022361 A1* | 1/2008 | Bharadwaj et al. | 726/2 |
| 2008/0263357 A1 | 10/2008 | Boyen | |
| 2009/0080658 A1* | 3/2009 | Waters et al. | 380/277 |
| 2010/0246827 A1* | 9/2010 | Lauter et al. | 380/278 |

OTHER PUBLICATIONS

Crampton, Jason, "Cryptographic Enforcement of role-Based Access Control", FAST, Oct. 2010, pp. 191-205.

* cited by examiner

*Primary Examiner* — Fikremariam A Yalew
(74) *Attorney, Agent, or Firm* — Olympic Patent Works PLLC

(57) ABSTRACT

The current application is directed to computationally efficient attribute-based access control that can be used to secure access to stored information in a variety of different types of computational systems. Many of the currently disclosed computationally efficient implementations of attribute-based access control employ hybrid encryption methodologies in which both an attribute-based encryption or a similar, newly-disclosed policy-encryption method as well as a hierarchical-key-derivation method are used to encrypt payload keys that are employed, in turn, to encrypt data that is stored into, and retrieved from, various different types of computational data-storage systems.

28 Claims, 43 Drawing Sheets public/private key encryption select two distinct prime numbers $p$ and $q$
$n = pq$
$\varphi(n)=(p-1)(q-1)$
select $e$: $1 < e < \varphi(n)$ and $gcd\,(e,\varphi(n)) = 1$
compute $d$: $(d*e) \bmod \varphi(n) = 1$
$k_e=(e,n)$     (public key)
$k_d=(d,n,p,q)$     (private key)

to encrypt $M$
    $M \rightarrow m$: $o < m < n$
    $C \leftarrow (OAEP(m))^e (\bmod\ n)$
to decrypt $C$
    $m = (OAEP^{-1}(c))^d (\bmod\ n)$
    $M \leftarrow m$ digital signature to sign:
    $m$Hash = hash($M$)
    EM=transform ($m$Hash)
    signature = EM$^d$ mod $n$ = DEC(EM, $k_d$)
to verify:
    $m$Hash = hash($M$)
    EM' = signature$^e$ (mod $n$) = ENC (signature, $k_e$)
    $m$Hash' = transform$^{-1}$(EM')
    when $m$Hash = $m$Hash', signature is verified symmetric-key encryption
Symmetric key $k$
$C \leftarrow ENC(M, k)$
$M \rightarrow DEC(C, k)$

FIG. 6

For each data-object class, in each node of HKD graph corresponding to write policy:
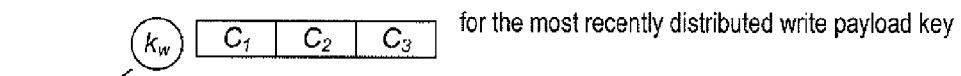 for the most recently distributed write payload key
1802
while in each node of HKD graph corresponding to read policy:
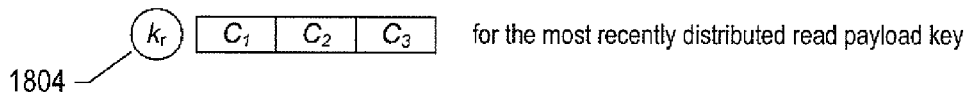 for the most recently distributed read payload key
1804
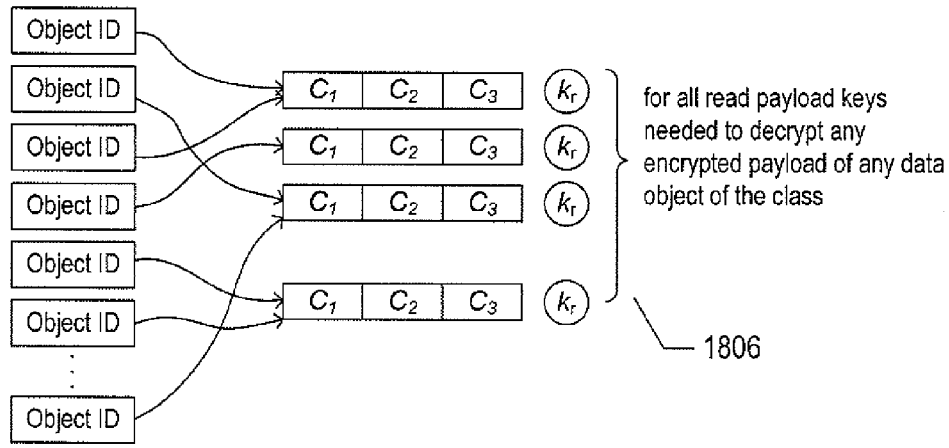
for all read payload keys needed to decrypt any encrypted payload of any data object of the class
1806
FIG. 18

ATTRIBUTE-BASED ACCESS-CONTROLLED DATA-STORAGE SYSTEM

CROSS-REFERENCE TO RELATED APPLICATIONS

This application is a continuation-in-part of U.S. Pat. No. 8,635,464, issued Jan. 21, 2014, which claims the benefit of Provisional Application No. 61/419,515, filed Dec. 2, 2010; Provisional Application No. 61/498,367, filed Jun. 17, 2011; and Provisional Application No. 61/528,648, filed Aug. 29, 2011.

TECHNICAL FIELD

The present application is directed to the areas of cryptography, data storage, and access control to stored data and, in particular, to a cryptography-based access-controlled data-storage system that allows a data-accessing entity to access those data objects associated with access policies satisfied by the accessing entity's attributes.

BACKGROUND

Both cryptography and access-control subsystems that allow access of data objects and other computational resources only to authorized accessing entities are mature fields of research and development that have produced a plethora of useful techniques, methods, and systems widely employed in computational systems, including communications systems, database management systems, most general-purpose computer systems, mobile phones, information-display devices, and in many other types of systems, devices, and fields of human endeavor.

Cryptography provides various types of encryption/decryption technologies that form a computational foundation for secure information exchange. Many types of computational encryption and decryption methods have been developed, including public/private-key-pair-based encryption/decryption methods, symmetrical encryption/decryption methods, and many other types of encryption and decryption technologies. Encryption methods transform a digitally encoded sequence of symbols, including text and numerical data, into a corresponding encrypted symbol sequence that cannot be straightforwardly read or interpreted, in general, but that contains the same information that is contained in the original symbol sequence that was encrypted to produce the encrypted symbol sequence. A party possessing a decryption key or other decryption-facilitating information can carry out an inverse transformation to regenerate the original symbol sequence.

The term "attribute" refers to information-containing symbol sequences, numbers, data structures, or other digitally encoded information that can be associated with real-world or computational entities. Often, the collection of attributes associated with an entity defines or describes the entity within some real-world or computational context. As one example, an employee within a corporation may be described by a collection of attributes, such as "works for the personnel department," "salaried employee," "female," "electrical engineer," and other such attributes. Access-control subsystems have been devised to control access by users to stored data objects, system-provided services, and other computational resources based on the attributes associated with a person or computational entity seeking to access the access-controlled computational resources. Access-control subsystems are found in many different computational systems and environments. Attribute-based access control provides numerous computational and design advantages. As one example, attributes provide a medium of access-rights exchange similar to the role played by currency in financial transactions, which allows a simple and clean separation between the many different types of activities that generate value and the many different types of activities that consume value.

In certain types of data-storage and data-retrieval systems, attribute-based encryption is employed to securely store information in encrypted form and to allow only parties with attributes that satisfy access policies associated with the stored data to access the stored data. While these attribute-based-encryption systems provide useful functionality, current implementations are associated with relatively onerous computational overheads, as a result of which attribute-based encryption is currently unsuitable for many types of high-volume and high-transaction-rate data-storage applications. Researchers and developers, recognizing advantages provided by attribute-based encryption, seek new technologies that provide desired functionality with acceptable computational overhead.

SUMMARY

The current application is directed to computationally efficient attribute-based access control that can be used to secure access to stored information in a variety of different types of computational systems. Many of the currently disclosed computationally efficient implementations of attribute-based access control employ hybrid encryption methodologies in which both an attribute-based encryption or a similar, newly-disclosed policy-encryption method as well as a hierarchical-key-derivation method are used to encrypt payload keys that are employed, in turn, to encrypt data that is stored into, and retrieved from, various different types of computational data-storage systems.

BRIEF DESCRIPTION OF THE DRAWINGS

FIG. 6 summarizes three different encryption-based techniques.

FIG. 18 illustrates the information, related to payload-key encryption, stored within an HD that represents access policies for one or more data object classes in an attribute-based access-controlled data-storage system to which the current application is directed.

DETAILED DESCRIPTION OF THE INVENTION

The current application is directed to computer-based systems that securely store information in data-storage subsystems. Each stored data object is associated with two access policies, a read policy and a write policy, which each specify one or more sets of attributes. When a user has acquired all of the attributes in one or more of a set of attributes specified by an access policy, the user is allowed to access the data object. Read access policies control read access to classes of data objects and write access policies control write access to classes of data objects. In the attribute-based access-controlled data-storage systems ("ABACDSs") to which the current application is directed, the data-storage system is not provided with unencrypted data and, therefore, the information stored by the data-storage system is not accessible to the data-storage system. Furthermore, the data store cannot forge data and store it within a data object, because a reader can detect such forged data. An additional feature of the currently described ABACDSs is that, because hybrid encryption/decryption methods are employed, attribute-associated encryption/decryption keys can be changed frequently without re-encrypting the encrypted data stored within data objects that are, in turn, stored within one or more data-store components.

Example systems to which the current application is directed generally define three different classes of users: owners of data objects, users who access data objects in order to write information into the data objects, and users who access data objects in order to read information stored within the data objects. Owners, readers, and writers generally obtain attributes and certificates directly or indirectly from third-party attribute and certificate issuers. Owners define the read policies and write policies and carry out transactions with the data-storage system for allocating data objects within the data-storage system. The owner and data-storage system together provide access-controlled data-object storage on behalf of data-accessing users, including readers and writers.

Figure 1:
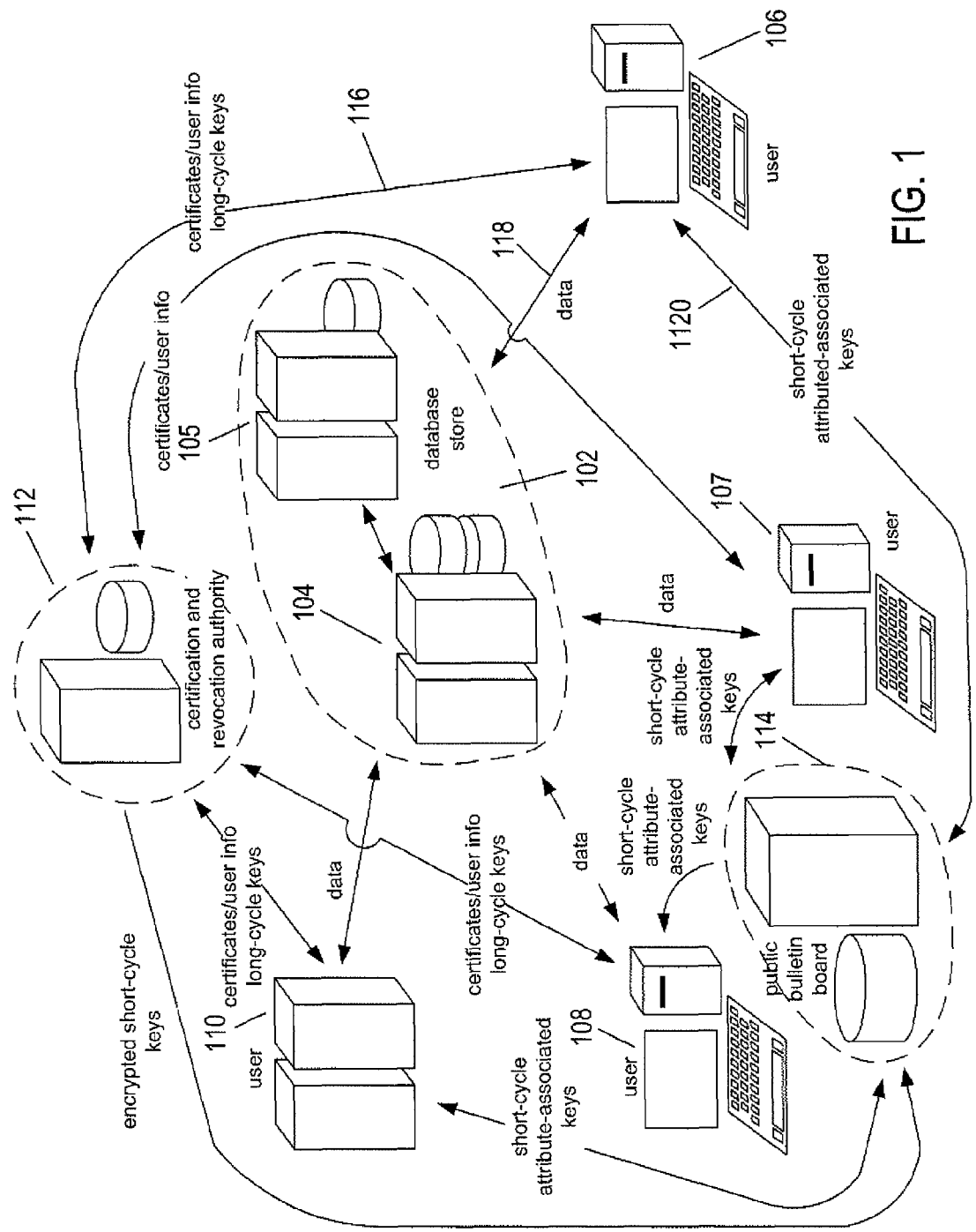
FIG. 1 illustrates various interacting computational systems within one implementation of an attribute-based access-controlled data-storage system to which the current application is directed.

FIG. 1 illustrates various interacting computational systems within one implementation of an attribute-based access-controlled data-storage system to which the current application is directed. It should be noted, at the onset, that the ABACDS is a physical system of interacting computer systems and computational devices. These computer systems and computational devices include processors, electronic memories, various types of mass-storage subsystems and components, transceivers and networking subsystems, power systems, peripheral microprocessors, controllers, and the many other well-known components of computational devices and systems. The attribute-based access-control systems to which the current application is directed are clearly not abstractions, disembodied ideas, symbol strings, or mathematical formulas. They are physical computing, data-storing, and communicating electromechanical or electro-optical-mechanical components.

A data-store component 102 may consist of one or more computer systems. In FIG. 1, the data-store component is illustrated as comprising a distributed computer system that includes two large scale computer systems 104-105 with large attached mass-storage subsystems. However, the data-store component may alternatively be a single server, a special-purpose computational device, or a much larger distributed system of networked computers. The data-store component allocates storage space for data objects on behalf of owners who contract with the data-store component for storage of data objects that can be accessed by reader users and writer users. While users, readers, writers, and the data store may be directly or indirectly associated with human users and data-store managers, these terms are generally directed, in the current discussion, to computational systems and devices directly or indirectly employed by human users and data-store managers. Furthermore, the categories of owner, reader, writer, data store, and other computational entities, discussed below, are not necessarily mutually exclusive. A computer system that hosts a data store may, for example, also host one or more owners, readers, and/or writers. It should also be noted that a given ABACDS system, to which the current application is directed, may include many owner systems and data-store systems, and often provides data storage to very large numbers of users. However, an ABACDS may also include only a single computer system that hosts both a data store and an owner. The data-store component may be a database-management system, file system, content-distribution system, or any of many other types of systems that store data and provide access to the stored data to any of various categories of user systems.

As mentioned above, the data-store component 102 allocates space for, and stores, data objects, but the data-store component cannot directly access the data stored within data objects. Data entering and leaving the data store is encrypted and can only be decrypted by those holding the secret keys, or credentials, corresponding to suitable attributes. Thus, the data stored within the data-store component is securely stored and inaccessible to the data-store component, owners, and other computational entities unless those computational entities are also, concurrently, readers and writers with sufficient attributes to access the stored data.

In FIG. 1, a number of users are shown, including three users 106-108 that are each personal computers and a fourth user 110 that is a server or larger-scale computer system. Users may be any of a wide variety of different types of computational devices and systems capable of executing reader and writer routines and intercommunicating with the data store and other components of the attribute-based access-control system, discussed below. As mentioned above, users may be owners, readers, and/or writers.

Yet another component shown in FIG. 1 is a certification and revocation authority ("CRA") 112. The CRA provides digitally signed certificates to requesting computational entities, including users. Certificates are explained further below. In essence, these certificates validate an association between a computational entity and an attribute, name, or other information. In general, the CRA is independent from the data-store component and users. In the system shown in FIG. 1, the CRA also issues attribute-associated credentials to users by issuing long-cycle keys, explained further below, directly to users and by publishing short-cycle attribute-associated keys to a public bulletin board 114. The public bulletin board ("PBB") is a computational system that, on behalf of an information-distributing entity, such as the CRA or a certificate issuer, publishes information for access by remote systems. In many cases, the CRA component is responsible for issuing certificates while a separate issuer component is responsible for issuing attribute-associated credentials.

In FIG. 1, arrows indicate information exchanges between components. For example, double-headed arrow 116 and text annotating the arrow indicates that user 106 obtains certificates and long-cycle attribute-associated keys from the CRA 112 in exchange for user information passed to the CRA. Arrow 118 indicates that user 106 exchanges data with the data store. Arrow 120 indicates that user 106 obtains short-cycle attribute-associated keys from the PBB 114. Thus, FIG. 1 illustrates various different types of components of an attribute-associated access-control system, to which the current application is directed as well as providing an overview of the information flow between those components. Details of the information flow are provided in greater detail, below.

Figure 2:
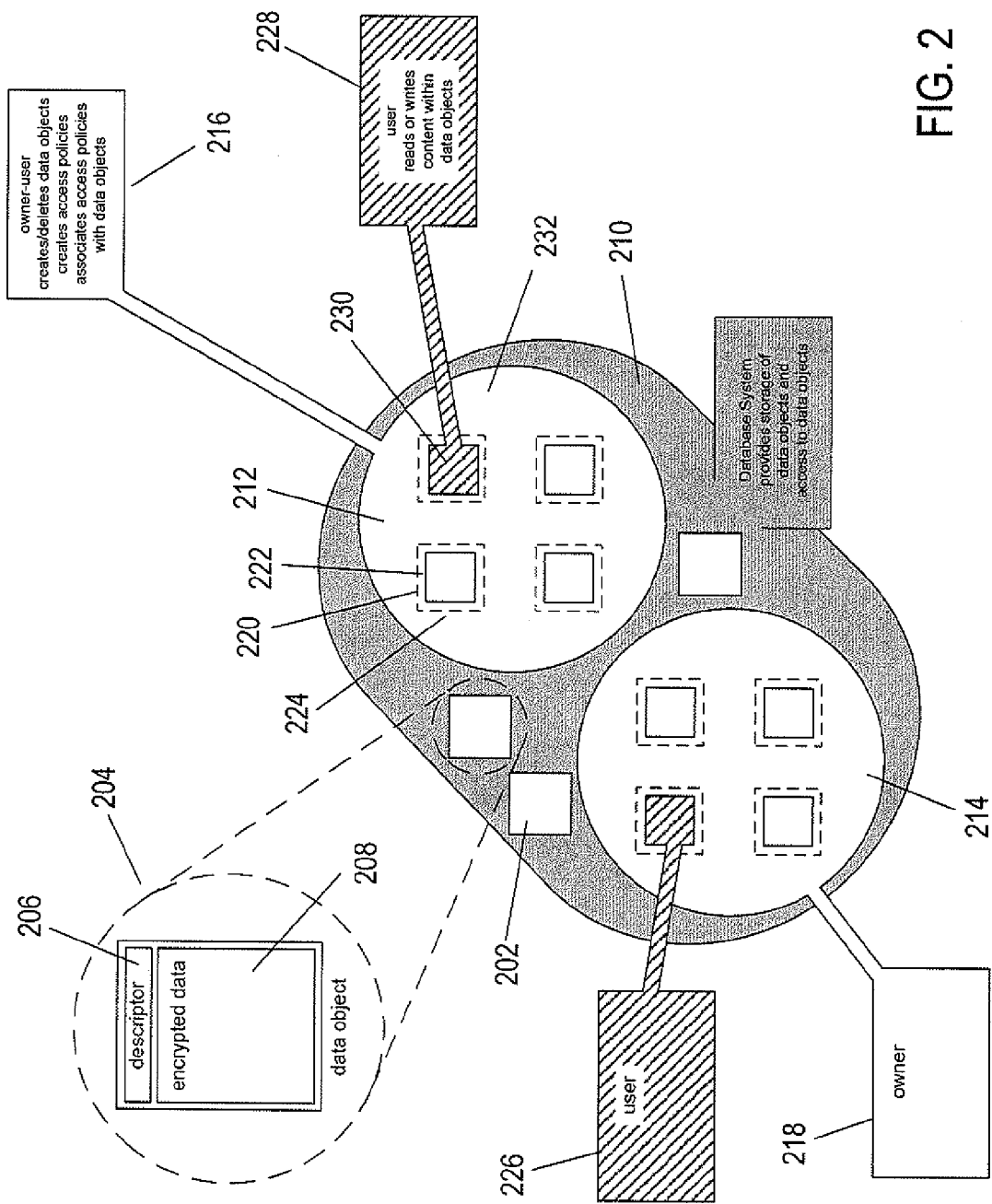
FIG. 2 schematically illustrates, for clarity, data objects and visibility of data objects to the data store component, to owners, and to readers and writers of an attribute-based access-controlled data-storage system to which the current application is directed.

FIG. 2 schematically illustrates, for clarity, data objects and visibility of data objects to the data store component, to owners, and to readers and writers of an attribute-based access-controlled data-storage system to which the current application is directed. In FIG. 2, a number of data objects are represented by small rectangles, such as rectangle 202. As shown in inset 204, each data object includes a descriptor 206 and a payload of encrypted data, or data payload 208. A large shaded region 210 represents the data store system. The data store system stores and retrieves data objects on behalf of users but, as shown in FIG. 2, cannot generally access the contents of the data objects other than clear-text portions of data-object descriptors. Thus, in shaded region 210, the data objects, such as data object 202, are shown as featureless, non-colored rectangles to indicate that the encryption-secured contents of the data objects are not accessible to the data store system. By contrast, two inner, unshaded regions 212 and 214 in FIG. 2 represent the view of two owners 216 and 218 of data objects stored within the data store system. As indicated by dashed outer boundaries, such as dashed outer boundary 220, and inner solid boundaries, such as inner solid boundary 222 of data object 224 within unshaded region 212, the owner can generally access the descriptor 206 portion of a data object but cannot access the encrypted data, within solid boundary 222. By contrast, users 226 and 228 are able to access the data stored within the data objects, as indicated by cross hatching 230 within the inner boundary of data object 232, as well as the descriptors. A reader can access both the data payload and descriptor of a data object for reading only. A writer can access the data payload for writing only and can access the descriptor only for reading. However, in the case that the read-access and write-access policies are identical, readers and writes share both read and write access to the data payload. An owner can access the descriptor of a data object for writing, but cannot access the data payload for either reading or writing. The data store system cannot access either the descriptor or the data payload for reading or writing and can instead only store and retrieve data objects on behalf of owners and users. Alternatively, for certain types of data-store implementations, the data store can access the clear-text portions of the descriptor. The illustration of portions of data objects accessible to owner, readers, and writers provided in FIG. 2 assumes that owners, readers, writers, and the data store operate according to security protocols, discussed below. Collusion among users and the data store in violation of these security protocols may lead to exposure of the data payloads with certain data objects to insecure access for certain periods of time.

Figure 3A:
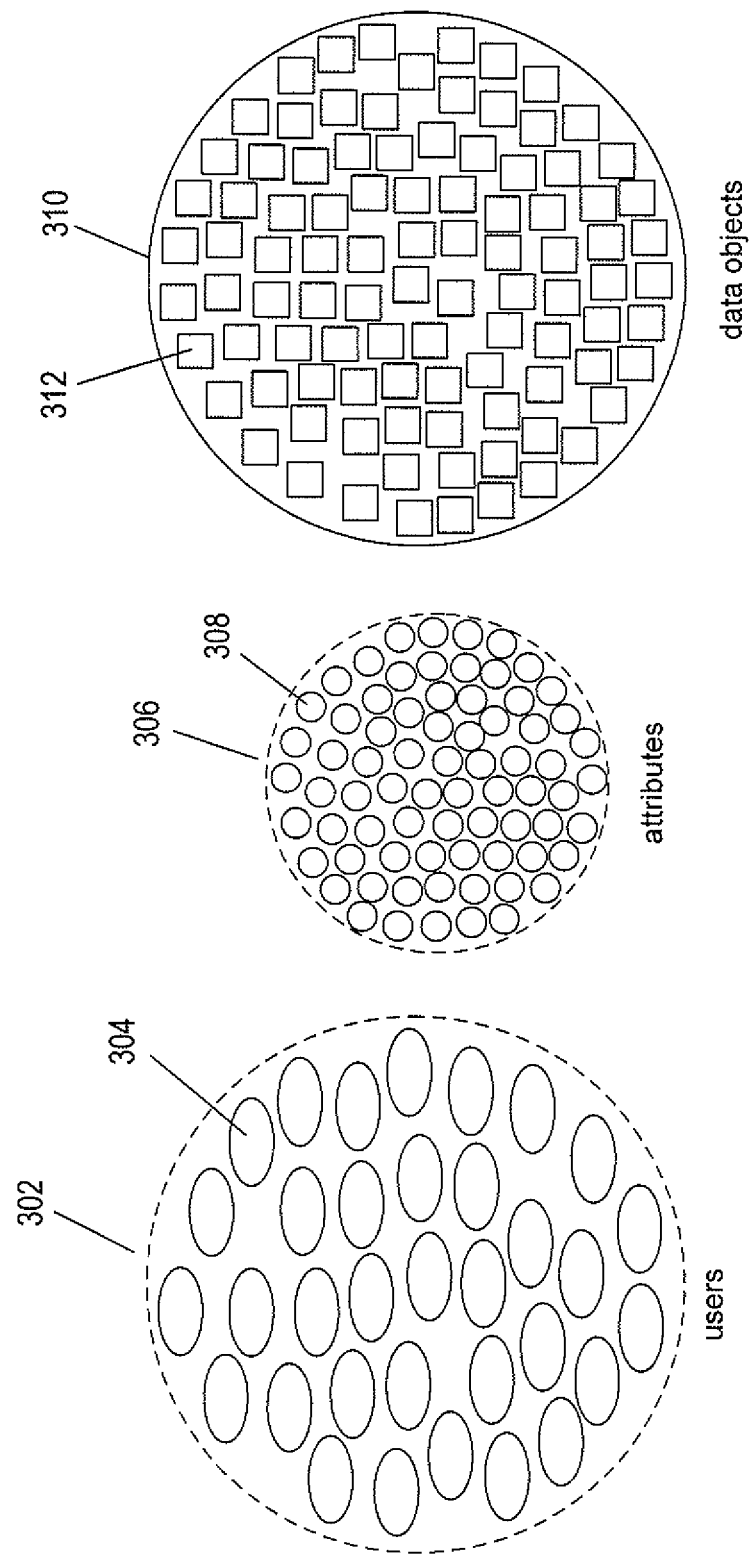
FIGS. 3A-D illustrate mappings between attributes, users, and data objects with respect to an attribute-based access-controlled data-storage system to which the current application is directed.

FIGS. 3A-D illustrate mappings between attributes, users, and data objects with respect to an attribute-based access-controlled data-storage system to which the current application is directed. FIGS. 3A-3D all use similar illustration conventions, next described with respect to FIG. 3A. In FIG. 3A, the three dashed circles enclose three different collections of objects. Dashed circle 302 encloses a set of users, each user represented by an elliptical object, such as user 304. Dashed circle 306 encloses a set of attributes, each attribute represented by a circle, such as attribute 308. Dashed circle 310 encloses a set of data objects, each data object represented by a rectangle, such as data object 312. In real-life ABACDSs, there may be hundreds, thousands, tens of thousands, or more users, thousands, hundreds of thousands, millions, tens of millions, or more data objects, and tens to hundreds of attributes. From a computational standpoint, users may be computationally represented by data structures that include fields indicating user names, user identification numbers, user communications addresses, user Internet addresses, and other such user-identifying information. As discussed above, data objects are data structures that include descriptors, discussed in detail below, and data payloads containing encrypted data. Attributes can take numerous forms, including symbol strings, data structures, and other computational identifiers. In certain cases, attributes may be associated with one or more attribute values. For the purpose of discussing ABACDSs in this document, attributes can be considered to be alphanumeric character strings that have well-understood meanings in particular contexts within which data objects are created and maintained. For example, for a hospital-database context, attributes might include "medical doctor," "nurse practitioner," "registered nurse," "surgeon," "anesthesiologist," "records administrator," "accounts auditor," "data-entry employee," and other such attributes.

Figure 3B:
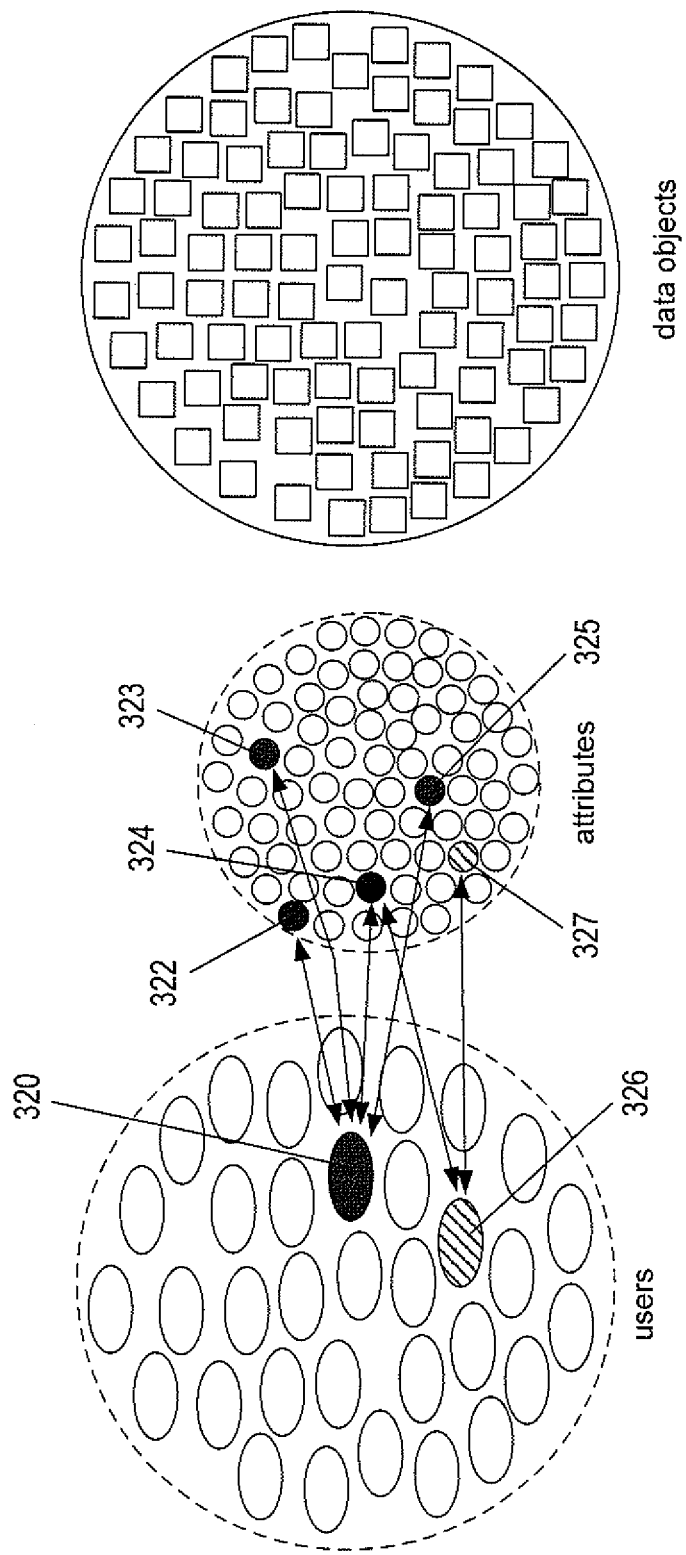

As shown in FIG. 3B, there is a bi-directional mapping between users and attributes. Each user is mapped to zero, one, or more attributes and a given attribute may be mapped to zero, one, or more users. In general, each attribute is mapped to multiple users and each user is mapped to multiple attributes. For example, in FIG. 3B, user 320 is mapped to, or associated with, the four attributes 322-325. User 326 is mapped to attributes 324 and 327. Attribute 324 is mapped to both users 320 and 326.

Figure 3C:
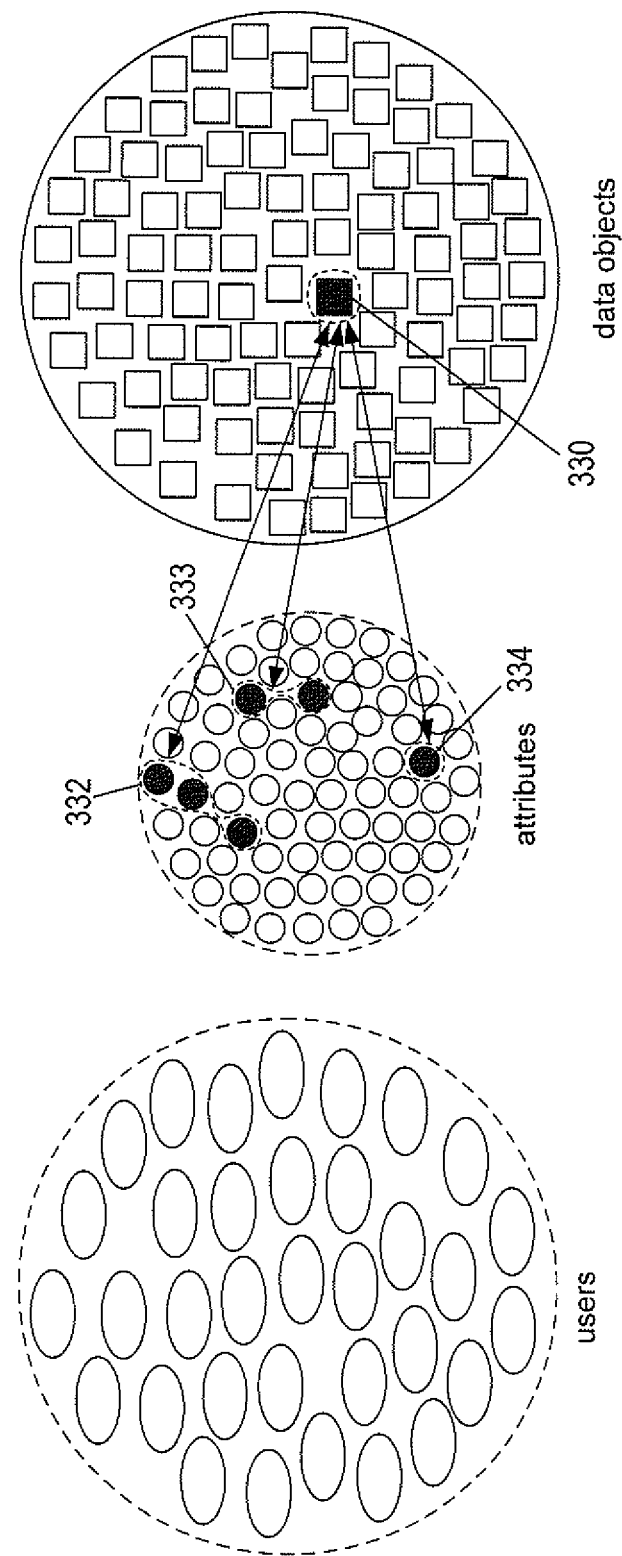

As shown in FIG. 3C, there is a bi-directional mapping between sets of attributes and data objects. For example, as shown in FIG. 3C, data object 330 is associated with three sets of attributes 332, 333, and 334, where the sets are illustrated as dashed curves enclosing one or more attributes. As is discussed further below, each set of attributes may be a conjunction within an access policy expressed in disjunctive normal form. In general, as further discussed below, each data object is associated with a read policy and a write policy, both of which are expressed as a single attribute, a single conjunction of attributes, or a disjunction of conjunctions of attributes. Each set of attributes, which may overlap other attribute sets, may belong to one or more access policies, each of which may be associated with one or more data objects.

Figure 3D:
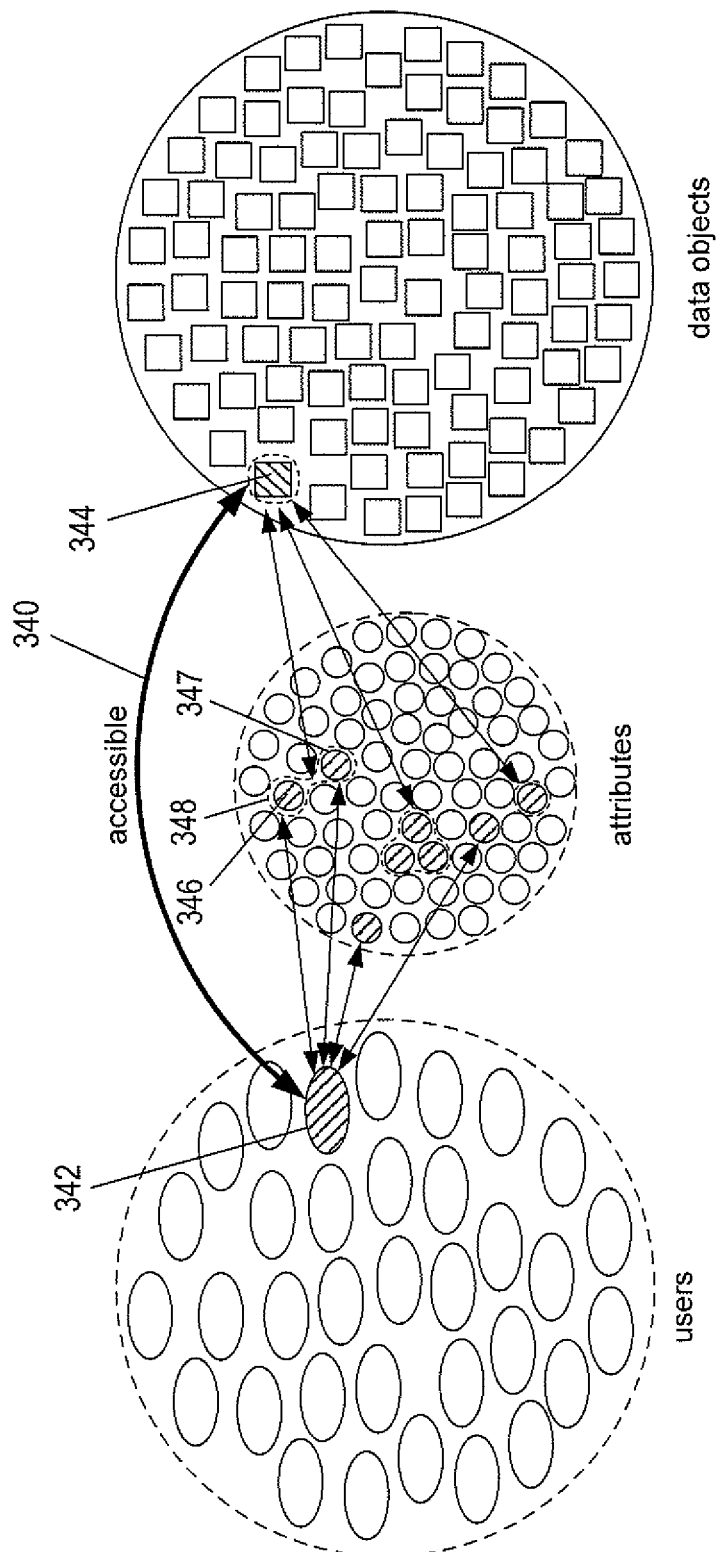

As shown in FIG. 3D, there is an overall mapping between users and data objects, through attributes, indicating the accessibility of particular data objects to particular users. In FIG. 3D, the bold, double-headed arrow 340 represents the fact that user 342 can access data object 344, where the access may be one of read access or write access. The fact that data object 344 is accessible to user 342 is derived from the underlying mappings between users and attributes and between sets of attributes and data objects. When a user is mapped to all of the attributes within a set of attributes that is mapped to the data object, the user can access the data object. Otherwise, the data object is not accessible to the user. As shown in FIG. 3D, user 342 is mapped to, or associated with, each of attributes 346-347 in the set of attributes 348, and the set of attributes 348 is mapped to data object 344. Thus, data object 344 is accessible to user 342. The accessible relationship can be expressed as follows:

User j is associated with the set of attributes A.
Data object k is associated with the set of sets of attributes $\{B_1, \ldots, B_n\}$.
User j can access data object k when $\exists i: B_i \supseteq A$.

Figure 4:
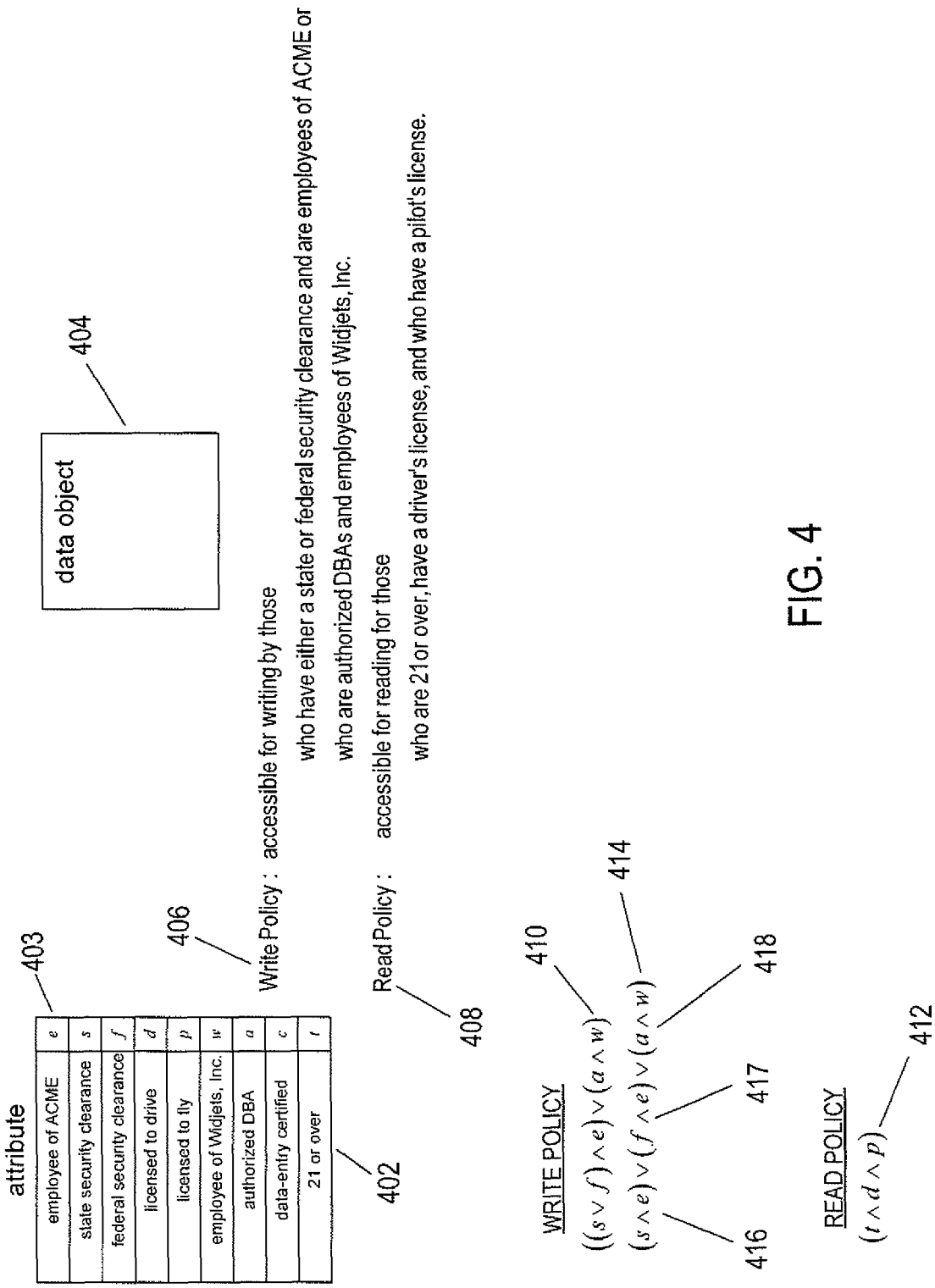
FIG. 4 illustrates read and write policies associated with a data object and expression of those read and write policies in disjunctive normal form.

FIG. 4 illustrates read and write policies associated with a data object and expression of those read and write policies in disjunctive normal form. In the upper left-hand portion of FIG. 4, a small attribute table 402 is provided. Each row in the table corresponds to an attribute, expressed as a string of symbols, along with a one-letter abbreviation for the attribute. For example, the first attribute represented by the first row 403 in the attribute table is "employee of ACME," which is alternatively expressed by the one-letter abbreviation "e." At the top of FIG. 4, a data object 404 is represented by a rectangle. A write policy 406 and a read policy 408 are shown below the data object, expressed in natural language. The data object can be written by those who have either a state security clearance or federal security clearance and are employees of ACME or by those who are authorized DBAs and employees of Widjets, Inc. The data object can be read by those who are 21 or over, have a driver's license, and who have a pilot's license. The write policy can be directly translated into a Boolean expression using the one-letter abbreviations for attributes, as shown in the lower left-hand portion of FIG. 4, with the direct translation of the write policy appearing as Boolean expression 410 and the direct translation of the read policy appearing as Boolean expression 412. An attribute abbreviation used as a term of a Boolean expression means that the term is true when a user has acquired the attribute by obtaining an attribute-associated certificate from a certification authority and is otherwise false. The symbol "^" stands for the Boolean AND operation and the symbol "∨" represents the Boolean operation OR. The Boolean operations each operate on the term or expression to the left of the operation symbol and the term or expression to the right of the operation symbol. Two terms and/or expressions that are operands of an AND operation are referred to as being "conjoined" and two terms and/or expressions that are operands of an OR operation are referred to as being "disjoined."

The direct translation of the natural-language write policy to the Boolean expression 410, while correct, is not in disjunctive normal form ("DNF"). A DNF Boolean expression is a disjunction of conjunctions, each conjunction including each Boolean term only once. Expression 410 can be transformed to DNF expression 414 by straightforward computational techniques. Note that the DNF expression 414 includes three conjunctions 416-418 joined together by disjunctions. In the below-described implementations of ABACDSs, read and write policies are expressed as Boolean expressions in DNF form, to facilitate graph-based representations of read and write policies.

Figure 5:
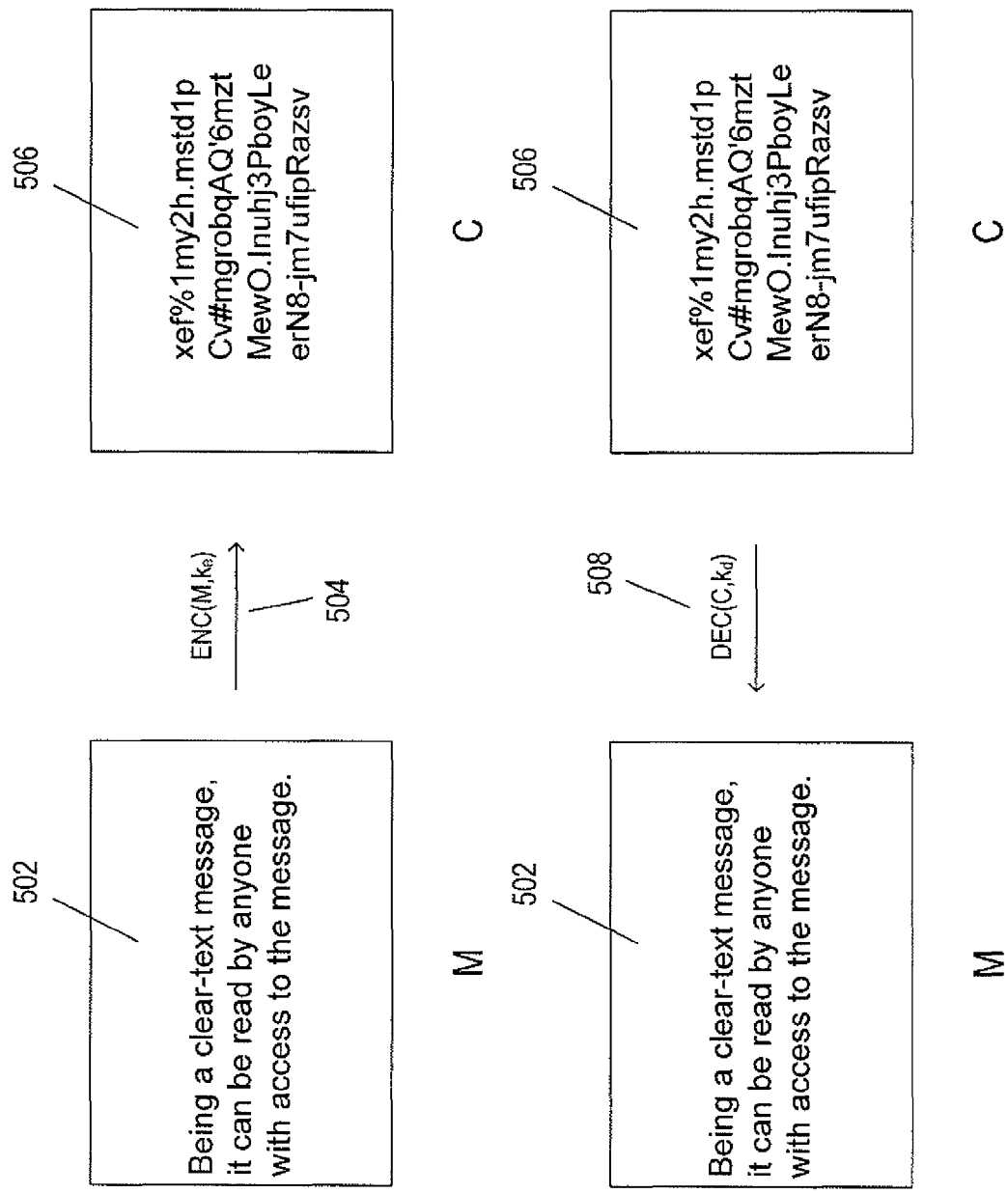
FIG. 5 illustrates encryption and decryption processes.

FIG. 5 illustrates encryption and decryption processes. As mentioned above, encryption is used to transform a clear-text message or symbol string into encrypted form which cannot be interpreted by normal symbol-string interpretation algorithms, such as by reading natural-language statements. Decryption is the inverse process by which encrypted symbol strings are transformed back to clear-text form. In FIG. 5, an initial natural-language message M 502 is transformed, by encryption 504, to an encrypted message C 506. In the current discussion, the expression "ENC(M, $k_e$)" stands for encryption of message M using encryption key $k_e$. As is obvious by comparing clear-text message M with encrypted message C, the meaning of encrypted message C cannot be extracted by normal text-processing means. Instead, an encrypted message C needs to be first reverse-transformed back to a clear-text message by the decryption process 508. The expression "DEC(C, $k_d$)" stands for decryption of encrypted message C using decryption key $k_d$. This can be alternatively expressed as "$ENC^{-1}(C, k_d)$."

FIG. 6 summarizes three different encryption-based techniques referred to in the following discussion. Public-key/private-key encryption is widely used in commercial transactions and information-exchange protocols. One commercially successful public-key/private-key encryption/decryption technique is referred to as the "RSA" encryption/decryption technique, where RSA includes the first letters of the last names of the inventors of the method: Rivest, Shamir, and Adleman. In this encryption/decryption technique, pairs of encryption/decryption keys are generated. In general, the encryption key is publically distributed, and referred to as the "public key," while the decryption key is held in secret by an encrypted-message-receiving party and referred to as the "private key" or "secret key." In normal usage, anyone can access the public key and encrypt a message using the public key, but only the receiving party in possession of the secret key can decrypt and read the encrypted message. For secure communications, two parties can exchange their public encryption keys so that each party can encrypt a message and transmit the encrypted message to the other party for decryption and reading only by the other party.

To generate an encryption/decryption key pair by the RSA method, two prime numbers p and q are first selected, and the product n=pq is computed and stored. Next, the product $\phi(n)$ is computed as (p−1)(q−1). Next, an integer e in the range (1, $\phi(n)$) is selected such that the greatest common divisor of e and $\phi(n)$ is 1. A corresponding integer d is computed such that (d*e) mod $\phi(n)$=1. The public encryption key $k_e$ is the pair of integers (e,n) and the private, or secret, decryption key $k_d$ is the four-tuple (d, n, p, q) or the three-tuple (d, p, q). To encrypt a message M, M is transformed to an integer m in the range (0,n), the integer in is then subjected to the Optimal Asymmetric Encryption Padding ("OAEP") randomized padding scheme, and is then raised to the power e modulo n or, as shown in FIG. 6:

$$C \leftarrow (OAEP(m))^e \bmod n.$$

To decrypt the encrypted message C, the integer in is recovered by applying the inverse of the randomized padding scheme to the encrypted message C, raising the result to the power d modulo n or, as shown in FIG. 6:

$$m = OAEP^{-1}(C^d \bmod n)$$

and then the integer m is transformed back into message M by the inverse of the forward transformation of M to m, carried out as the first step of the encryption method.

The RSA encryption/decryption method can also be used to digitally sign a message to provide for message authentication. First, a one-way cryptographic hash function is applied to the message M to produce a hash value mHash. Then, a transform is applied to mHash to generate an encoded message EM. Finally, a signature for the message is generated by raising EM to the power d modulo n, equivalent to applying the RSA decryption method, using secret key $k_d$, to EM. The signature can be appended to message M. A recipient of the message can verify the message by first generating mHash as in the signing method. The recipient then applies the RSA encryption method to the signature to generate a value EM' or, as expressed in FIG. 6:

$$EM' = signature^e (\bmod n) = ENC(signature, k_e).$$

Then, a reverse transform is applied to EM' to generate mHash'. When mHash' is equal to mHash, or the hash value generated by applying the one-way cryptographic hash function to message M, the signature is verified. Note that the signer of the message uses the signer's private or secret key while the message can be verified by anyone with access to the corresponding public key of the signer. Verification indicates that the text of a received message M is identical to the text in an original message M that was signed by the signer in possession of the secret key $k_d$.

Finally, other types of encryption/decryption methods employ a single symmetric key. In this case:

$$C \leftarrow ENC(M,k)$$

$$M \leftarrow DEC(C,k).$$

Symmetric-key encryption uses a single key k for both encryption and decryption. There are many different types of symmetric key encryption. One example is the Advanced Encryption Standard ("AES"). In general, symmetric-key encryption employs a series of deterministic operations for encryption that can be inverted for decryption. For symmetric-key encryption, the encryption key k is generally held in secret by both communicating parties since, once revealed, the message is encrypted using the key k can be readily decrypted when the particular symmetric-key-encryption method is known.

Figure 7:
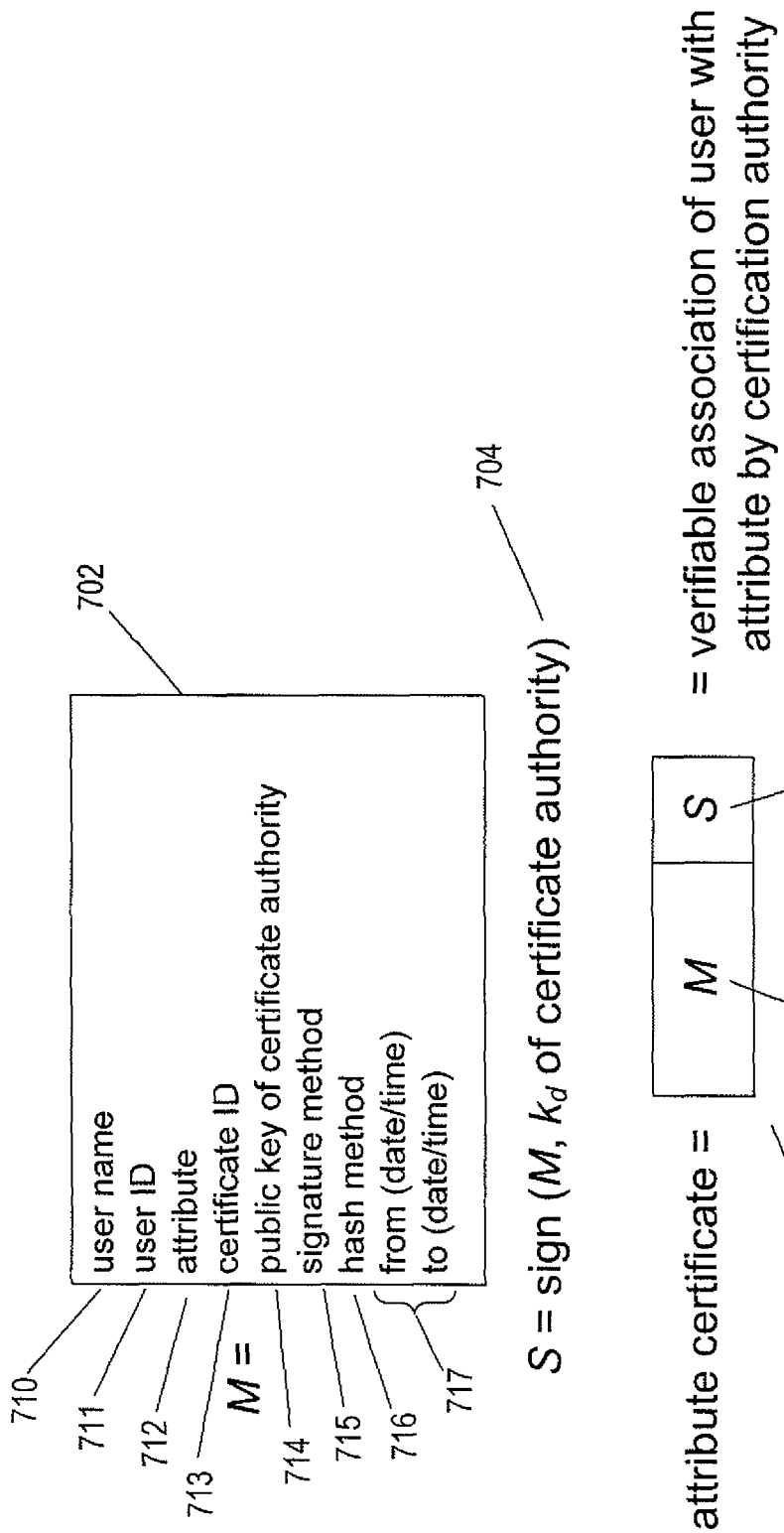
FIG. 7 illustrates an example of a digital certificate.

FIG. 7 illustrates an example of a digital certificate. As mentioned above, digital certificates are issued by the CRA in an attribute-based access-control system, such as that shown in FIG. 1, to verifiably bind attributes to users. In this particular case, the ultimate user is often a human user who acquires attributes in order to access various classes of data objects, although the transaction is carried out by the user's computer and the certificate is stored within the user's computer. The digital certificate consists of a digital message, such as a record or data structure 702, that is digitally signed by a CRA or other certificate authority 704. The digital certificate is thus a message 702 combined with a signature by the certificate authority over the message 704 packaged together as a certificate 706. The contents of the message 702 can be verified by a receiver of the digital certificate in possession of the public key $k_e$ of the certificate of authority, as discussed above.

One type of certificate frequently employed in the attribute-based access-control system is an attribute certificate, issued by the CRA, that binds a particular user with attributes. The message portion of the certificate may include, as one example, the user's name 710, an identifier for the user 711, an indication of the attribute bound to the user by the certificate 712, a certificate identification number 713, the public key of the certificate authority 714, for certificate authorities below a root certificate authority in a hierarchy of certificate authorities, used by a recipient to verify the certificate, an indication of the method by which the signature was generated 715, an indication of the hash method used to hash the message prior to the secret-key-based signature generation 716, and from-and-to dates 717 that together specify a period of time during which the certificate is valid. In alternative implementations, a greater number, fewer, or different fields may be included in an attribute certificate. Additional types of certificates employed in an attribute-based access-control system may include certificates that bind personal information to an owner and certificates that bind personal information to a writer, as discussed further below.

Figure 8:
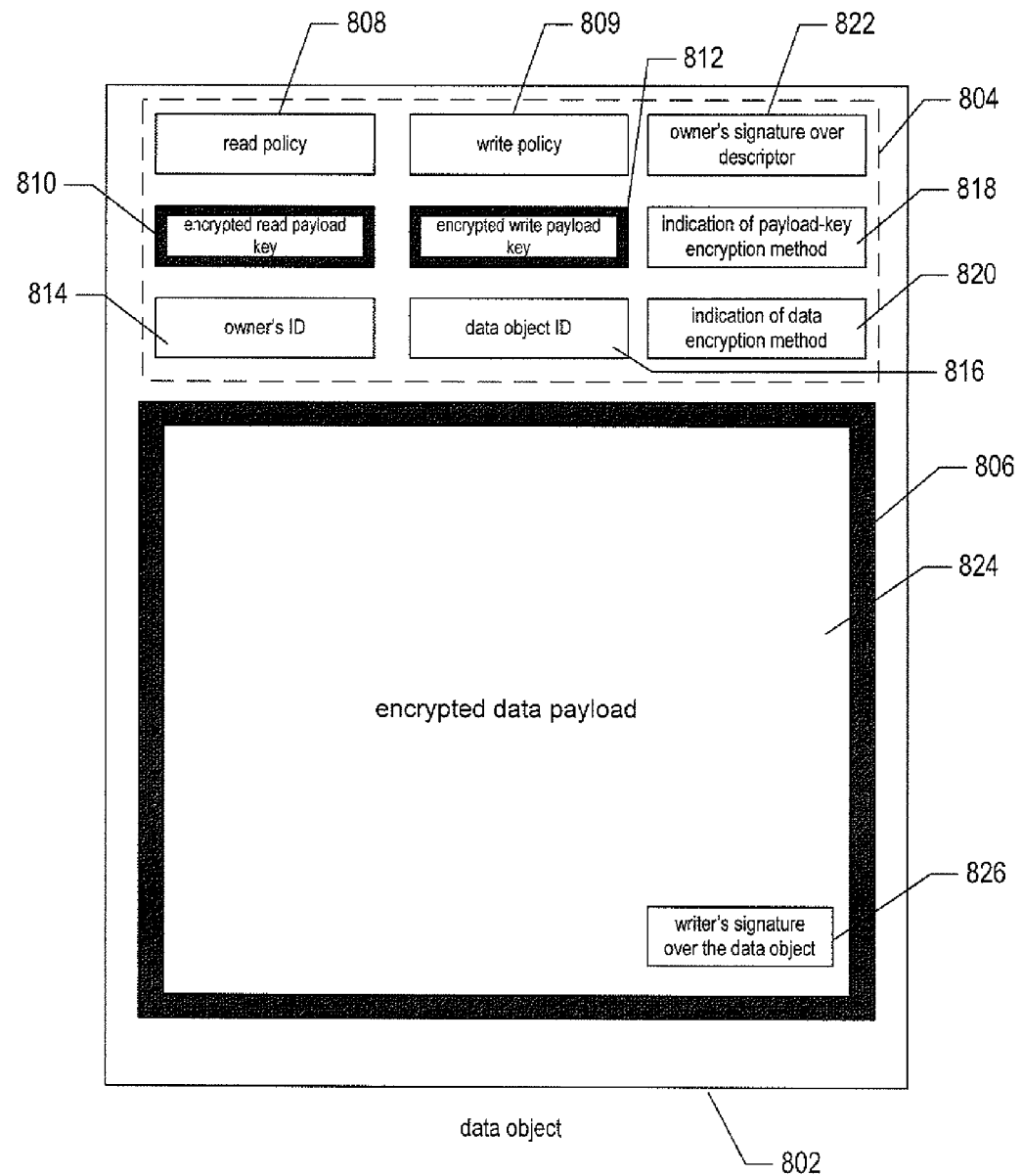
FIG. 8 illustrates a data object stored by the data store component of an attribute-based access-control system that represents one implementation of the attribute-based access-controlled data-storage system to which the current application is directed.

FIG. 8 illustrates a data object stored by the data store component of an attribute-based access-control system that represents one implementation of the attribute-based access-controlled data-storage system to which the current application is directed. A data object is a digitally encoded quantity of information that is transmitted from the data store to users when users access data objects. A data object may be stored within the data store in two or more non-contiguous regions of a mass-storage-system address space, electronic-memory address space, or other types of data-storage subsystems and devices. A data object may also be broken up, or packetized, for transmission through networks and low-level electronic-communications media. Thus, FIG. 8 provides a logical representation of a data object that may be encoded and stored in physical storage devices and transmitted over communications media in a variety of different ways.

As discussed above, the data object 802 includes a descriptor 804 and a data payload 806. The descriptor includes cleartext read and write policies 808-809, an encrypted read payload key 810, an encrypted write payload key 812, the owner's ID 814, a data-object ID 816, an indication of the method by which the payload keys are encrypted 818, an indication of the method by which the data within the data payload is encrypted 820, and the owner's signature 822 over all of the non-owner-signature content of the descriptor. The encrypted read payload key 810 and encrypted write payload key 812 are discussed further, below. These may have one form when stored within the data-store component and another form when transferred to users. In various different implementations of an ABACDS, additional data fields may be included within the descriptor and/or certain of the above-mentioned data fields in data objects may be omitted. The encrypted data payload 806 includes encrypted data 824 as well as the most recent writer's signature over the data object 826. In various implementations, each of the fields and data structures contained in the descriptor may have different lengths according to different encodings. The encrypted data may have, in various implementations, varying lengths, with the total amount of encrypted data constrained, in certain implementations, to be at or below some maximum number of bits, bytes, words, or other such data units.

Figure 9A:
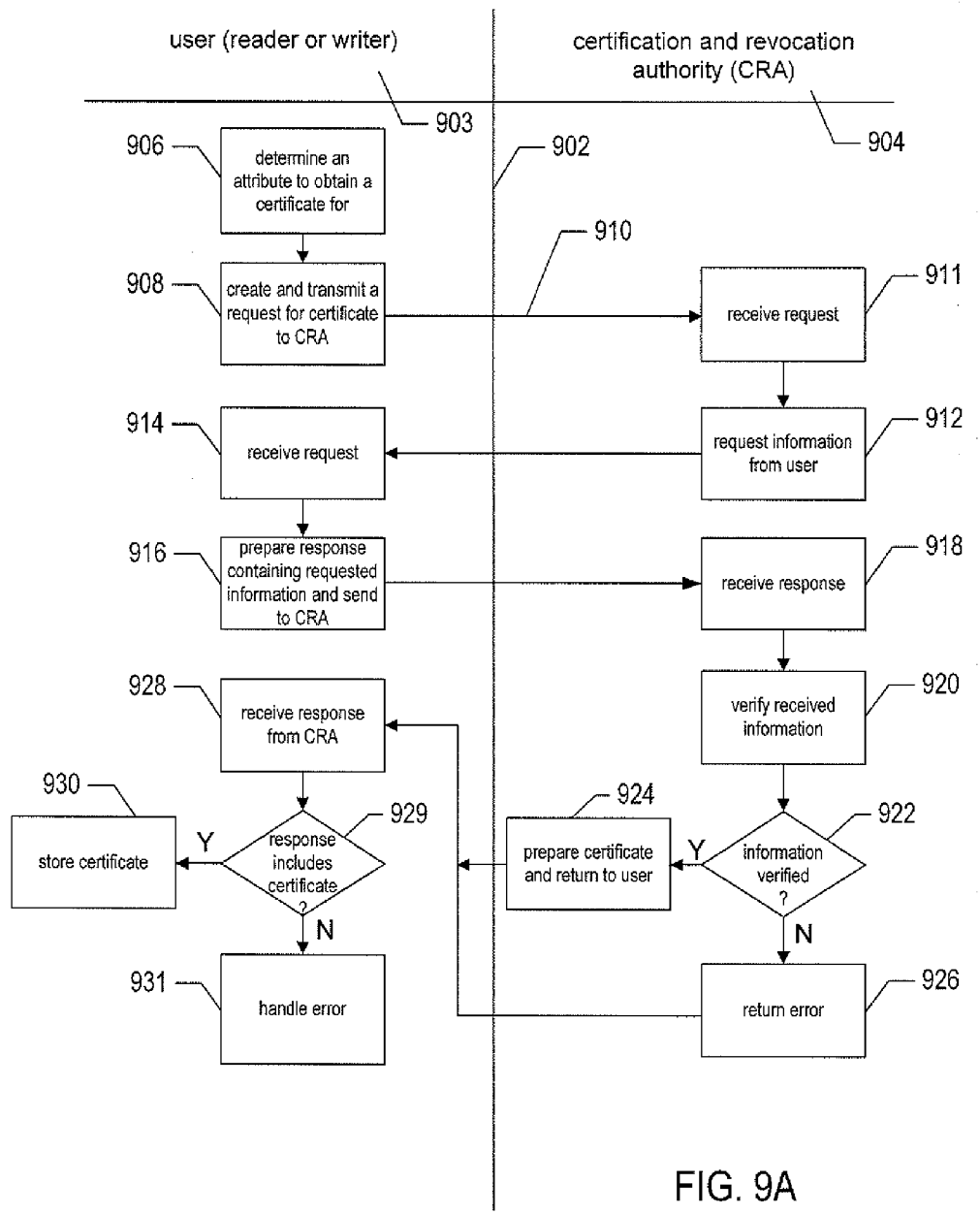
FIGS. 9A-H provide control-flow diagrams that illustrate the types of interactions between certain of the participants in the attribute-based access-controlled data-storage system shown in FIG. 1.

FIGS. 9A-H provide control-flow diagrams that illustrate the types of interactions between certain of the participants in the attribute-based access-controlled data-storage system shown in FIG. 1. FIG. 9A illustrates a transaction by which a user obtains a certificate, from the CRA, that binds the user to an attribute. In FIG. 9A, as in the subsequently discussed FIGS. 9B-H, a vertical line centered within the FIG. 902 divides steps on the left-hand side of the figure, carried out by one transaction participant, from steps on the right-hand portion of the figure, carried out by a different transaction participant. Thus, in FIG. 9A, the steps on the left-hand portion of the figure are carried out by a user 903 while steps on the right-hand portion of the figure are carried out by the CRA 904. In step 906, a user determines that the user needs to obtain an additional attribute from the CRA. For example, the user may become aware of a database, file system, or other data-store component from which the user seeks access to data objects and may additionally become aware of the fact that, in order to access the data objects, the user must first have acquired a particular set of attributes. Lacking certain of these attributes, the user then attempts to acquire, from the CRA, certificates binding the user to the needed attributes.

In step 908, the user creates a request for an attribute certificate and transmits the request to the CRA, the transmission indicated by arrow 910. The CRA receives the request, in step 910, generally accesses stored information indicating the types of information that the CRA must receive from the user in order to validate the user to grant the request, and, in step 912, prepares a request for the needed information and transmits the request to the user. In step 914, the user receives the request and, in step 916, prepares a response containing the requested information and transmits that response to the CRA. In step 918, the CRA receives the response from the user, verifies information received in the response in step 920 and, as determined in step 922, when the information is complete and verified, prepares a certificate binding the user to the attribute in step 924 and returns the certificate to the user. Otherwise, the CRA returns an error in step 926. In step 928, the user receives a response from the CRA. When the response, as determined in step 929, is a certificate, the user stores the certificate 930 locally for subsequent use in data-access transactions with the data store and, as determined in step 929, when the response is an error, appropriately handles that error in step 931. The user may, for example, retry the request for a certificate and supply new or additional information to the CRA, may request a certificate from a different CRA, or may seek additional information with regard to failure to obtain a certificate. In this figures, as in all subsequently discussed control-flow diagrams, many possible error occurrences and corresponding error-handling steps are omitted, for the sake of clarity and brevity. In all cases, many additional steps and message exchanges may occur in order to carry out a real-world transaction.

Figure 9B:
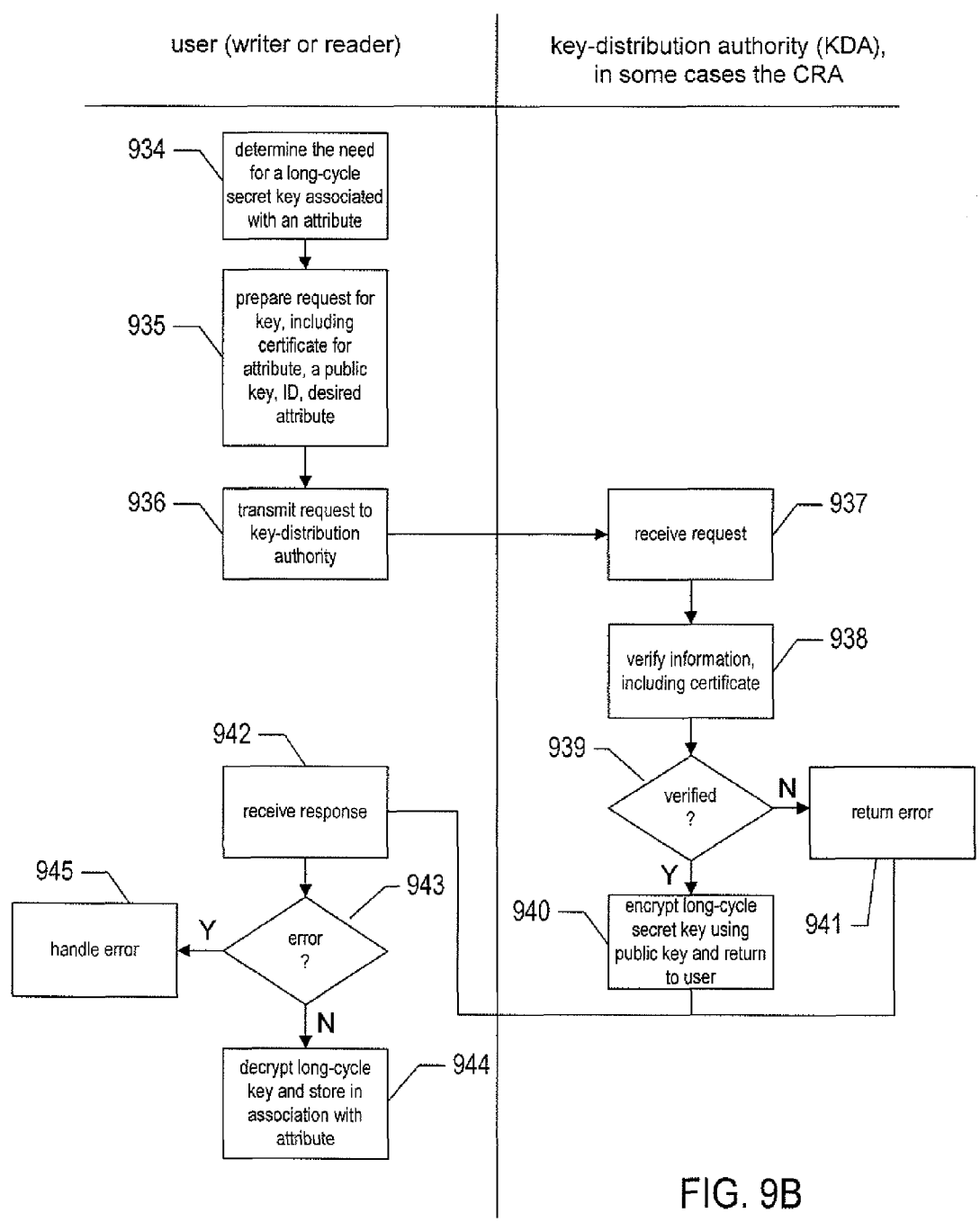

FIG. 9B provides a control-flow diagram illustrating an interaction of a user with a key-distribution authority ("KDA") which, as discussed above, may be a CRA in certain implementations. In step 934, the user determines that the user needs a long-cycle secret key associated with an attribute. The long-cycle secret key allows the user to decrypt short-cycle secret keys associated with attributes published by the CRA to a PBB. In this discussion, a single long-cycle key is described as being sought by a user and provided to the user by the KDA. However, as discussed below, in many ABACDSs, users seek and are provided multiple long-cycle keys in long-cycle-key delivery transactions. Long-cycle secret keys must initially be obtained by a user in order to obtain a short-secret key, or credential, associated with an attribute. Long-cycle secret keys may expire, at relatively long intervals of time, requiring the user to obtain a new long-cycle secret key from the KDA.

Next, in step 935, the user prepares a request for the long-cycle KDA, including in the request a certificate that binds the user to the attribute associated with the long-cycle key. In this request, the user may additionally supply a public key for use by the KDA in encrypting the long-cycle key for transmission to the user and other information needed by the KDA to issue a certificate. In step 936, the user transmits the request for the long-cycle key to the KDA. In step 937, the KDA receives the request and, in step 938, verifies information included by the user in the request, including the user's certificate that certifies association of the user with the attribute. When the information provided by the user is successfully verified by the KDA, as determined in step 939, the KDA encrypts the current long-cycle key associated with the attribute and returns the encrypted key to the user in step 940. Otherwise an error is returned in step 941. In step 942, the user receives the response from the KDA and, when the response contains the desired, encrypted, long-cycle key, as determined in step 943, the user decrypts the long-cycle key using the user's secret key corresponding to the public key furnished to the KDA and stores the decrypted long-cycle key locally in association with the attribute in step 944. Otherwise, the error returned in step 941 is handled in step 945.

Figure 9C:
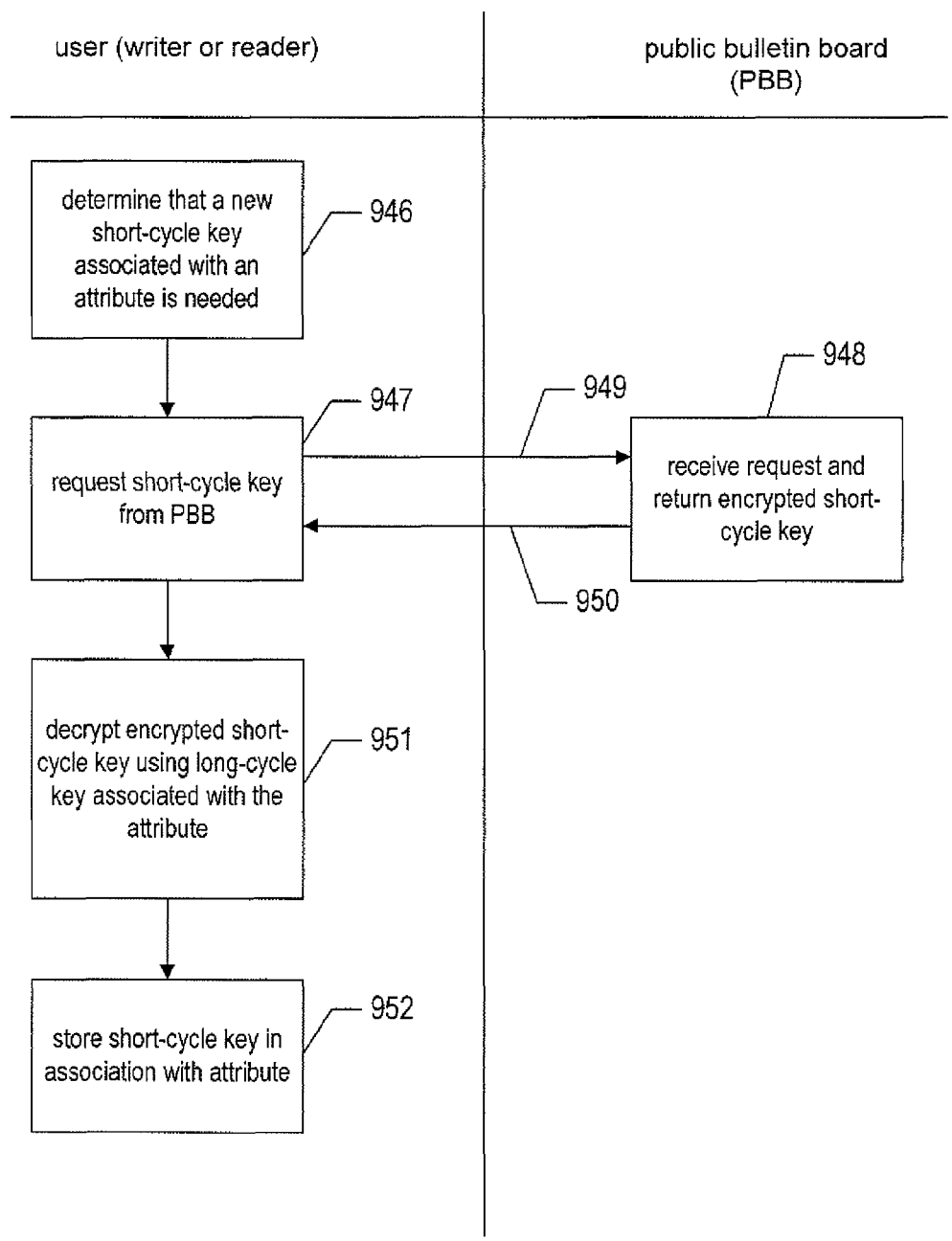

FIG. 9C illustrates the interaction of a user, either writer or reader, with the PBB. In step 946, the user determines that the user needs a new short-cycle key, or credential, corresponding to a particular attribute. In step 947, the user prepares a request for the short-cycle key to retrieve the short-cycle key from the PBB, which receives a request in step 948 and returns the encrypted short-cycle key. The two arrows 949 and 950 indicate that multiple exchanges of information may occur, in certain implementations. Note that the PBB does not need to verify user information or otherwise authorize the request, since the short-cycle key is encrypted using the current long-cycle key for the attribute. Upon receiving the encrypted short-cycle key, the user decrypts the short-cycle key using the long-cycle key associated with the attribute, in step 951, and stores the short-cycle key, or credential, in association with the attribute locally in step 952.

Figure 9D:
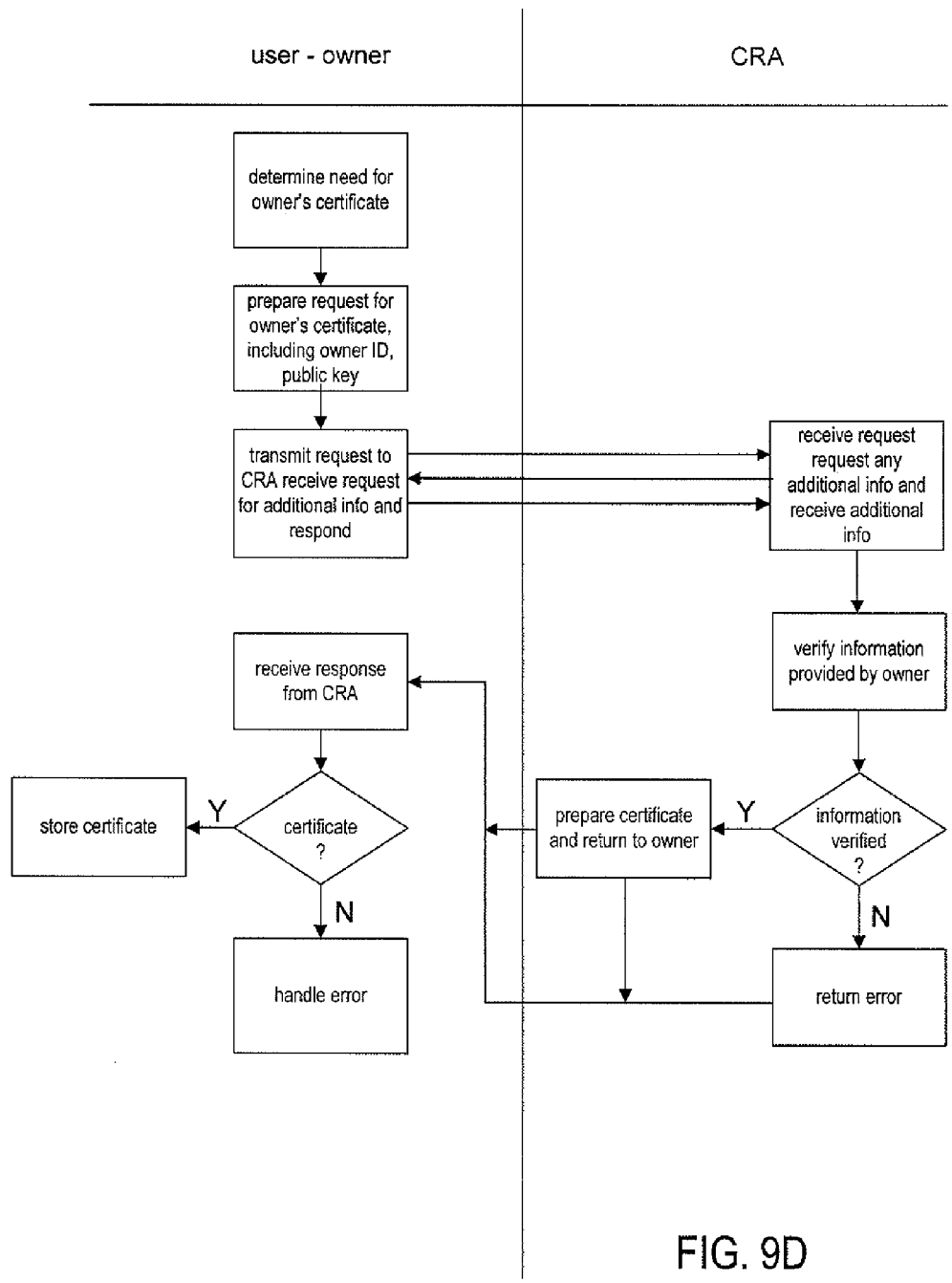

FIG. 9D illustrates interaction between a user-owner and the CRA by which the owner requests and receives a certificate, from the CRA, binding the owner to ownership of an owner ID and public key. The interaction illustrated in FIG.

9D is similar to the interaction of a writer or a reader with the CRA, shown in FIG. 9A, and is not further described.

Figure 9E:
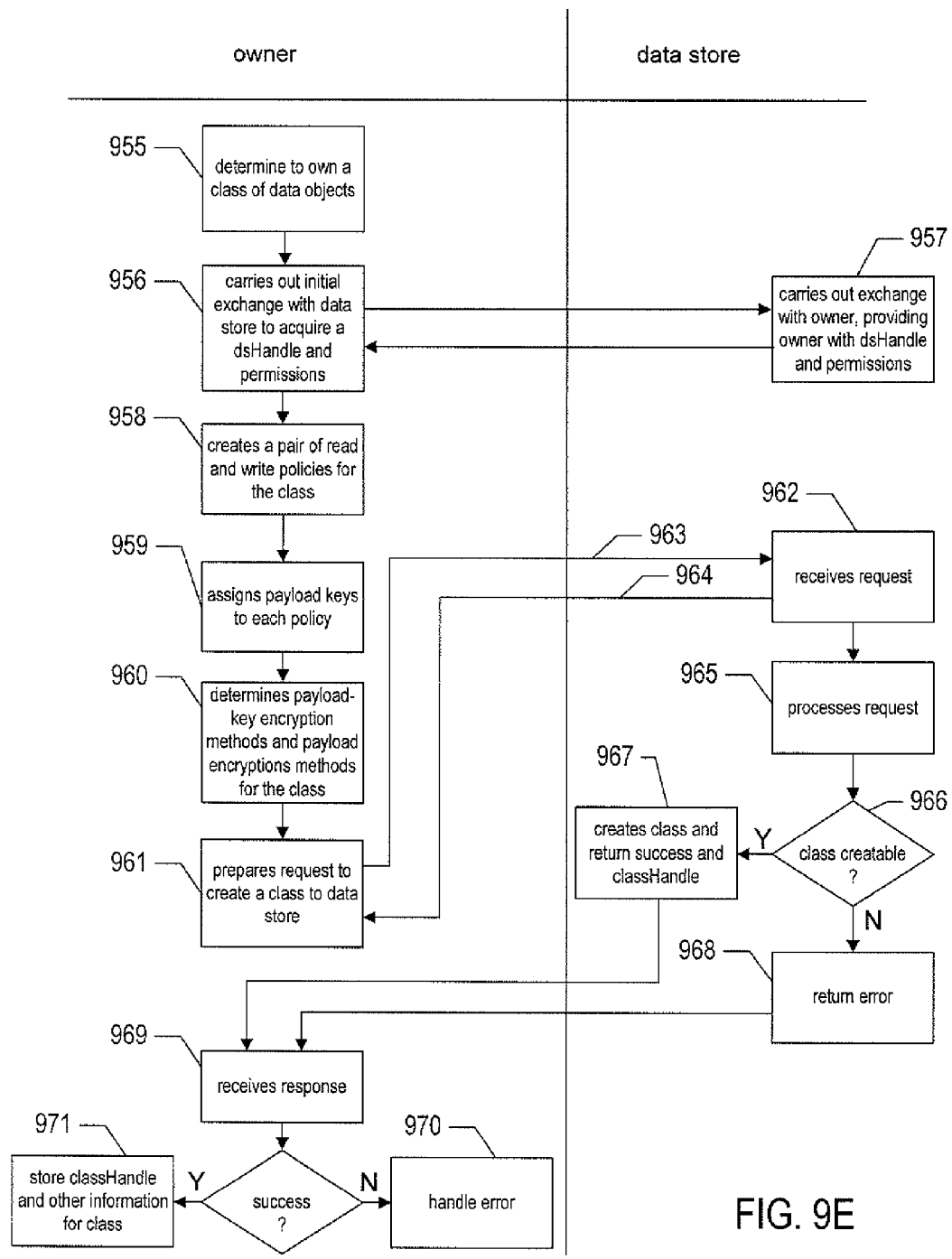

FIG. 9E provides a control-flow diagram for interaction between an owner and a data-store component of an attribute-based access-control system. In the transaction illustrated in FIG. 9E, the owner requests creation of a new class of data objects and ownership of that class. In general, data objects within the data store are aggregated together into classes, access to each data object in a class of data objects controlled by common read and write policies for the class. In addition, each class of data objects is generally associated with a set of payload-encryption keys, a payload-key encryption method, and data-payload encryption methods. In step 955, the owner determines to own a new class of data objects. In step 956, the owner initiates and carries out an initial exchange of information with the data store to acquire a data-store handle and additional data-store information, such as permissions, needed to carry out transactions with the data store. The data store, in step 957, carries out the data-store portion of the transaction initiated in step 956 by the owner. The transaction may involve multiple exchanges of information between the owner and the data store, depending on the type of data store and data-store implementation. The owner returns, at the completion of the initial exchange of information, a data-store handle to the owner which the owner subsequently uses to issue requests to the data store. In certain cases, the owner acquires an ability to interact with the data store using vehicles other than data-store handles ("dsHandles"). In step 958, the owner creates a pair of read and write policies for the class. In step 959, the owner assigns payload keys to each class. In step 960 the owner determines payload-key encryption and payload-encryption methods for the class and then, in step 961, prepares a request to create the class and transfers the request to the data store, supplying to the data store the dsHandle earlier returned by the data store to allow for the request to be carried out by the data store. In step 962, the data store receives the request. As in other control-flow diagrams, the double arrows 963-964 between steps 961 and 962 indicate that multiple information exchanges may be carried out, in certain cases and/or implementations. In step 965, the data store processes the request by verifying the dsHandle, owner, data-store capacity for creating new classes of data objects, and other such information. When a class can be created in response to the received request, as determined in step 966, the data store creates the class of data objects and returns a success status and classHandle to the owner in step 967. Otherwise, in step 968, an error is returned. In step 969, the owner receives the response and either handles a returned error in step 970 or stores a return classHandle and other information related to the class locally, in step 971. Each different type of data store and each different data-store implementation may create a class of data objects, in step 967, using different data structures and other internal computational entities and facilities.

In certain implementations, the owner determines payload keys for each class and encrypts them, as part of step 959. In other implementations, the owner requests encrypted payload keys from a KDA and, upon receiving the requested encrypted payload keys, assigns them to policies in step 959. The latter implementations provide additional security, so that untrusted owners cannot decrypt data payloads of objects without concurrently being a reader or writer with proper credentials. However, even in the former implementations, an owner generally cannot extract complete data objects from the data store without concurrently being a reader or writer with proper credentials, but instead can access only data-object descriptors.

Figure 9F:
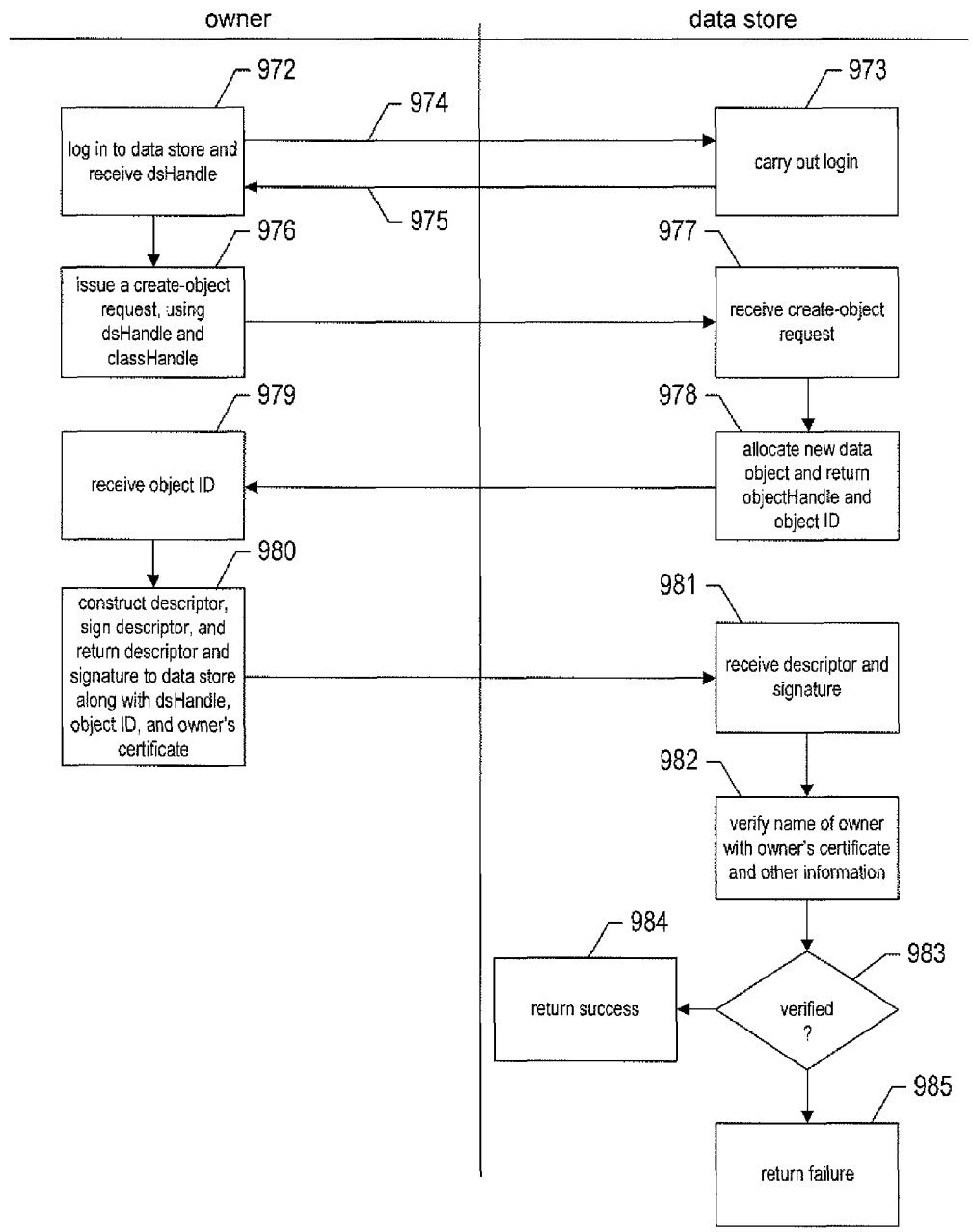

FIG. 9F provides a control-flow diagram illustrating another interaction between an owner and the data store. In this interaction, the owner creates a new data object within the data store for subsequent access by users. In step 972, the owner logs-in to the data store and, upon successful login, receives a data-store handle from the data store. In step 973, the data store carries out its portion of the login. Multiple arrows 974-975 indicate that multiple information exchanges may occur between the owner and the data store to carry out a successful login. Next, in step 976, the owner issues a create-object request to the data store, providing the data store the dsHandle and a classHandle for the class of data objects within which a new data object is to be created. In step 977, the data store receives the request to create a new data object and then, in step 978, allocates a new data object within the indicated class and returns an objectHandle and an object ID for the new data object to the owner. In step 979, the owner receives the objectHandle and object ID and, in step 980, constructs a descriptor for the new data object, signs the descriptor, and returns the descriptor and signature to the data store along with the dsHandle, the owner's ownership certificate, the object ID, and any other information needed by the data store to insert the descriptor into the newly created data object. In step 981, the data store receives the descriptor and signature, verifies any clear-text information in the descriptor that can be verified by the data store, the owner's certificate, and other such information in step 982 and, when the verification is successful, as determined in step 983, returns a success indication to the owner in step 984 or returns a failure indication in step 985.

Figure 9G:
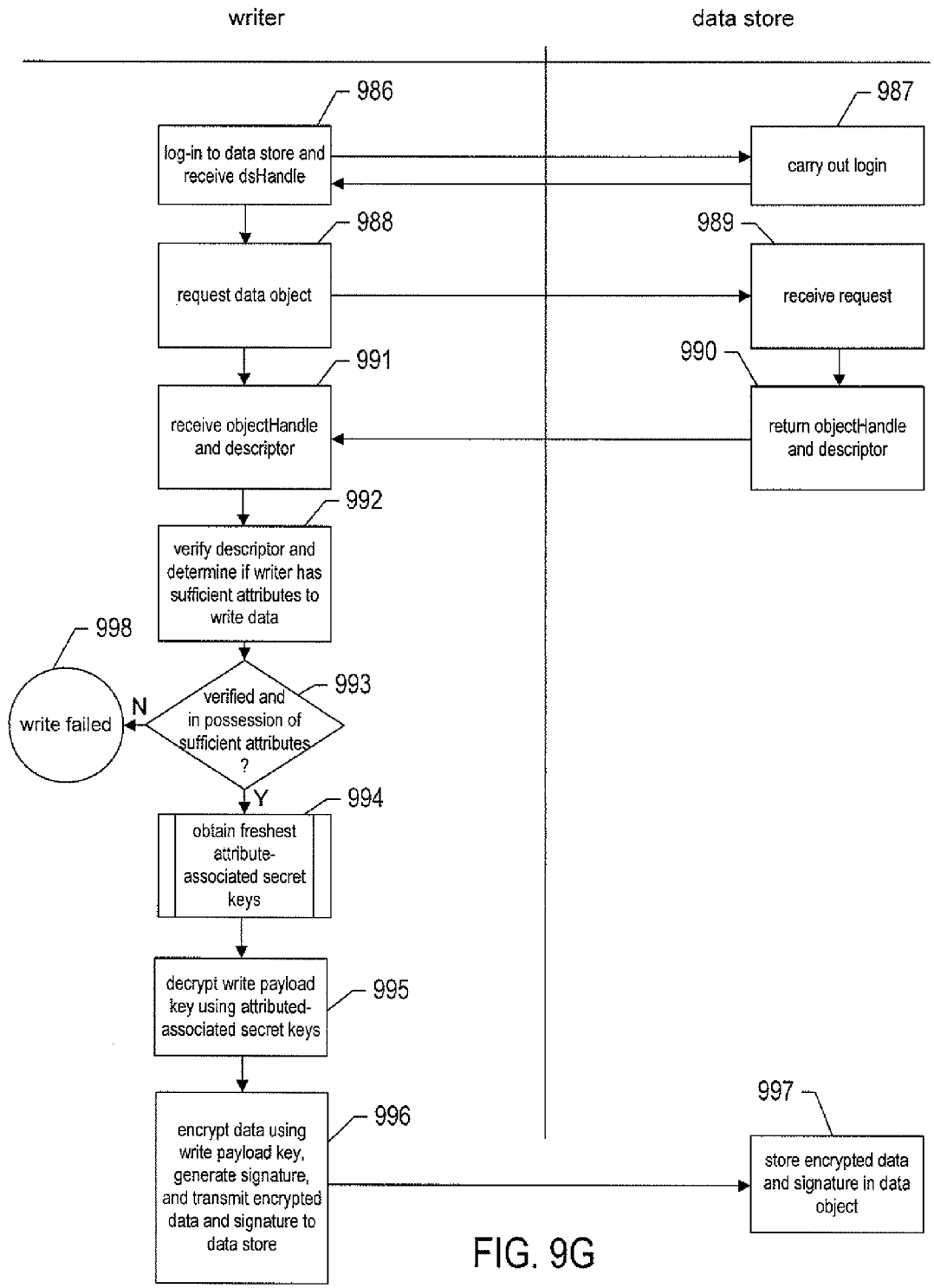

FIG. 9G provides a control-flow diagram for an interaction between a writer and the data store. In this interaction, the writer requests a data object from the data store for writing, carries out a WRITE operation, and returns the newly written data object to the data store. In step 986, the writer logs-in to the data store and, after an exchange of information with the data store, receives a dsHandle from the data store. The data store carries out the login transaction in step 987. In step 988, the writer requests a particular data object from the data store. Depending on the data store and the implementation, the data object can be requested in many different ways, including by furnishing a valid data-object ID, by furnishing a query or other description of the object, or by other means. In step 989, the data store receives the request and, in response to the request, finds and returns an objectHandle and data-object descriptor to the writer in step 990. In step 991, the writer receives the objectHandle and descriptor. In step 992, the writer verifies information in the data-object descriptor and determines whether or not the writer has sufficient attributes to write data to the data object. When the descriptor is verified and the writer possesses sufficient attributes to write to the data object, as determined in step 993, the writer obtains the freshest attribute-associated secret keys from the PBB, when necessary, in step 994 and decrypts the write payload key using the attribute-associated secret keys to satisfy the write policy, in step 995. In step 996, the writer encrypts data to be written to the data object, using the write payload key, generates a signature for the encrypted data, and transmits the encrypted data and signature to the data store. In step 997, the data store stores the encrypted data and the writer's signature in the data object. When the writer fails to verify the descriptor or has insufficient attributes, the write fails, in step 998.

Figure 9H:
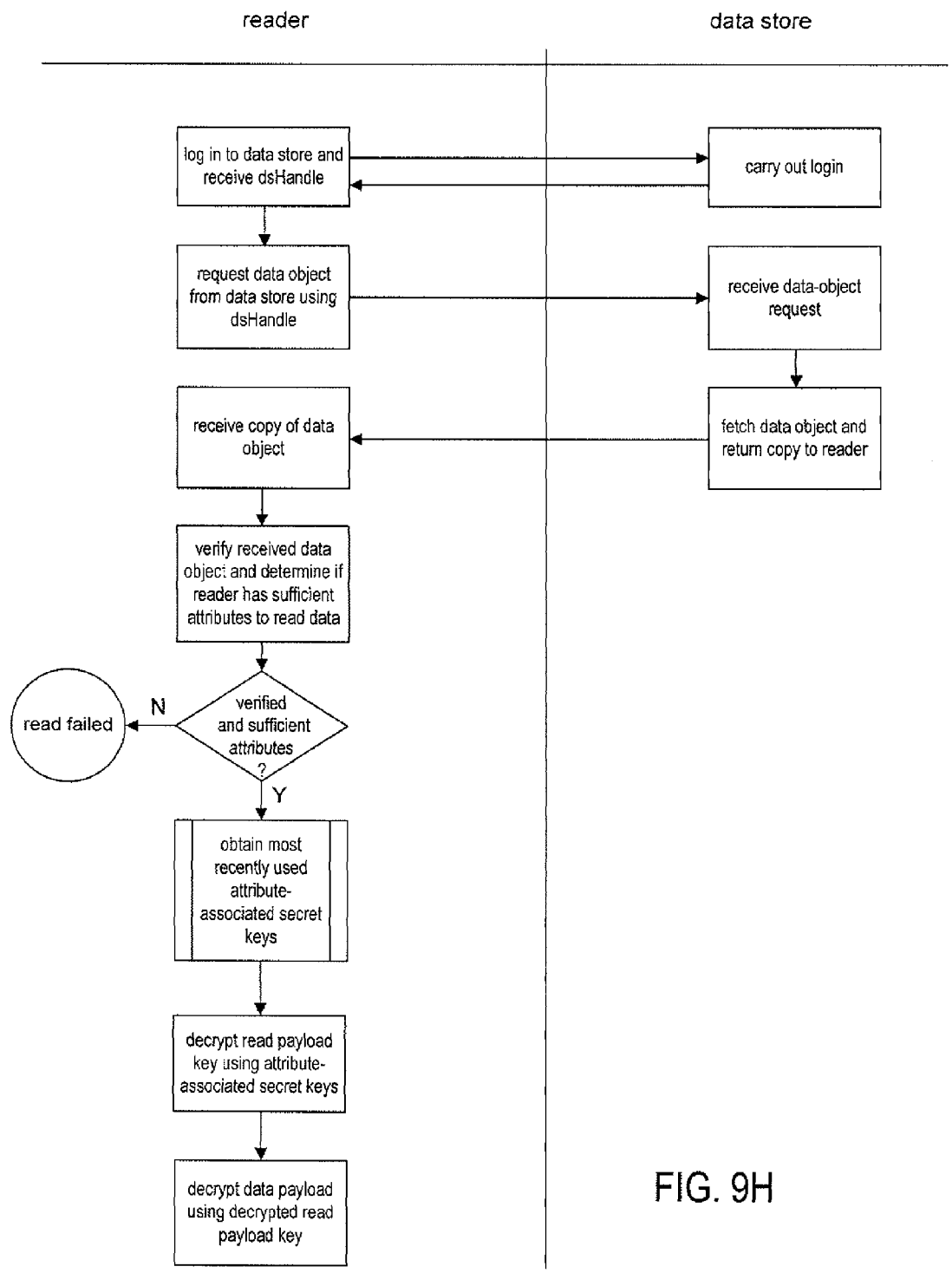

FIG. 9H provides a control-flow diagram of an interaction between a reader and the data store similar to the writer/data-store interaction for which a control-flow diagram is provided in FIG. 9G. In the interaction illustrated in FIG. 9H, the reader accesses a data object from the data store for read access.

To summarize the current discussion to the present point, an attribute-based access-control system includes one or more data-store components that store data objects that are owned by owners for access by users, including readers and writers. The data objects are stored so that the data-store component cannot access encrypted data within the data objects. Only readers and writers in possession of a sufficient set of secret keys associated with attributes acquired by the users can access a particular data object associated with an access policy expressed as a disjunction of attribute conjunctions. Users acquire attributes from a CRA and the secret keys associated with attributes from the CRA, generally via a PBB. Owners create data objects, define read and write access policies associated with data objects, determine the encryption methods by which data-payload keys are encrypted and by which data within data objects is encrypted. Owners also obtain certificates of ownership from a CRA. In FIGS. 9A-H, example interactions between the various participants and attribute-based access-control systems are described using control-flow diagrams.

The discussion up to the present point broadly characterizes desired features, organizations, and characteristics of an attribute-based access-control system. Next, a more detailed description of the interactions between users, readers, owners, and the data-store components of an attribute-based access-control system are described, along with detailed descriptions of the information maintained by the various entities, the information exchanged between the various entities, and the methods which provide certain of the features and characteristics described above.

Figure 10:
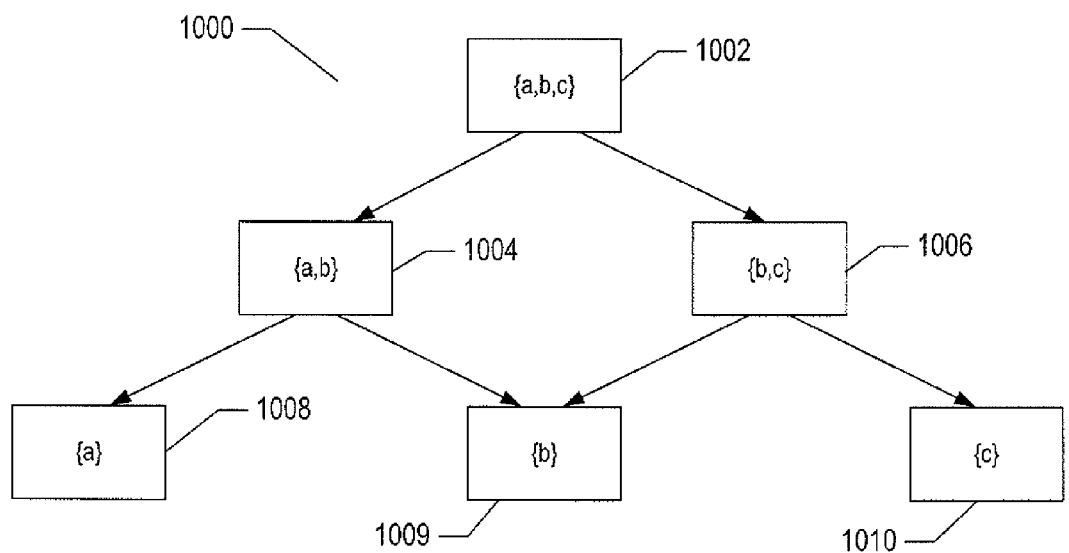
FIG. 10 illustrates a hierarchical-key-derivation graph.

FIG. 10 illustrates a hierarchical-key-derivation graph. This graph is explained in combination with an explanation of the hierarchical-key-derivation method for providing hierarchical encryption keys. The hierarchical encryption keys may be keys of any of various different types of encryption methods, including symmetrical-encryption keys used in symmetric encryption/decryption methods.

Hierarchical-key-derivation methods can be based on one-way functions. A one-way function $y=f(x)$ is a function for which it is difficult to find a corresponding inverse function $f^{-1}$ that allows a forward operation on x that produces y to be reversed or, using mathematical notation, $x=f^{-1}(y)$. One-way functions include encryption functions and cryptographic-hash functions.

Hierarchical-key-derivation methods seek to provide hierarchical sets of encryption keys to hierarchically structured groups and subgroups of users in a way that users at a particular point in the hierarchy can easily derive encryption keys for groups lower in the hierarchy based on an encryption key assigned to the group at the particular point in the hierarchy. In the following, assume a set of users $U_0$ in various partially ordered subsets of $U_0$, including $U_1, U_2, \ldots, U_n$ where $U_i \leq U_j$ when $U_i \subseteq U_j$. The partial-ordering relation "≤" indicates that the user subset on the left is lower in the hierarchy of user subsets, and, in a sense, less privileged, than the user subset on the right. The point of a hierarchical-key-derivation scheme is to be able to encrypt a message $M_1$ for a subgroup $U_i$ of $U_0$ such that any user $u \in U_i$ can decrypt $M_1$ and such that any user $u \in U_i$ can decrypt messages $M_2, M_3, \ldots$ encrypted for any subgroup $U_j$ of $U_i$. The hierarchical-key-derivation schemes are useful, for example, for encrypting messages directed to members of hierarchical organizations. One might, for example, wish to encrypt messages so that the encrypted messages can be decrypted and read only by a director of a group and encrypt messages so that the encrypted messages can be decrypted and read both by the director of the group and by members of the group.

In FIG. 10, the hierarchical-key-derivation graph 1000 comprises six nodes, each of which is labeled by a set of users, where the largest set of users is the set {a,b,c}. In a hierarchical-key-derivation ("HKD") scheme, an encryption key is associated with each node in the hierarchical-key-derivation graph. The encryption key associated with node 1002 would allow one in possession of the key to decrypt messages directed to the group {a,b,c} as well as to derive keys for decrypting messages to the subsets of this set associated with lower-level nodes. Thus, the key associated with node 1002 is essentially a master key with respect to the sets of users associated with nodes in the hierarchical-key-derivation graph. By contrast, one in possession of the encryption key associated with node 1004 would be able to decrypt messages encrypted with this key and directed to the subset of users {a,b} as well as to decrypt messages encrypted by the keys associated with nodes 1008 and 1009 used to encrypt messages for users a and b, respectively. When a group of users $U_i$ has encryption key $k_i$, then a member of group $U_i$ can derive an encryption key $k_j$ associated with a subgroup $U_j$ of $U_i$, where $U_j = U_i - U_k$, using the HKD function $f_{HKD}(\ )$, as follows:

$$k_{U_i - U_j} = f_{HKD}(U_i, U_k, k_i).$$

For example, $k_{\{a\}} = f_{HKD}(\{a,b,c\}, \{b,c\}, k_{\{a,b,c\}})$.

Figure 11:
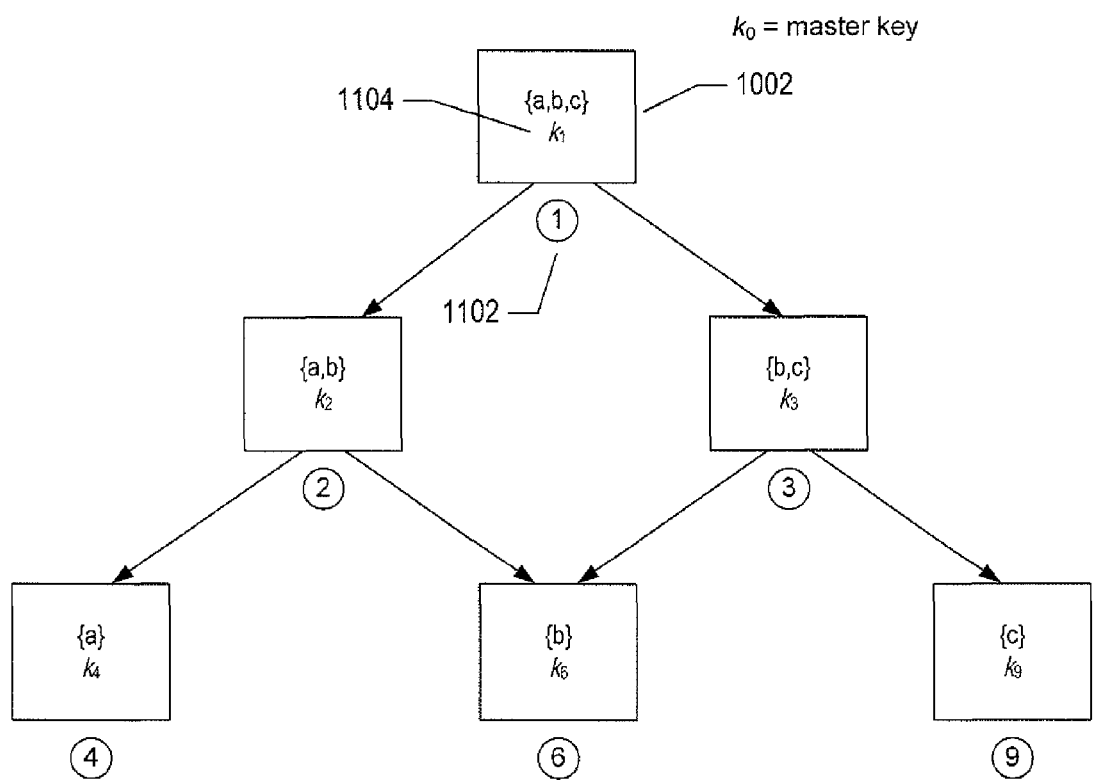
FIG. 11 illustrates how hierarchical keys can be derived for association with the nodes of the hierarchical-key-derivation graph of FIG. 10.

FIG. 11 illustrates how hierarchical keys can be derived for association with the nodes of the hierarchical-key-derivation graph of FIG. 10. In FIG. 11, each node of the hierarchical-key-derivation graph is additionally labeled with a circled integer, such as the circled "1" 1102 associated with node 1002. The hierarchical keys associated with each node are explicitly shown within the nodes in FIG. 11. Thus the key $k_1$ 1104 is associated with node 1002 and allows for decryption of messages encrypted with this key as well as for derivation of the keys associated with all of the lower-level nodes. The integers associated with the nodes have been computed so that, when the integer associated with node j is divisible, without remainder, by the integer associated with node i, then node $j \subset$ node i or, using a different notation, node i→node j. Next, a master encryption key $k_0$ is selected. Then, primes p and q are selected, with M=pq. Derivation of lower-level hierarchical keys is performed as follows:

$$k_i = f_i(k_0) = k_0^i \bmod M$$

where $i \in \{1, 2, 3, 4, 6, 9\}$.

With any lower-level key $k_i$ at hand, a key associated with a node j in a subgraph rooted at node i can be computed as follows:

$$k_j = k_i^{j/i} = [k_0^i]^{j/i} \bmod M$$

$[k_0^i]^{j/i} \bmod M$ is computable only for $j/i \in \{1, 2, \ldots\}$.

There are many additional HKD schemes. In many HKD schemes, the graph nodes do not represent hierarchically ordered subsets of users, as in FIGS. 10 and 11, but instead represent access policies. A graph of this type is provided in FIG. 12, described below. In one scheme, used in certain ABACDS implementations, each node $V_i$ in the graph that represents access policies is associated with a public label and a secret key, $l_i$ and $k_i$. Edges connecting nodes in the graph, where edge $E_{i,j}$ is the edge connecting nodes $V_i$ and $V_j$, are associated with public labels, such as public label $p_{i,j}$ associated with edge $E_{i,j}$. A pseudorandom function F and a bitwise exclusive OR ("XOR") operation relate keys in higher-level nodes to keys in lower-level nodes: $k_j = p_{i,j}$ XOR $F(k_i, l_j)$. Using this relation along a path through the graph connecting a higher-level node $V_i$ with a lower-level node $V_j$ allows an entity possessing the secret key associated with node $V_i$ to derive each secret key for the lower-level nodes along the path, including, in a last operation, the secret key associated with node $V_j$. There are many additional HKD schemes that use various different types of information and access-policy representations to allow for hierarchical key derivation.

Figure 12:
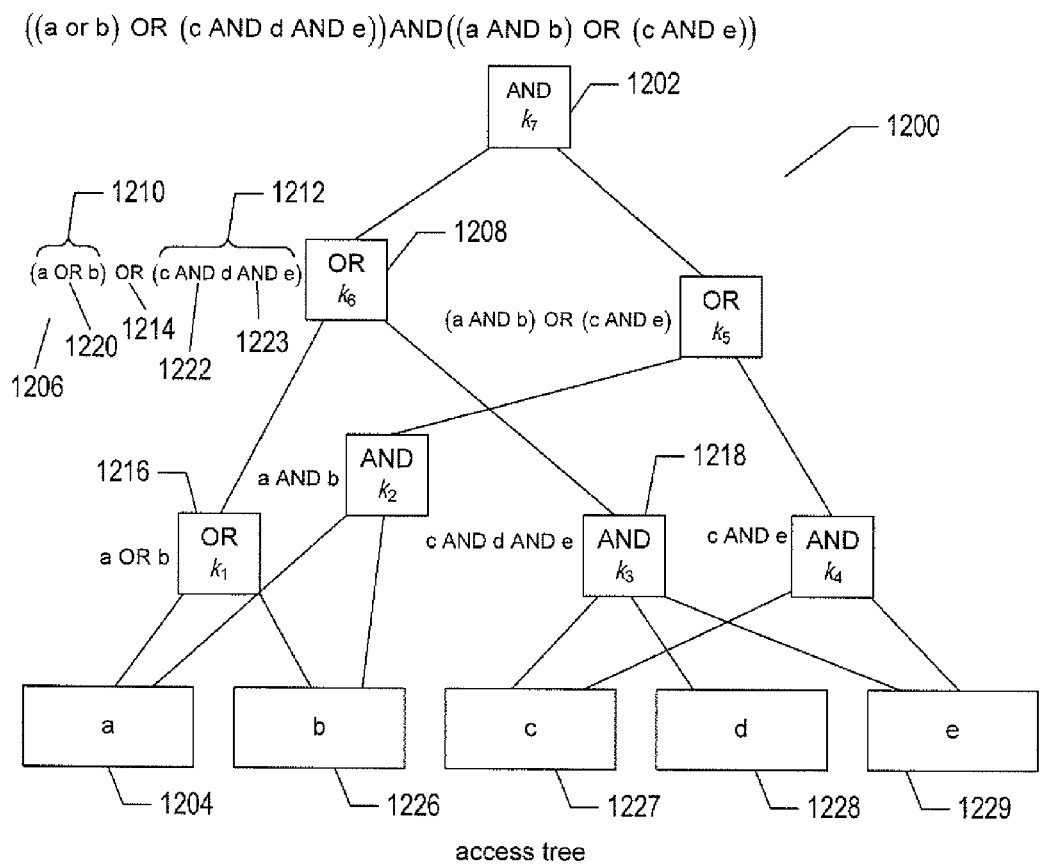
FIG. 12 shows a simple access tree for an attribute-based encryption scheme.

In addition to HKD encryption/decryption schemes, there are numerous implementations of attribute-based-encryption schemes. FIG. 12 shows a simple access tree for an attribute-based encryption scheme. In an attribute-based encryption ("ABE") access tree, each of the non-leaf nodes, such as root node 1202 in access tree 1200 of FIG. 12, represents a policy. The leaf nodes, such as leaf node 1204, each corresponds to an attribute. Thus, the access tree shown in FIG. 12 represents seven different policies based on five attributes. Consider, for example, policy 1206 associated with access-tree node 1208. This policy is a disjunction of two parenthesized Boolean expressions 1210 and 1212, each a conjunction. The node 1208 represents the "OR" disjunction 1214 between these two parenthesized expressions 1210 and 1212 in policy 1206. Node 1216 represents OR 1220 and node 1218 represents ANDs 1222-1223. Thus, the policy is built up by descending from node 1208 downward through interconnected lower-level nodes of the access tree. Finally, the attributes a, b, c, d, and e in policy 1206 are represented by the five leaf nodes of the access tree 1204 and 1226-1229, all descendants of nodes 1216 and 1218. Thus, the ABE access tree represents access policies, expressed as Boolean expressions, similar to the tree-like generalized representation of expressions created by parsers and compilers during expression evaluation.

The ABE scheme can be precisely represented as four functions: (1) $f_S(\ )$; (2) $f_E(M, A, PK)$; (3) $f_K(T, mk, PK)$; and (4) $f_D(C, k_T, A, PK)$, described below:

setup: $(PK, mk) \leftarrow f_s(\ )$
   where PK is a set of public parameters; and
   mk is a master key;

ENC: $C \leftarrow f_E(M, A, PK)$
   where C is an encrypted message;
   M is the corresponding clear-text message; and
   A is a set of attributes;

GetKey: $k_T \leftarrow f_K(T, mk, PK)$
   where T is an access subtree; and

DEC: $M \leftarrow f_D(C, k_T, A, PK)$ when T is satisfied by A.

The set up function $f_S(\ )$ returns a set of public parameters PK and a master key ink. Thus, set up is called as an initial step in deriving encryption keys corresponding to policies of an ABE encryption/decryption scheme. An encryption key corresponding to a particular node of an access tree, or policy represented by that node, is obtain by calling the $f_K(T, ink, PK)$ with T the access subtree rooted at the node for which the key is to be generated. The encryption function $f_E(M, A, PK)$ is called to encrypt a message M to produce an encrypted message C such that only a party associated with attributes A can decrypt encrypted message C. Finally, the decryption function $f_D(C, k_T, A, PK)$ is called by a decryptor holding key $k_T$ and attributes A in order to decrypt an encrypted message C. Decryption succeeds only when the policy represented by the node at the root of access subtree T is satisfied by the set of attributes A supplied by the decryptor. Essentially, a policy represented by an access subtree T is satisfied when the corresponding Boolean expression evaluates to true. The following is a short pseudocode routine, written in C++, that illustrates determination of whether an access subtree T is satisfied by a set of attributes A:

```
bool satisfied (accessTree T, attributes A)
{
    bool res;
    int rem;
```

-continued

```
    if (T.root( ).type( ) == LEAF) return (A.in(T.root( ).attribute( ));
    else if (T.root( ).type( ) == OR)
    {
        res = (satisfied(T.root( ).first( ), A) ||
            (satisfied(T.root( ).next( ), A);
        rem = T.root( ).numKids( ) - 2;
        while (rem-- > 0) res = res || satisfied(T.root( ).next( ));
        return res;
    }
    else
    {
        res = (satisfied(T.root( ).first( ), A) &&
            (satisfied(T.root( ).next( ), A);
        rem = T.root( ).numKids( ) - 2;
        while (rem-- > 0) res = res && satisfied(T.root( ).next( ));
        return res;
    }
}
```

Many ABE implantations are based on the decisional bilinear Diffie-Hellman assumption, described below in mathematical notation:

Given that
   $G_1$ and $G_2$ are multipliative cyclic groups of prime order p;
   g is a generator for $G_1$;
   e is a bilinear map from $G_1 \times G_1$ to $G_2$ such that
     for all U, V$\in G_1$ and a, b$\in \{-p+1, \ldots, 0, p-1\}$,
      $e(u^a, v^b) = e(u,v)^{ab}$; and
      $e(g,g) \neq 1$; and
   g, $g^a$, $g^b$, and $g^c$,
   it is difficult to determine whether w$\in G_2$ is or is not equal to $e(g,g)^{abc}$ Although various implementations of HKD encryption/decryption schemes and ABE encryption/decryption schemes have been developed and employed, the two different schemes have not been combined and used together to address cryptographic or stored-data-access problems. The ABE encryption/decryption community and the HKD community have, to date, worked in an assumed mutually exclusive fashion. However, as discussed below, a combination of ABE-like and HKD-like methods provides a new and efficient hybrid encryption/decryption method employed in ABACDSs, such as that shown in FIG. 1.

For an ABACDS, an HKD-like scheme is used to create a hierarchical set of keys corresponding to hierarchically ordered sets of attributes. A one-way HKD-like function $f_{HKD}(\ )$ is used to generate encryption keys associated with subsets of a set of attributes from an encryption key associated with the set of attributes. In other words:

$$k_{A-A'} = f_{HKD}(A, A', k_A)$$

where
   A is a set of attributes;
   $A' \subset A$;
   $k_A$ is a secret key associated with set A;
   $k_{A-A'}$ is a secret key associated with set $B = A - A' \subset A$.

An owner of one or more classes of data objects constructs, through interaction with the data store, a Hasse diagram in which nodes correspond to hierarchically arranged sets and subsets of attributes ("HD"). The owner associates read and write payload keys with nodes in the HD, as described further below. The HD constructed by an owner need only contain nodes onto which policies, generated by the owner, map, as described further below. A user, as discussed above, furnishes a set of attributes with which the user is associated to the data store in order to access a data object. In general, the data store returns an ABE-encrypted payload key associated with the highest-level HD node corresponding to the user's attributes.

Having obtained the ABE-encrypted payload key, the user can decrypt the ABE-encrypted payload key to obtain the HKD key for the highest-level HD node accessible by the user. Subsequently, the user can derive encryption keys for data objects associated with write policies mapped to any HD node within the HKD-graph subgraph rooted at the highest-level HD node for which the user originally received the ABE-encrypted key. This combination of ABE-like encryption/decryption with HKD-like encryption/decryption, provides, as discussed below, security similar to that of ABE encryption as well as the efficiency of HKD-like encryption/decryption.

In the current document, an ABE-like encryption/decryption system or method is a system or method that encrypts a message based on a particular access structure, also referred to as an "access policy," which comprises a set of one or more sets of attributes and that allows a user to decrypt an ABE-like encrypted message only when the user possesses secret keys corresponding to one of the attribute subsets within the access policy. In the current document, and HKD-like encryption system or method provides encryption keys for nodes of a hierarchical structure, such as the above-discussed Hasse diagram, in a way that, when a user posses an encryption key associated with a particular node in the hierarchical structure, the user is able to derive the encryption keys associated with any descendant nodes in the hierarchical structure. In the current document, the phrase "hybrid-attribute-associated/hierarchical-key-derivation encryption" refers to this combination of ABE-like encryption/decryption with HKD-like encryption/decryption. In the current document, particular examples of ABE encryption/decryption schemes and HKD-like encryption/decryption are provided, but it should be understood that the phrase "hybrid-attribute-associated/hierarchical-key-derivation encryption" refers to the combination of any of many different types of ABE-like encryption/decryption with any of many different types of HKD-like encryption/decryption.

Many ABACDSs use an HKD-like scheme that differs from previous HKD encryption/decryption schemes. The HD that is constructed within the data store for each owner of data objects is a representation of the power set of the entire set of attributes used by the owner to derive all of the owner's read and write policies for data-object classes, with unused nodes pruned. In certain cases, when the owner owns classes or sets of classes with largely distinct sets of associated attributes, the owner and data store may construct multiple HDs for the owner. In the following discussion, it is assumed that the owner and data store construct a single HD for all of the owner's data-object classes. Next, a graphical representation of a power set of a set of attributes $A=\{a,b,c,d\}$ is described. The power set of A, P(A), is the set of all subsets of A. For $A=\{a, b,c,d\}$:

$$P(A) = \begin{Bmatrix} \emptyset, \{a\}, \{b\}, \{c\}, \{d\}, \{a, b\}, \{a, c\}, \{a, d\}, \\ \{b, c\}, \{b, d\}, \{c, d\}, \{a, b, c\}, \{a, b, d\}, \{a, c, d\}, \\ \{b, c, d\}, \{a, b, c, d\} \end{Bmatrix}$$

Figure 13:
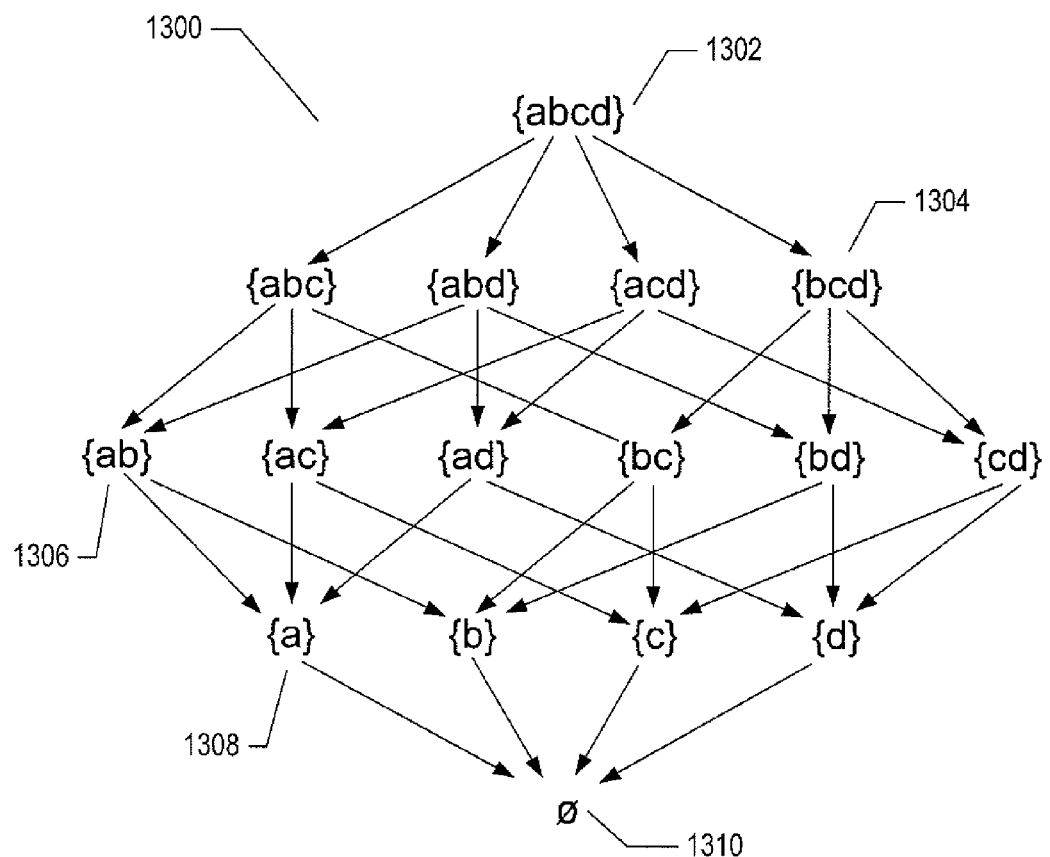
FIG. 13 shows a Hasse diagram of a power set.

FIG. 13 shows a Hasse diagram of P(A), partially ordered by set inclusion, where X→Y means that Y⊂X. The root node 1302 of the Hasse diagram 1300 is the set that include all of attributes a,b,c, and d. The second-level nodes, such as node 1304, are each associated with three-member sets of attributes. The third-level nodes, such as node 1306, are each associated with sets containing two attributes. The fourth-level nodes, such as node 1308, each contain a single attribute. The lowest-level node is the empty set 1310.

Figure 14:
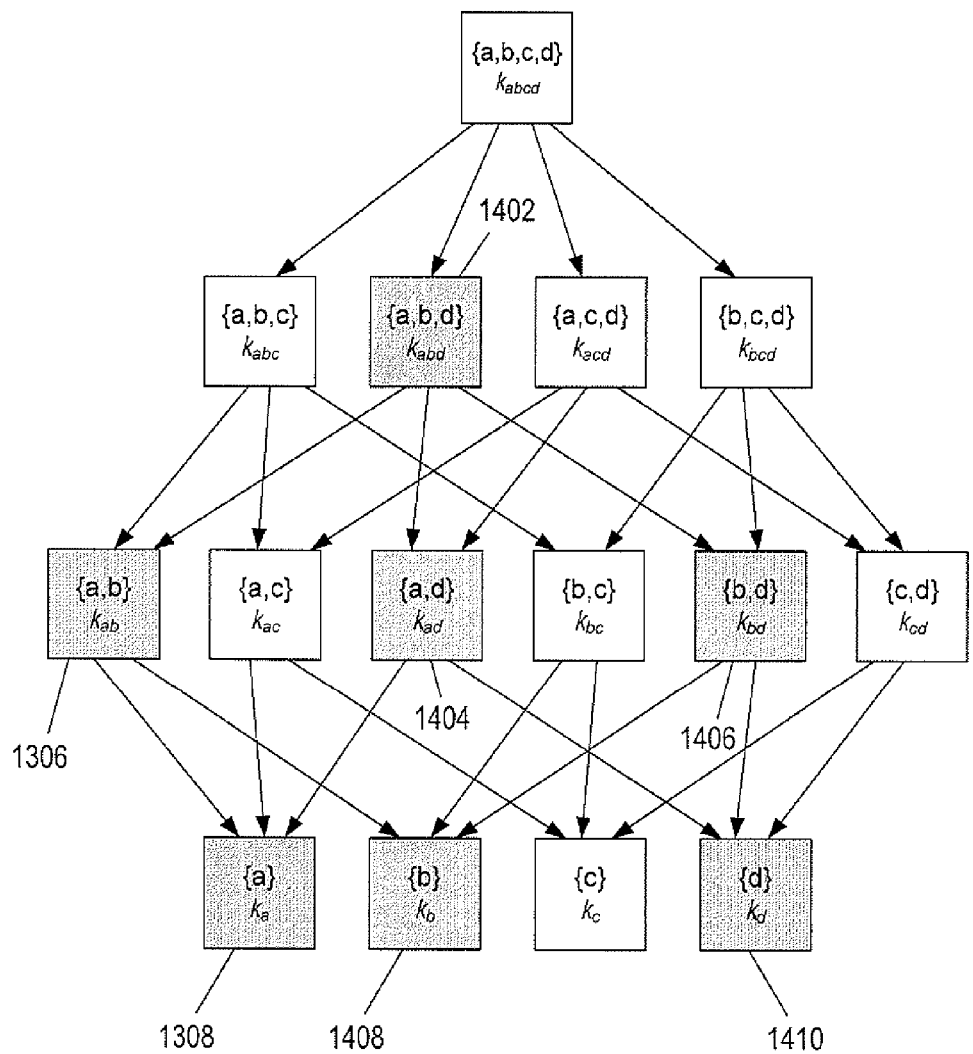
FIG. 14 illustrates use of the Hasse diagram shown in FIG. 13 as an HD.

FIG. 14 illustrates use of the Hasse diagram shown in FIG. 13 as an HD. In the example shown in FIG. 14, assume that a user is associated with attributes $\{a,b,d\}$ and has been provided the HKD encryption key $K_{abd}$ by the data store. The user can then straightforwardly derive keys for all subsets to which the user can navigate downward in the HD from the node associated with attributes $\{a,b,d\}$ 1402 along arrows indicating set inclusion. Thus, the user can derive the keys $K_{ab}$ associated with node 1306, $K_{ad}$ associated with node 1404, $K_{bd}$ associated with node 1406, $K_a$ associated with node 1308, $K_b$, associated with node 1408, and IQ associated with node 1410. Expressing these derivations in terms of the HKD function $f_{HKD}()$, discussed above, the keys are derived as follows:

$$\text{key}_{ab}=f_{HKD}(\{a,b,d\},\{d\},K_{abd}) \ \text{key}_a=f_{HKD}(\{a,b\},\{b\}, \text{key}_{ab})=f_{HKD}(\{a,b,d\},\{b,d\},\text{key}_{abd})$$

$$\text{key}_{ad}=f_{HKD}(\{a,b,d\},\{b\},K_{abd}) \ \text{key}_b=f_{HKD}(\{a,b\},\{a\}, \text{key}_{ab})=f_{HKD}(\{a,b,d\},\{a,d\},\text{key}_{abd})$$

$$\text{key}_{bd}=f_{HKD}(\{a,b,d\},\{a\},K_{abd}) \ \text{key}_d=f_{HKD}(\{b,d\},\{b\}, \text{key}_{bd})=f_{HKD}(\{a,b,d\},\{a,b\},\text{key}_{abd})$$

Note that the functional notation, used above, is meant to generically represent any of the various HKD schemes, including schemes that involve multi-step traversals of paths within the HD and stepwise key derivations, as described above.

Figure 15:
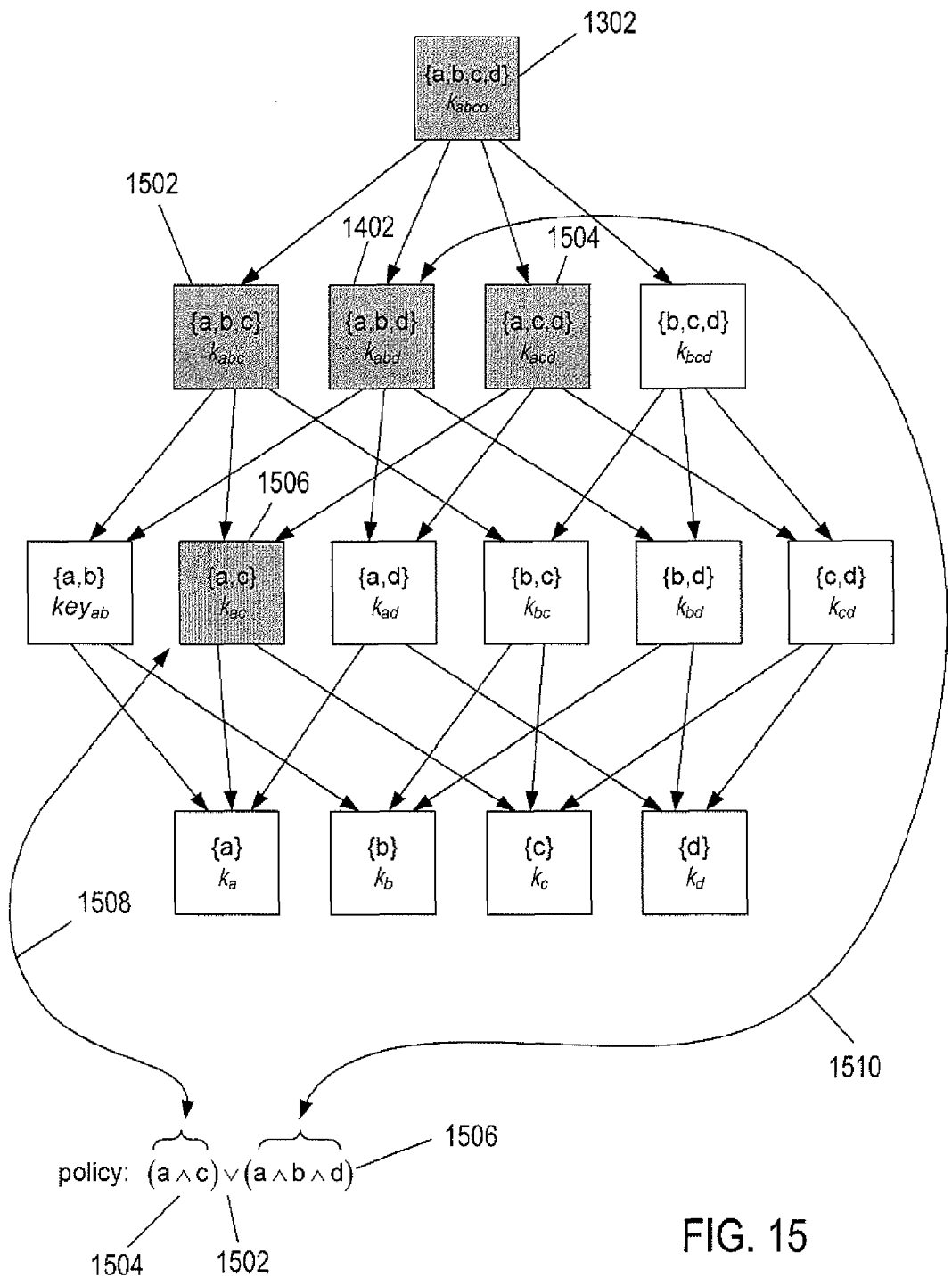
FIG. 15 illustrates mapping of an access policy, expressed as a Boolean expression, to the nodes of the HD of FIGS. 13-14.

FIG. 15 illustrates mapping of an access policy, expressed as a Boolean expression, to the nodes of the HD of FIGS. 13-14. The policy 1502 is written in DNF and is a disjunction of a two-term conjunction 1504 and a three-term conjunction 1506. The policy is directly mapped to HD nodes by mapping each conjunction to an HD node associated with the set of attributes within the conjunction, as indicated in FIG. 15 by double-headed arrows 1508 and 1510. A user associated with attributes included in the set of attributes associated with any node in the HD to which a policy maps has sufficient attributes to satisfy the policy. For example, as shown in FIG. 15 by shading nodes 1302, 1402, 1502, 1504, and 1506, a user associated with a set of keys that includes all of the keys associated with any of the shaded nodes 1302, 1402, 1502, 1504, and 1506 has sufficient attributes to satisfy write policy 1502. This result, of course, follows from the fact that, when any conjunction within a Boolean expression written in DNF form is true, the entire Boolean expression evaluates to true. Thus, a user with attributes $\{a,b,c,d\}$ who has obtained the HKD encryption/decryption key $K_{abcd}$ can derive any of the other HKD encryption/decryption keys associated with nodes in the HD FIGS. 14-15. The user would obtain the highest-level key $K_{abcd}$ in an attribute-associated-encrypted form from the data store, decrypt the encrypted HKD key using attribute-associated decryption, and then generate all of the lower-level HKD keys using the key-derivation function $f_{HKD}()$. Similarly, a user with attributes $\{a, b,d\}$ who has obtained the HKD encryption/decryption key $K_{abd}$ can derive the HKD encryption/decryption keys associated with nodes reachable from node 1402 in the HD of FIGS. 14-15.

Two new encryption/decryption methods have been developed for attribute-based access-control systems. The first encryption/decryption method is referred to as "asymmetric cryptography with no public key and two private keys" ("A2SK"). As discussed above, the RSA encryption/decryption method employs a public key used for encryption and a private key used for decryption. The A2SK method is similar to the RSA method, except that two secret keys are generated, one for writing data payloads and one for reading encrypted data payloads. The A2SK method is described succinctly as follows:

select secret primes p and q;
compute n=pq;

$$\phi(n)=(p-1)(q-1);$$

select large random e and compute d such that ed=1 mod $\phi(n)$;

$$k_w=(e,n)(\text{secret});$$

$$k_r=(d,n)(\text{secret});$$

$$C=(\text{OAEP}(M))^e \mod n=\text{ENC}(M,k_w);$$

$$M=\text{OAEP}^{-1}(C^d \mod n)=\text{DEC}(C,k_r).$$

Thus, in the RSA method, the secret key is (d,n,p,q) while, in A2SK, the secret read key $k_r$ is (d,n). In the RSA method, given the secret key, it is not difficult to compute a corresponding public key. By contrast, in the A2SK method, the write key $k_w$ is not easily derived from the read key $k_r$ and the read key $k_r$ is not easily derived from the write key $k_w$. The A2SK method is one method for encrypting write and read payload keys. Other methods use the SignCrypt protocol and/or reader and writer certificates.

Figure 16A:
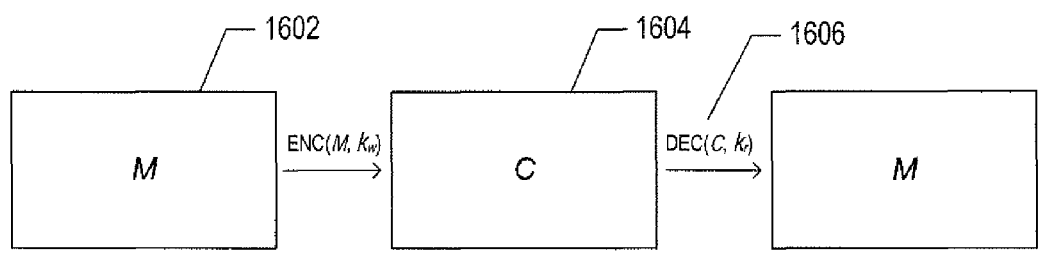
FIG. 16A illustrates the asymmetric-cryptography-with-no-public-key-and-two-private-keys method of one implementation of an attribute-based access-controlled data-storage system to which the current application is directed.

FIG. 16A illustrates the A2SK method. A clear text data payload M 1602 can be encrypted, using the secret write key $k_w$, to produce encrypted data payload C 1604. Note that a writer having only the write secret key $k_w$ cannot decrypt and read an encrypted data payload that has been encrypted with write key $k_w$. A reader can, however, decrypt and read the encrypted data payload 1604 using the secret read key $k_r$ 1606. Thus, A2SK provides two secret keys for encryption and decryption, respectively, of data payloads. The write key $k_w$ is encrypted using the hybrid ABE-like/HKD-like encryption method so that only a user with attributes that satisfy the write policy associated with a data object can decrypt the encrypted write payload key $k_w$ and use the key to encrypt data for storage in the data object. Similarly, the corresponding read key $k_r$ is encrypted using hybrid ABE-like/HKD-like encryption and can be decrypted and used only by a user with attributes that satisfy the read policy for a data object containing a data payload encrypted using the corresponding write key $k_w$.

A second new encryption/decryption method is referred to as "policy encryption" ("PE"). Policy encryption is an ABE-like encryption/decryption method, but is significantly more efficient than ABE encryption. In this discussion, ABE and PE are both described as "attribute-associated" encryption/decryption methods.

Consider a set of attributes A={$a_1, a_2, \ldots, a_n$}. In policy encryption, each attribute $a_i$ is associated with public/private key pair $p_i/s_i$. Policy encryption provides the encryption function PE( ) and a corresponding decryption function PD( ), described as follows:

$$C=\text{PE}(M,\text{policy},P)$$

where P is the set of public keys $p_i$ for attributes $a_i$ which occur in access policy policy;

$$M=\text{PD}(C,\text{policy},S)$$

where S is the set of secret keys $s_i$ for attributes $b_i$ associated with a decryptor;
when S satisfies the policy, M←PD (C, policy, S)
otherwise, PD (C, policy, S) fails.
The encryption function PE( ) comprises two steps, described below with an example:

PE( ):

$$\text{policy}=(a \wedge b \wedge c) \vee (a \wedge d) \vee (e)$$

step 1—replace each OR in policy with concatenation operator $$\text{policy}=(a \wedge b \wedge c) \| (a \wedge d) \| (e)$$

step 2—replace each conjunction with nested encryption (in a well-determined order in certain cases, but the order is not important for implementations based on RSA and ECIES encryption/decryption)

$$C = \text{ENC}(\text{ENC}(\text{ENC}(M, P_c), P_b), P_a) \| \text{ENC}(\text{ENC}(M, P_d), P_a) \| \text{ENC}(M, P_e)$$

$$= C_1 \| C_2 \| C_3$$

where the notation p indicates the public encryption key p associated with attribute c.

The policy, written in DNF form, is stepwise transformed into a specification for nested encryption. In the first step, each OR operator in the Boolean expression in DNF form corresponding to the policy is replaced with the concatenation operator "∥." Thus, the policy becomes the concatenation of the conjunctions of the policy. In a second step, each conjunction in the partially transformed policy is replaced with a nested encryption in some well-determined order, such as the nested-encryption order used in the above example. In order to decrypt a message encrypted using policy encryption, the decryptor needs to hold all of the attributes within one conjunction of the policy expressed in DNF. Having these attributes, the user can obtain the corresponding private keys for the attributes and successively decrypt the nested encryption corresponding to the conjunction for which the user holds all attributes. Policy decryption is described, using the example used in the description of policy encryption, as follows:

PD( ):

$$S=\{a,b,c,d\}$$

$$\text{policy}=(a \wedge b \wedge c) \vee (a \wedge d) \vee (e)$$

step 1—select conjunction of policy with fewest terms that is a subset of S $$(a \wedge b \wedge c) \subseteq S$$

$$(a \wedge d) \subseteq S$$

$$(e) \subset S$$

select$(a \wedge d)$;

step 2—extract from C the portion $C_2=\text{ENC}(\text{ENC}(M,P_d),P_a)$;
step 3—decrypt in reverse order $$\text{ENC}(M,P_d) \leftarrow \text{DEC}((\text{ENC}(\text{ENC}(M,P_d),P_a),S_a)$$

$$M \leftarrow \text{DEC}(\text{ENC}(M,P_d),S_d).$$

Figure 16B:
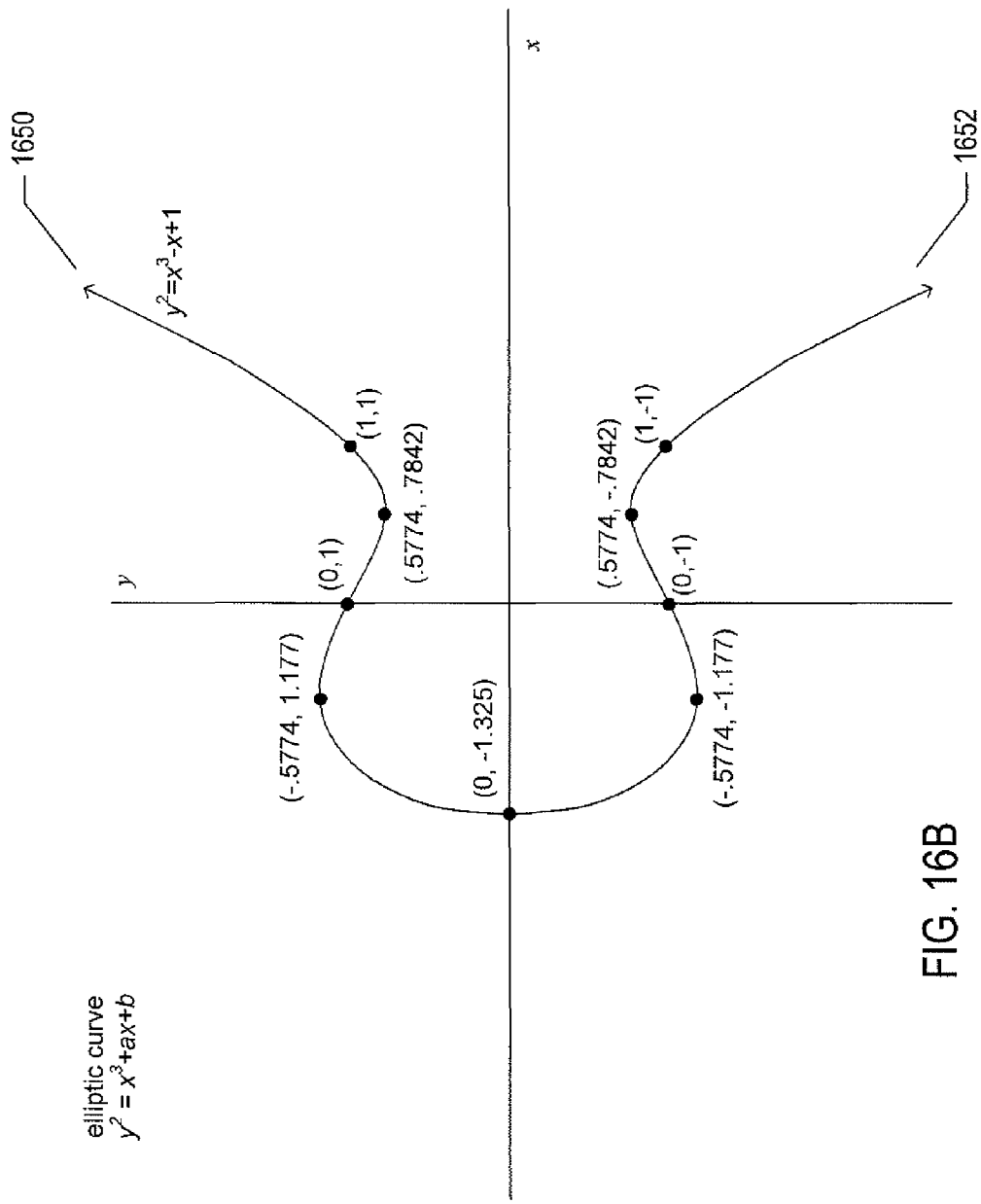
FIGS. 16B-E provide an illustration of the generation of a finite group for the rational field based on a simple elliptic curve.

Finite groups based on elliptic curves provide the foundation for various types of cryptographic methods. FIGS. 16B-E provide an illustration of the generation of a finite group for the rational field based on a simple elliptic curve. FIG. 16B provides a plot of a portion of a well-known elliptic curve $y^2=x^3-x+1$. A large class, or family, of elliptic curves used in cryptography can be expressed in the form:

$$y^2=x^3+ax+b$$

where x, y, a, b∈R

In certain cases, when the discriminant $\Delta=-16\,(4a^3+27\,b^2)$ is positive, a plot of the elliptic curve produces two, non-intersecting components while, as in the case of the elliptic curve plotted in FIG. 16B:

$$y^2 = x^3 - x + 1$$

where
  a=−1; and
  b=1, for which the discriminant is negative, only a single component obtains. The arrows 1650 and 1652 at the ends of the portion of the curve plotted in FIG. 16B indicate that the curve continues upward and downward, respectively. Because the y term is squared, the curve is bilaterally symmetric with respect to the x axis. Elliptic curves have a more general form derived from algebraic topology, which is beyond the scope of the current application.

Figure 16C:
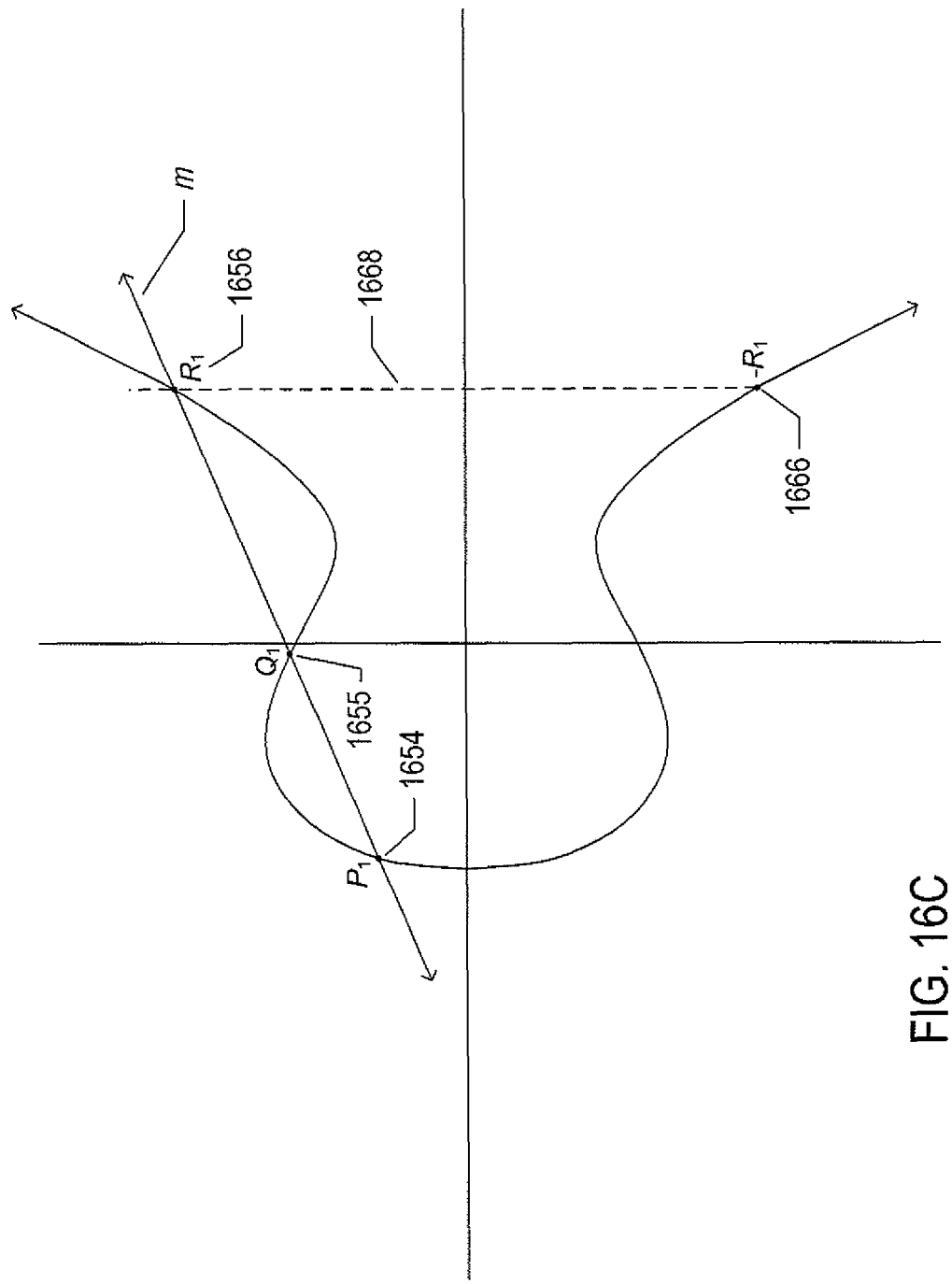
Figure 16D:
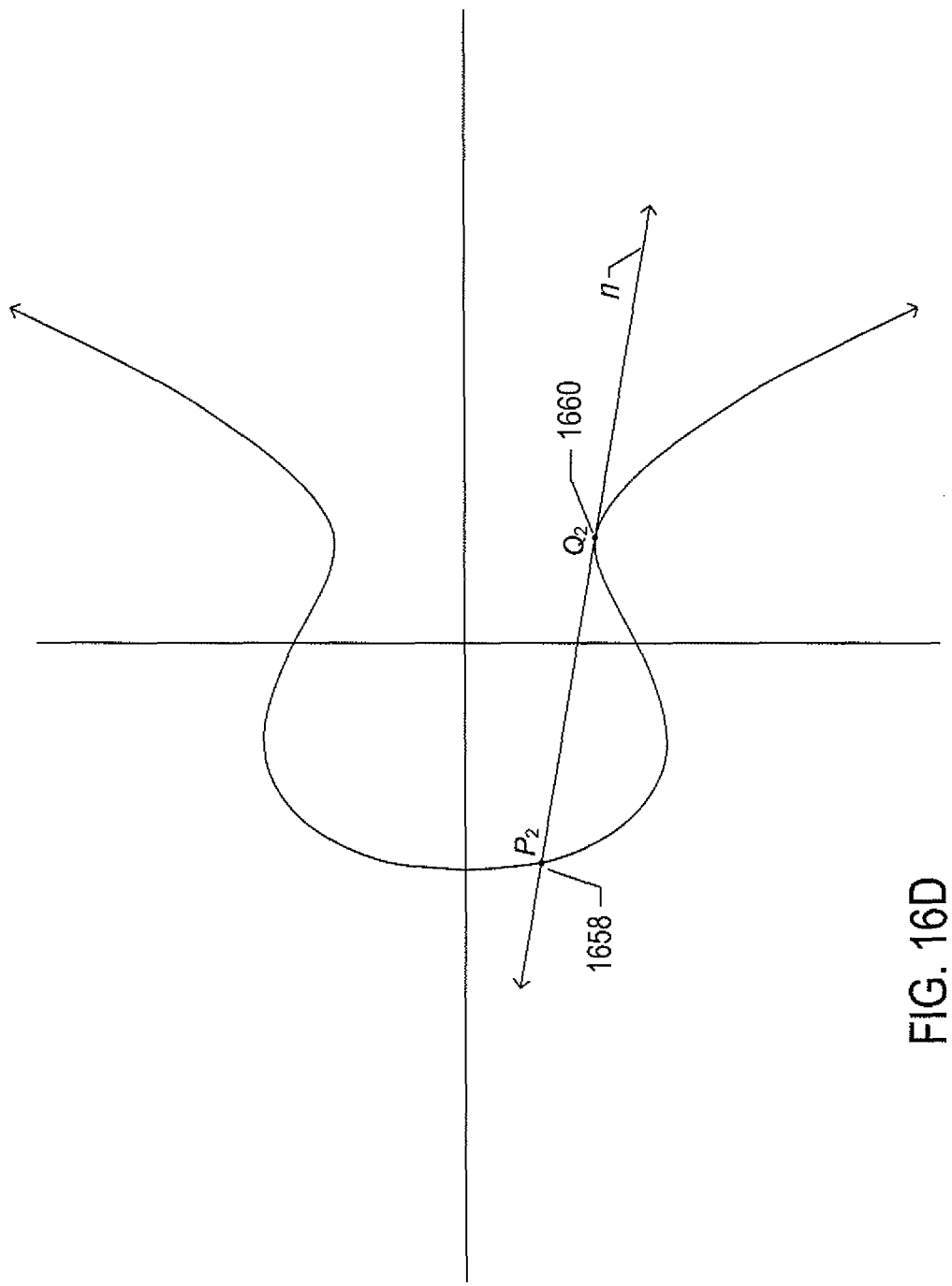
Figure 16E:
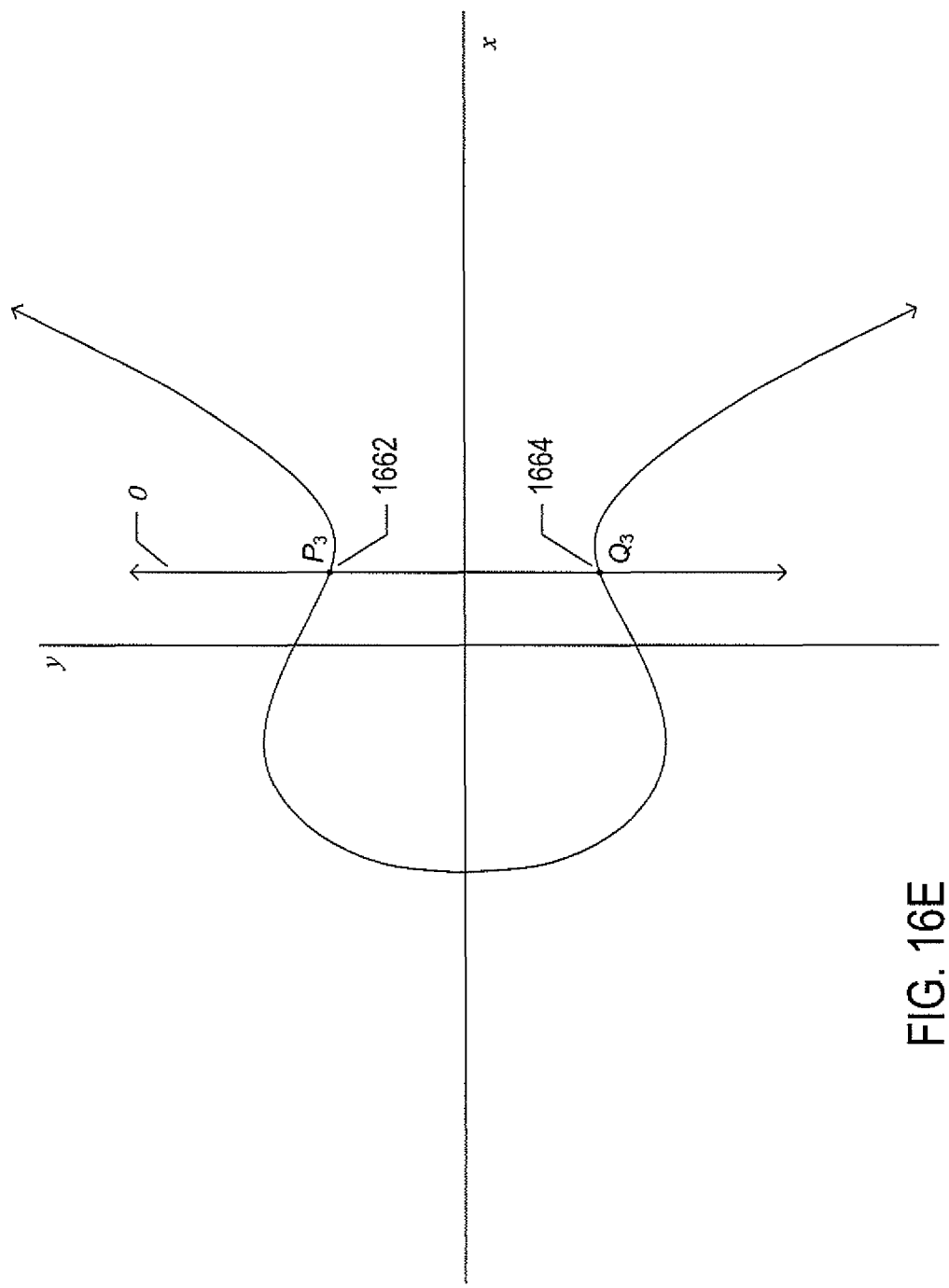

A finite group of points with rational coordinates can be generated from an elliptic curve, such as the elliptic curve plotted in FIG. 16B. FIGS. 16C-E illustrate the principal by which the group can be generated. First, the elliptic curve is extended to include a point at infinity, denoted as "0." This point is the identity for the group of points with respect to the group operation "+." The group operation "+" can be geometrically constructed, as shown in FIGS. 16C-E. The operation involves drawing straight lines that intersect the elliptic curve. As shown in FIG. 16C, a straight line m may intersect the elliptic curve at a maximum of four points, $P_1$ 1654, $Q_1$ 1655, and $R_1$ 1656 as well as the point at infinity 0. In another case, shown in FIG. 16D, a straight line n may intersect the elliptic curve at only two points, $P_2$ 1658 and $Q_2$ 1660. In yet an additional case, shown in FIG. 16E, the straight line o may be parallel to the y axis and intersect the elliptic curve at points $P_3$ 1662 and $Q_3$ 1664. These three cases provide the following equations from which the operation "+" can be derived:

$$P_1 + Q_1 + R_1 = 0 \Rightarrow P_1 + Q_1 = -R_1$$

$$P_2 + Q_2 + Q_2 = 0$$

$$P_3 + Q_3 = 0$$

As shown in FIG. 16C, since $P_1+Q_1+R_1=0$, $P_1+Q_1=-R_1$, where the inverse of point $R_1$ 1656 is obtained by reflecting point $R_1$ in the x axis to generate point $-R_1$ 1666, as indicated in FIG. 16C by dashed line 1668.

When the coefficients a and b in the expression for the elliptic curve are rational, and the initial points P and Q have rational coordinates, then all points generated by the "+" operation also have rational coordinates. There are finite fields of rational numbers that can be generated so that points with coordinates that are elements of the finite field form a group under the "+" operation discussed above. An additional multiplication operator "*" may be defined for scaler, integer multiplication of a point:

$$n*P = P + P + \ldots + P$$

where the number of "+" operations on the right side is equal to n.

These finite groups of points with rational coordinates provide various types of one-way operations. For example, given a point in the group $P_3$ and a large integer k, it is straightforward to compute $k*P_1$, but given $k*P_1$ and the point $P_1$, it is very difficult to compute k. Such one-way computations provide the basis for various cryptographic methods and operations. For example, the integer k, in the above example, is an attractive candidate for a secret key.

An even more efficient, second type of policy encryption is based on the elliptic curve integrated encryption scheme ("ECIES"). A modification to the ECIES, referred to as "modified ECIES" ("MECIES") provides an implementation of policy encryption. The MECIES encryption/decryption scheme is described concisely as follows:
An elliptic curve is parametrically defined as: (p, a, b, G, n, h)
  where
    p is the order of a finite field;
    a and b are coefficients of a polynomial of degree 3 in x and degree 2 in y, $y^2=x^3+ax+b$;
    G is a generator of a subgroup;
    n is the number of members in the subgroup; and
    nh is total number of members of the group.
A user has attribute-associated public/private key pairs $K_1/k_1$, $K_2/k_2, \ldots, K_m/k_m$
  where $(K_1+K_2+ \ldots +K_m) = (k_1+k_2+ \ldots +k_m)\,G$; and
  + is the group operations.
An owner generates $r \in [1, n-1]$ such that $R=rG$, where R is an elliptic-curve point;
  generates $P=(P_x, P_y)=r\,(K_1+K_2+ \ldots +K_m)$
  where P is an elliptic-curve point ≠0, the point of infinity;
  assigns secret $S=P_x$;
  transforms S, using the key derivation function ("KDF"), 5' to produce $k_E$,
  where $k_E$ is a symmetric-encryption key;
  encrypts payload key $K_{PL}$, $C=\mathrm{ENC}\,(K_{PL}, k_E)$; and
  stores encrypted payload key as R∥C.
The user accesses data object and extract encrypted payload key R∥C;
  generates $P=(k_1+k_2+ \ldots +k_m)\,R$
  where this expression is derived by $$P = (k_1 + k_2 + \ldots + k_m)R$$
$$= (k_1 + k_2 + \ldots + k_m)rG$$
$$= r(k_1 + k_2 + \ldots + k_m)G$$
$$= r(K_1 + K_2 + \ldots + K_m),$$

which is the expression used by the owner;
  assigns $S=P_x$;
  $k_e = \mathrm{KDF}(S)$
  $K_{PL} = \mathrm{ENC}^{-1}(C, k_e)$.

As in the above-described policy encryption, attributes are associated with public/private key pairs. The public keys are used by an owner to generate a point on an elliptic curve T, the x coordinate of which is assigned to secret S. The owner applies KDF function to S in order to produce the symmetric encryption key $k_E$, which the owner uses to encrypt a payload key $K_{PL}$. As shown above, the user can decrypt the encrypted payload key $K_{PL}$ using the secret keys association with the user's attributes. If the user does not have secret keys associated with each attribute used in the encryption by the owner, the decryption fails. Thus, MECIES provides policy-encryption functionality, but uses an elliptic-curve-based implementation rather than the nested-encryption-based method discussed above for the first implementation of policy encryption.

Policy encryption is a more efficient alternative to traditional ABE encryption. Policy encryption does not provide as secure a system as ABE encryption with respect to collusion among users with different attributes, explained in more detail below. However, by using additional attributes and by using ABE encryption for nodes and subtrees where collusion needs to be prevented and using PE encryption of other nodes and subtrees, policy encryption provides efficient encryption/decryption with sufficient security for many attribute-based access-control systems.

Figure 17:
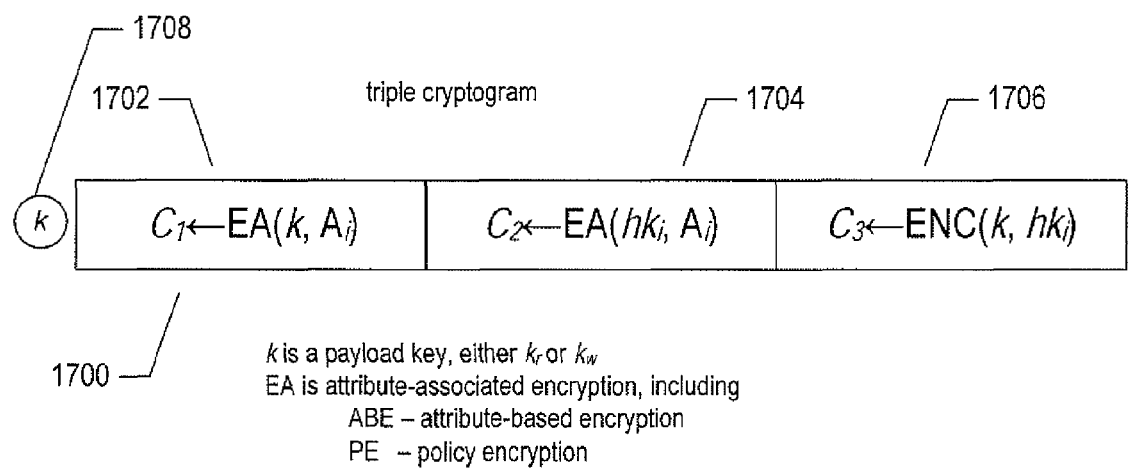
FIG. 17 illustrates a triple cryptogram that represents an encrypted payload key within a data object according to one implementation of an attribute-based access-controlled data-storage system to which the current application is directed.

At this point, the contents of the encrypted read payload key and encrypted write payload key (810 and 812 in FIG. 8) can be described in greater detail, in the context of one attribute-based access-control system implementation. In one implementation, each of the encrypted payload keys is a triple cryptogram. FIG. 17 illustrates a triple cryptogram that represents an encrypted payload key within a data object according to one implementation of an attribute-based access-controlled data-storage system to which the current application is directed. A triple cryptogram 1700 includes three different encrypted values $C_1$ 1702, $C_2$ 1704, and $C_3$ 1706. The notation "$EA(k, A_i)$" refers to an attribute-associated encryption operation of a payload key k by an attribute-associated-encryption method, such as attribute-based encryption ("ABE") or policy encryption ("PE"), both of which are discussed above. In this notation, the term "$A_i$" refers generally to attributes, indicating that the decryptor must furnish attributes to carry out decryption. In the described system, the decryptor acquires attributes and then acquires corresponding secret keys for the attributes which are furnished to a decryption function. As discussed above, in order to carry out attribute-associated encryption, a set of attributes $A_i$ that satisfies an encryption/decryption policy is furnished, along with the payload key to be encrypted, to an attribute-associated encryption method. The first part of the triple cryptogram, $C_1$, is a payload encryption and/or decryption key k, where the encryption is carried out by attribute-associated encryption with respect to a set of attributes $A_i$. The second portion of the triple cryptogram, $C_2$, is an encrypted HKD key for the HD node associated with the set of attributes $A_i$. The HKD key $hk_i$ is encrypted using attribute-associated encryption. The third portion of the triple cryptogram $C_3$ is the payload key encrypted using a symmetric encryption scheme and the HKD key $hk_i$. The third portion, $C_3$, may be initially blank, prior to calculation and return of $C_3$ by a user who accesses the data object for the first time, in certain implementations of the ABACDS. In alternative implementations, a double cryptogram including fields 1704 and 1706 may be used, rather than a triple cryptogram, for representing an encrypted read payload key or encrypted write payload key.

FIG. 18 illustrates the information, related to payload-key encryption, stored within an HD that represents access policies for one or more data object classes in an ABACDS to which the current application is directed. In each node of the HD corresponding to a write policy of a data-object class owned by the owner which generated the HD in cooperation with a data store, the data store maintains a triple-cryptogram encryption of the most recently distributed write payload key $k_w$ 1802. In each node of the HD corresponding to a read policy of a data-object class, the data store stores the most recently distributed read payload key encrypted as a triple cryptogram 1804 as well as previously distributed triple-cryptogram encryptions of read keys 1806 needed to decrypt any encrypted payload for any data object of a data-object class owned by the owner. These are the read keys corresponding to the most-recently used write keys for the data-object class. In general, a set of triple-cryptogram-encrypted read payload keys, indexed by object ID, as shown in FIG. 18, is stored for each data-object class. Each time a data object is written, the read payload key corresponding to the current write payload key of the data object is associated with the object ID of the data object in HD nodes, as shown in FIG. 18.

Figure 19:
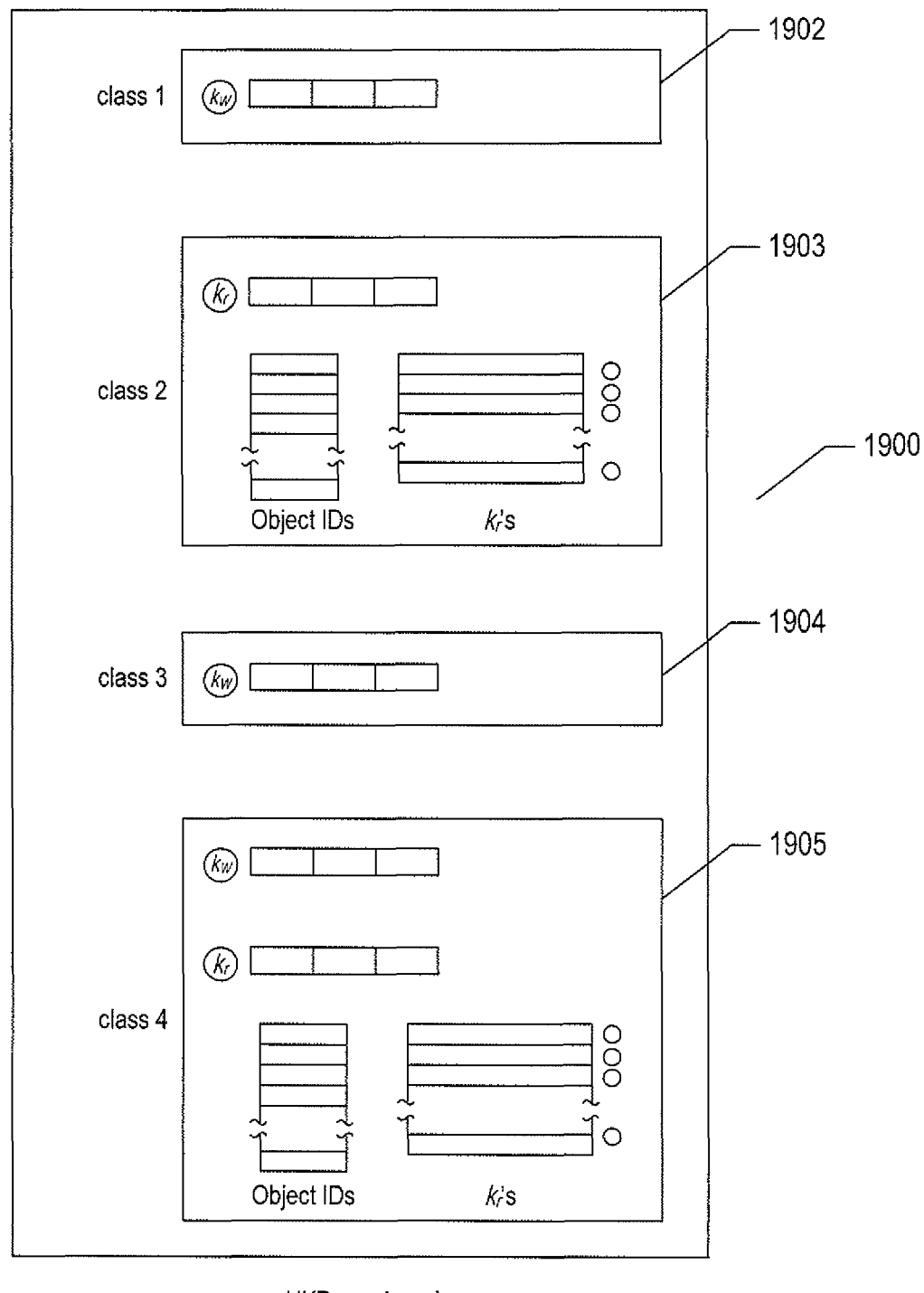
FIG. 19 illustrates a single HD node according to one implementation of an attribute-based access-controlled data-storage system to which the current application is directed.

FIG. 19 illustrates a single HD node according to one implementation of an attribute-based access-controlled data-storage system to which the current application is directed. In an example HD node 1900 shown in FIG. 19, data is maintained by the data-store component of an ABACDS for each of four classes 1902-1905. Only the write policy, but not the read policy, for classes 1 and 3 include the attribute conjunction presented by the HD node, and thus class 1 and class 3 contain only a triple-cryptogram-encrypted most recently distributed write payload key. Only the read policy for class 2 overlaps the example HD node, and thus class 2 contains only the most recently distributed read payload key as well as previously distributed read payload keys needed to decrypt the contents of the data objects within class 2 1903. Both the read and write policies for class 4 overlap the HD node, and thus class 4 contains both the write payload key and the read payload key information 1905.

Figure 20:
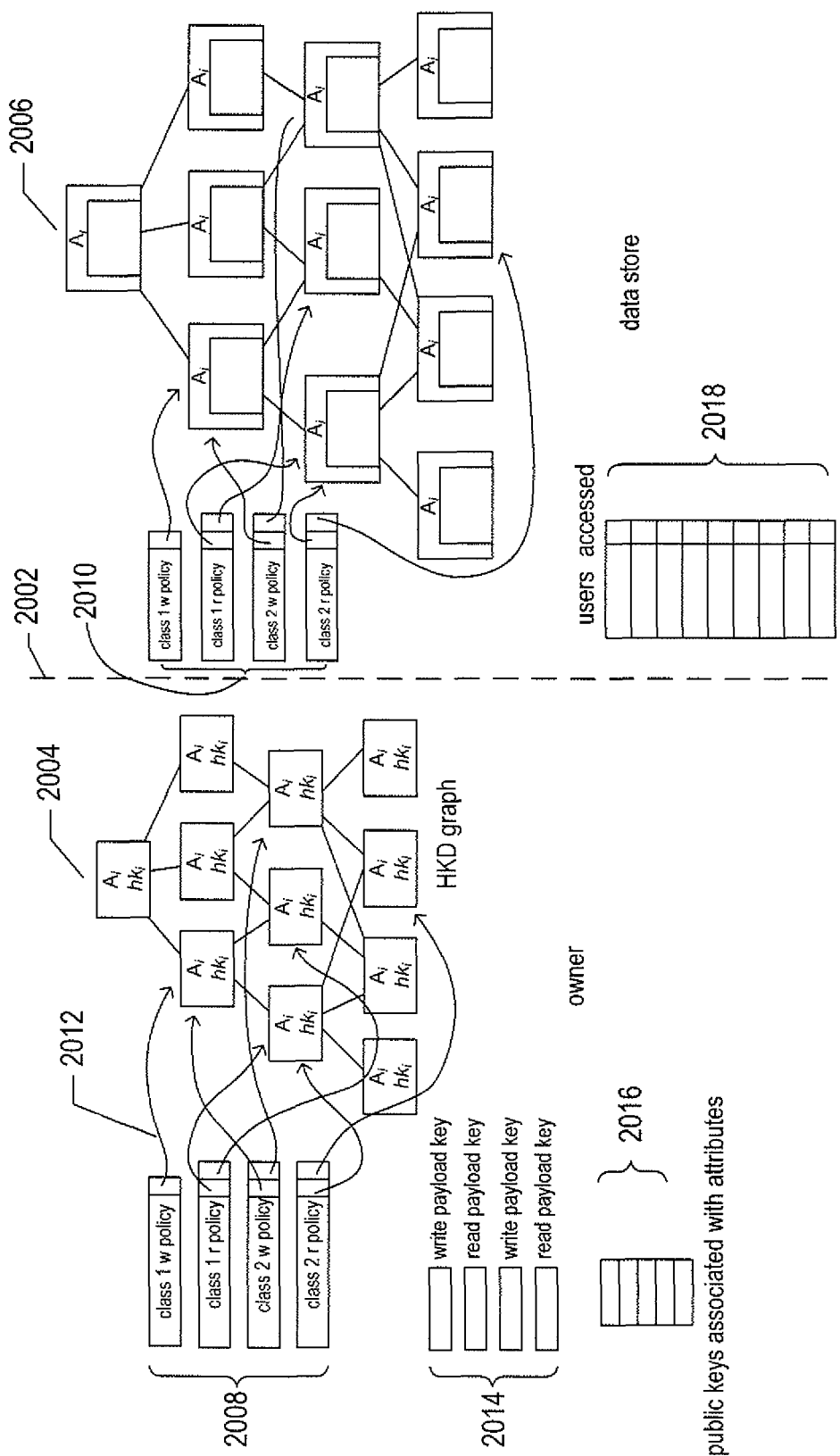
FIG. 20 illustrates information maintained by an owner, with regard to payload encryption, for several classes of data objects and the corresponding information maintained by the data store in one implementation of an attribute-based access-controlled data-storage system to which the current application is directed.

FIG. 20 illustrates information maintained by an owner, with regard to payload encryption, for several classes of data objects and the corresponding information maintained by the data store in one implementation of an ABACDS to which the current application is directed. The information maintained by a trusted owner is shown on the left-hand portion of FIG. 20, to the left of the vertical dashed line 2002, and the information maintained by the data store is shown on the right-hand side of FIG. 20. Both the owner and the data store maintain HDs for the data classes, 2004 and 2006, respectively. Each node of the owner HD includes the set of attributes associated with the node as well as the HKD key associated with that set of attributes and the node. By contrast, each node of the HD maintained by the data store includes the information discussed above with reference to FIGS. 18 and 19. In particular, the data store cannot access data payload keys unless the data store is an entity associated with attributes that satisfy read and/or write policies specified by the owner for the data objects stored by the data store. The data store does not have access to the HKD keys associated with HD nodes in the owner's HD. The data store does, however, store the attributes associated with each HD node. Both the owner and the data store maintain mappings of the read and write policies for each class, 2008 and 2010 respectively, to corresponding HD nodes. As discussed above, each access policy is a disjunction of attribute conjunctions, each attribute conjunction mapping to a particular HD node. Thus, each access policy includes one or more pointers, such as pointer 2012, that reference the HD nodes representing the conjunctions within the policy. The owner also maintains the most recent read payload key and write payload key 2014 for each class as well as the public keys for each of the attributes that occur in the HD 2016. The data store includes a list of current users 2018 for each class of data objects, each user associated with a flag indicating whether or not the user has accessed the data object during the current key-update cycle. In this fashion, the data store can return to a user a triple cryptogram for the type of access requested by a user under the highest-level HD node accessible by the user based on the attributes held by the user. The user can use HKD decryption for subsequent accesses to data objects of the class rather than the more expensive attribute-based encryption.

In the case that owners are not trusted, in alternative implementations, the owner does not store HKD keys, as shown in FIG. 20, but instead a key-distribution authority issues triple cryptograms to the owner and/or data store. Thus, the owner, in effect, stores encrypted HKD keys rather than clear-text HKD keys, so that the owner is less likely able to access data-object payloads without also having acquired necessary reader or writer attributes.

Figure 21:
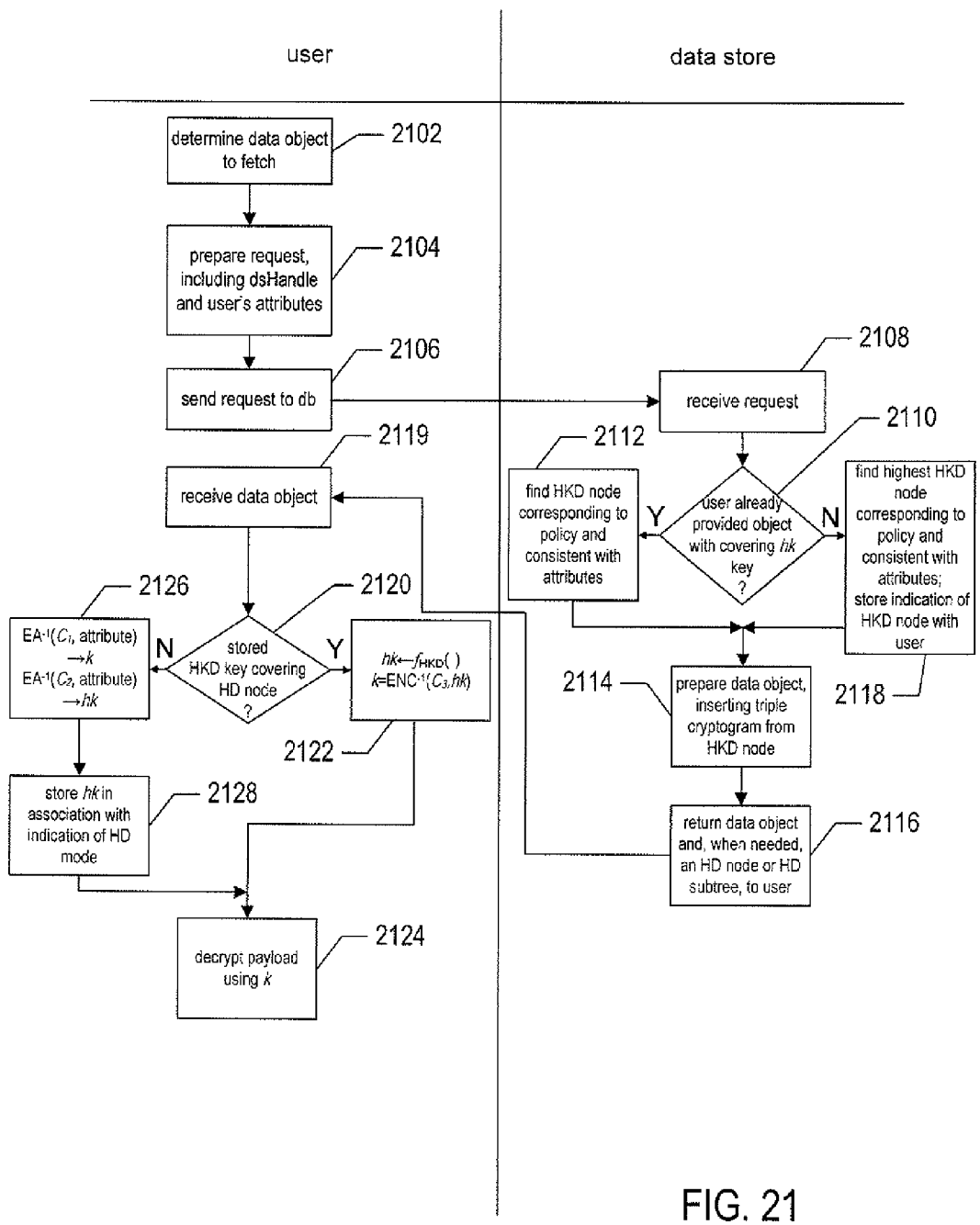
FIG. 21 provides a control-flow diagram illustrating interaction between a user and the data store of an attribute-based access-controlled data-storage system that results in obtaining, by the user, sufficient information to decrypt the encrypted data payload within a requested object.

FIG. 21 provides a control-flow diagram illustrating interaction between a user and the data store of an attribute-based access-controlled data-storage system that results in obtaining, by the user, sufficient information to decrypt the encrypted data payload within a requested object. In step 2102, the user determines to fetch a particular data object. In step 2104, the user prepares a request for the data object, including a data-store handle and a list of the user's attributes. In step 2106, the user sends the request for a data object to the data store. In step 2108, the data store receives the request and begins to process the request. When the data store has already provided to the user a data object and an encrypted HKD key associated with an HD node identical to, or dominating, an HD node for the requested data object, as determined in step 2110, then the data store finds the HD node corresponding to the access policy for the data object consistent with the attributes supplied by the user, in step 2112, prepares the data object for delivery to the user, including inserting the appropriate triple-cryptogram for the user's access into the data object, in step 2114, and returns the data object to the user in step 2116. However, if the user has not already been provided an object with a dominating HKD key, then, in step 2118, the data store finds the highest-level HD node corresponding to the access policy for the data object consistent with the user's attributes and stores an indication that the user has accessed this node during the current key-update cycle. Then, in step 2114, the data store prepares a data object for transmission to the user, inserting into the appropriate encrypted payload key field the triple cryptogram from the HD node found in either step 2112 or step 2114, and transmits the prepared data object to the user in step 2116. In step 2119, the user receives the data object. When the user has already stored an HKD key that covers the data object, as determined in step 2120, the user uses HKD decryption, in step 2122, to obtain the encryption/decryption key for the data object and uses that key to decrypt the data payload within the data object in step 2124. Otherwise, the user uses attribute-associated decryption, in step 2126, to obtain both the data-payload key for the current object as well as the HKD key for the highest-level HD node accessible to the user and associated with the access policy for the current data object, stores the decrypted HKD key in local memory in step 2128, and then proceeds to decrypt the data payload of the data object using the encryption/decryption key k, in step 2124.

There are many different variations in the data-object transaction, discussed above with reference to FIG. 21. Certain of these variations may apply to different implementations, and other of these variations may apply to different types of users and different previous interactions between users and the data store. As one example, depending on the type of HKD methods employed, it may be necessary for the data store to transmit to the user, in addition to triple-cryptogram-containing data objects, either an HD node or HD subtree. For example, when a user provides attributes that allow access up to a particular node within the HD, the data store may return that node, or a portion of the node, in certain implementations, or may return the subtree of the HD rooted at that node. In certain HKD implementations, the edges in HDs are annotated with information needed for lower-level key derivations. In other HKD implementations, the HD nodes contain additional information needed for key derivation, and, in certain HKD implementations, an HD subtree is needed to construct a key-derivation plan. By contrast, the information returned by the data store to a user may depend on the frequency of data-object access by the user. Frequently accessing users may obtain, from the data store, the highest HD node or HD subtree rooted at the highest HD node accessible to the user based on the attributes supplied by the user to the data store in a separate or initial transaction, allowing the user to decrypt the attribute-associated-encrypted payload key within the highest accessible node and to then derive all of the payload keys associated with the subtree of HD rooted at this node using HKD methods. In this fashion, the user need not supply attributes repeatedly during the period during which the payload keys are valid. By contrast, infrequently accessing users may furnish attributes with each access, and use attribute-associated encryption on the triple cryptograms returned in the received data objects. Moderately accessing users may employ a scheme such as that described in FIG. 21.

In many cases, a user may obtain, from the data store, a portion of the HD relevant to the user, during each key-update cycle, so that the user, rather than the data store, assumes the computational burden of determining whether or not the user can access particular data objects and of deriving HKD keys for accessing encrypted data-payload-access keys, in contrast to the data-store-centric transaction handling illustrated in FIG. 21. Thus, the HD may be distributed among an owner, the data store, and those user systems that access data objects owned by the owner. In these cases, the portion of an HD stored within a user system may be pruned and particularized for the user system's data-object accesses.

Figure 22A:
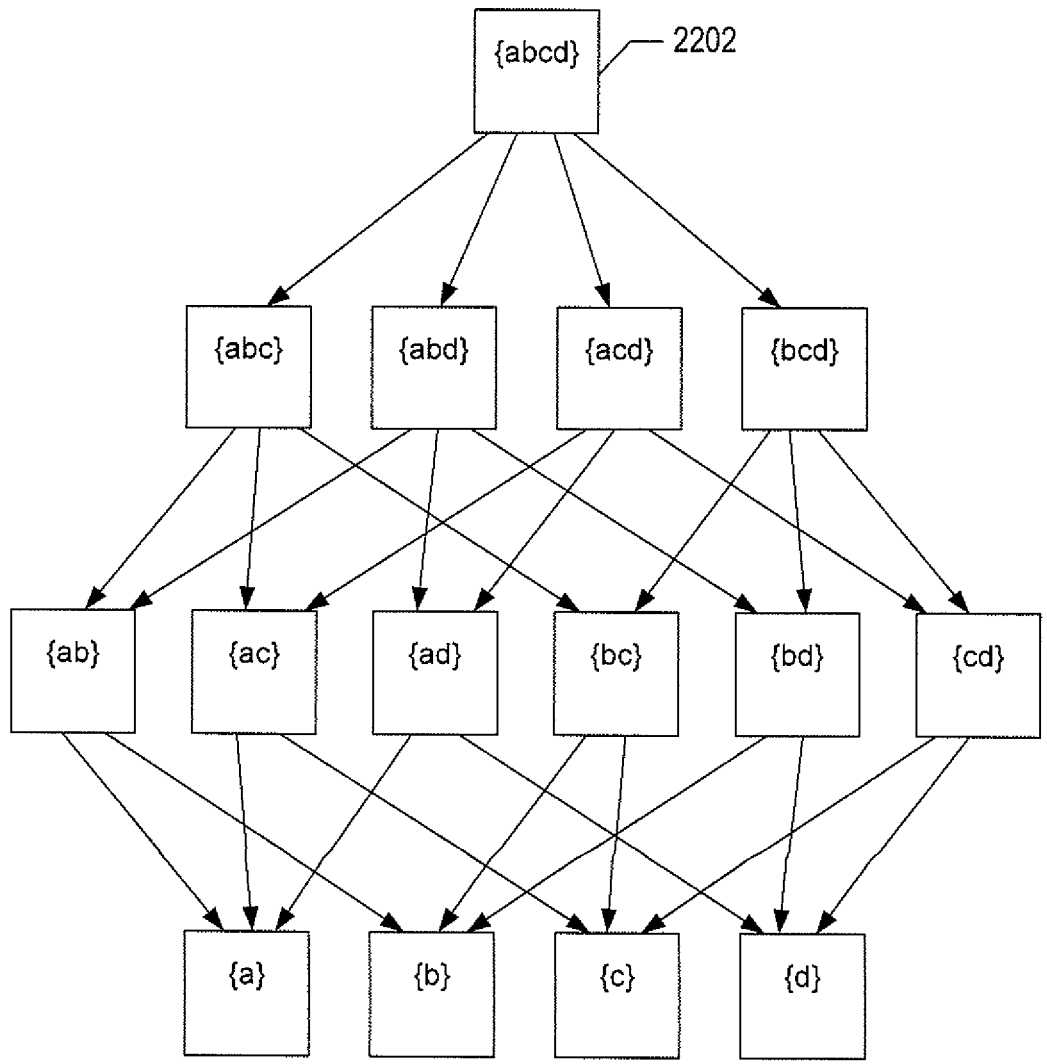
FIGS. 22A-C illustrate the difference in security between ABE encryption and PE encryption with respect to collusion by users and offer one approach to increasing the security of a hybrid encryption method used in an attribute-based access-controlled data-storage system to which the current application is directed.
Figure 22B:
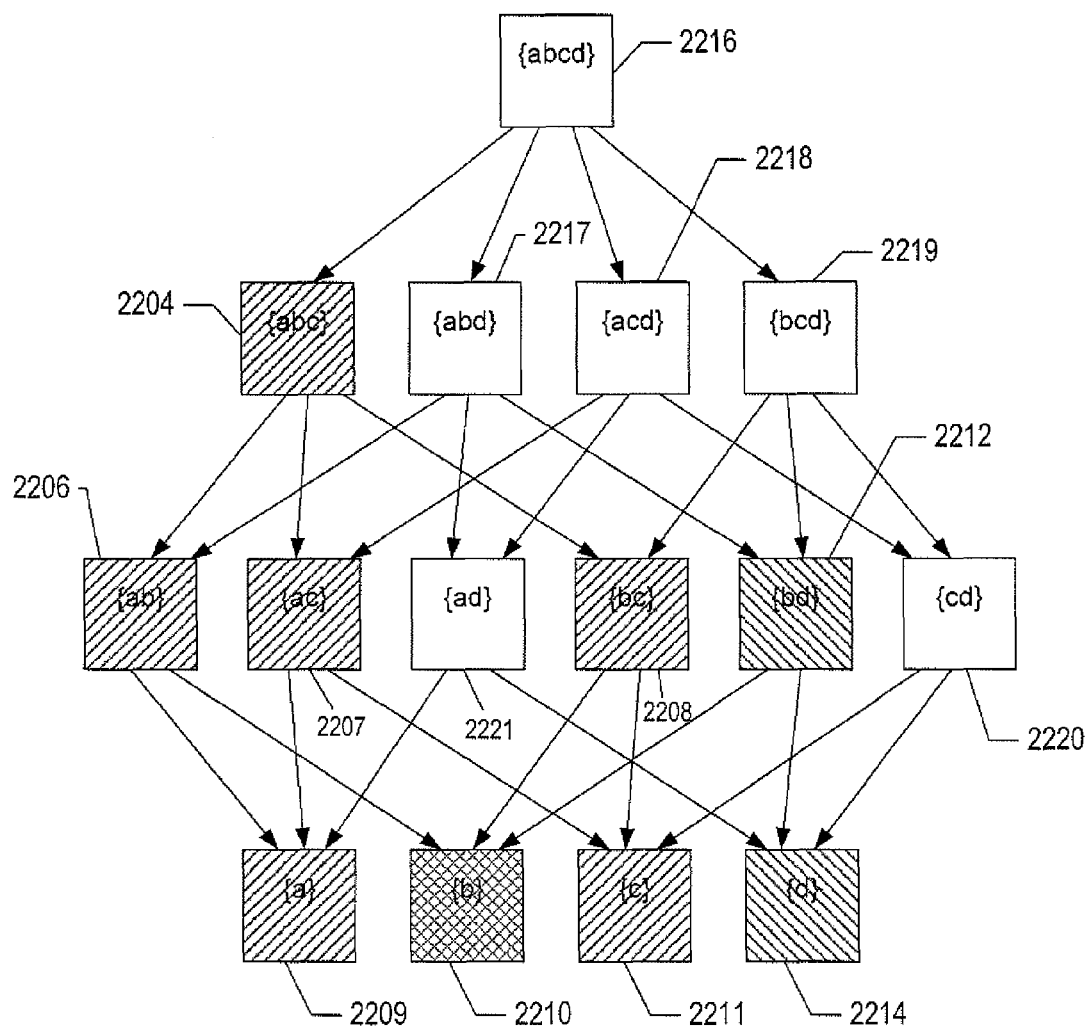
Figure 22C:
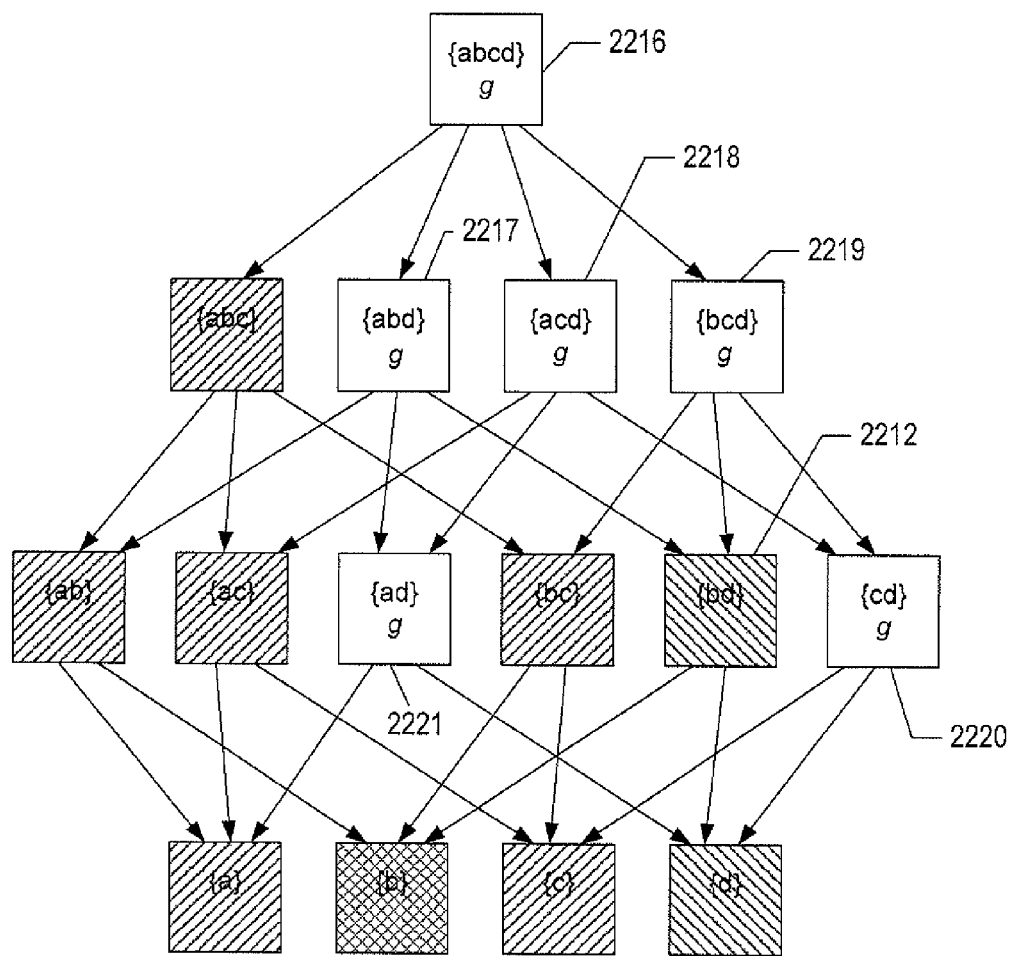

As mentioned above, PE encryption/decryption is somewhat less secure than attribute-associated encryption/decryption. FIGS. 22A-C illustrate the difference in security between ABE encryption and PE encryption with respect to collusion by users and offer one approach to increasing the security of a hybrid encryption method used in an attribute-based access-controlled data-storage system to which the current application is directed. FIG. 22A again shows a simple HD that may be used to represent read and write policies. As in previous figures, each node, such as node 2202, includes a set of attributes associated with the node and needed by an accessor, to access the node.

In FIG. 22B, the nodes within the HD accessible by two different users with two different sets of attributes are illustrated. A first user, with attributes {a,b,c,} can access node 2204 as well as nodes 2206-2211 directly or indirectly dominated by node 2204. All of these nodes are cross-hatched with a first pattern of cross-hatchings to indicate their accessibility to the first user. A second user, with attributes {b,d}, can access node 2212 as well as nodes 2210 and 2214 dominated by node 2212. The nodes accessible to the second user are covered with a second type of cross-hatching. Node 2210 can be accessed by both the first user and the second user, and therefore use both types of cross-hatchings. When the two users do not share attributes, or collude with one another, then neither user should be able to access nodes 2216-2221. For example, consider node 2218. The first user does not have attribute d and therefore does not hold attributes needed to access node 2218. Similarly, the second user does not hold attribute c, and therefore does not have sufficient attributes to access node 2218. However, in viewing the cross-hatching superimposed on certain of the nodes in FIG. 22B, it is clear that, were the first and second users to share attributes with one another, both users would obtain access to all four attributes {a,b,c,d} and therefore able to access all of the nodes in the HD. When users share attributes with other users that do not have those attributes, they are colluding in order to access portions of the HD which, with their own sets of attributes, they could not access.

The ABE schemes prevent collusion among users, illustrated above, to obtain access to nodes. PE, by contrast, does not.

FIG. 22C illustrates one method to increase the security of PE encryption/decryption and avoid certain collusion issues. In FIG. 22C, nodes 2216-2221 are associated with an additional attribute, g, with which the remaining nodes are not associated with attribute g. Attribute g partitions the nodes of the HD graph into a first set of nodes, cross-hatched in FIG. 22C as in FIG. 22B, which are accessible to at least one of the first and second users, and a second set of nodes, associated with attribute g, which should not be accessible to the first and second users providing that they do not collude. Now, even should the first and second users collude, if neither have attribute g, they still will not be able to access nodes 2216-2221. By assigning attributes with group affiliations, such as attribute g, to the HD nodes associated with certain groups, certain types of collusion can be prevented.

Furthermore, the nodes of an HD may be partitioned into groups, with ABE encryption used in the hybrid attribute-associated/HKD-like encryption/decryption methods for groups of nodes for which high levels of collusion prevention is desired while, for the remaining groups, PE encryption is used in the hybrid attribute-associated/HKD-like encryption/decryption methods. A combination of this type of partitioning and the use of attributes with group-affiliation can be employed to provide a range of collusion-prevention levels between groups of users and within groups of users, from high-levels of collusion prevention to various intermediate and lower levels of collusion prevention. ABE encryption is significantly more computationally expensive than PE encryption. For computational efficiency in an ABASDS, ABE can be used judiciously only when needed, with collusion-prevention relaxed to various degrees, when possible, to use the more computationally efficient PE encryption/decryption method.

Another approach to ameliorating the potential for collusion is to employ node coloring for HDs that represent roles. One or more attributes at a particular node or level within the HD can be bifurcated, or transformed into three or more colors or variations of the original attribute, and subtrees of the node can be each given a different variation or color of the original attribute, in order to prevent users with roles defined within the subtrees from colluding with respect to the original attribute. More complex coloring schemes may also be derived to prevent other types of collusion.

As mentioned above, attribute-associated short-cycle keys are regenerated frequently, to provide a difficult threshold for colluders and others seeking to break the security provisions that secure data access in an ABASDS. Generation of new attribute-associated short-cycle keys involve regeneration of payload keys but does not involve re-encryption of already encrypted data stored within data objects. On each short-cycle-key update, the key issuer issues fresh attribute keys and creates a fresh master HKD key. Either a trusted owner or a key distribution authority ("KDA") creates new payload keys for each access policy and owners and data stores cooperate to accordingly update the HD nodes to which each access policy maps. Users may either acquire an attribute-associated-encrypted highest-level HKD key compatible with the attributes they hold, decrypt the highest-level HKD key, and then derive all lower-level keys that can be derived from the highest-level HKD key. Alternatively, users may acquire new HKD keys during data-object accesses. Short-cycle key updates are relatively inexpensive, since each user may need to carry out only a single attribute-associated decryption, using ABE or PE decryption, and no stored data is re-encrypted.

The fresh attribute keys generated during a key-update event are distributed by the KDA using Broadcast Encryption ("BE"). Broadcast Encryption is a well-known method for distributing information to information consumers in a way that allows only currently authorized users to decrypt and access the distributed information. The KDA, or another entity, can independently revoke authorization with respect to individual users. Once revoked, the no-longer-authorized user cannot decrypt distributed information encrypted by any of various BE methods. BE also allows the KDA to identify users who provide one or more of their attribute-associated keys to users lacking the attributes. The KDA can then take steps to penalize or disenfranchise such users. In certain ABASDS implementations, to avoid compounding revocations of keys during a key cycle, the modular sum of previous short-cycle attribute-associated keys related to a particular attribute is used for each new short-cycle attribute-associated key related to the particular attribute generated during the long-cycle key cycle. By generating short-cycle keys in this fashion, a user needs only to be revoked once, during a key cycle, rather than needing to be repeatedly revoked. This sharply reduces the complexity of Broadcast Encryptions.

Because the above-described key-update cycle is computationally efficient, ABASDSs can update short-cycle attribute-associated keys far more frequently than systems that employ traditional ABE encryption. ABE encryption generates unique attribute-associated keys for each user, for example, while PE encryption generates one common set of attribute-associated keys for users. Furthermore, because users can derived many keys using the more efficient HKD method, rather than ABE or PE, the computational burden for users is significantly reduced with respect to current systems.

Figure 23:
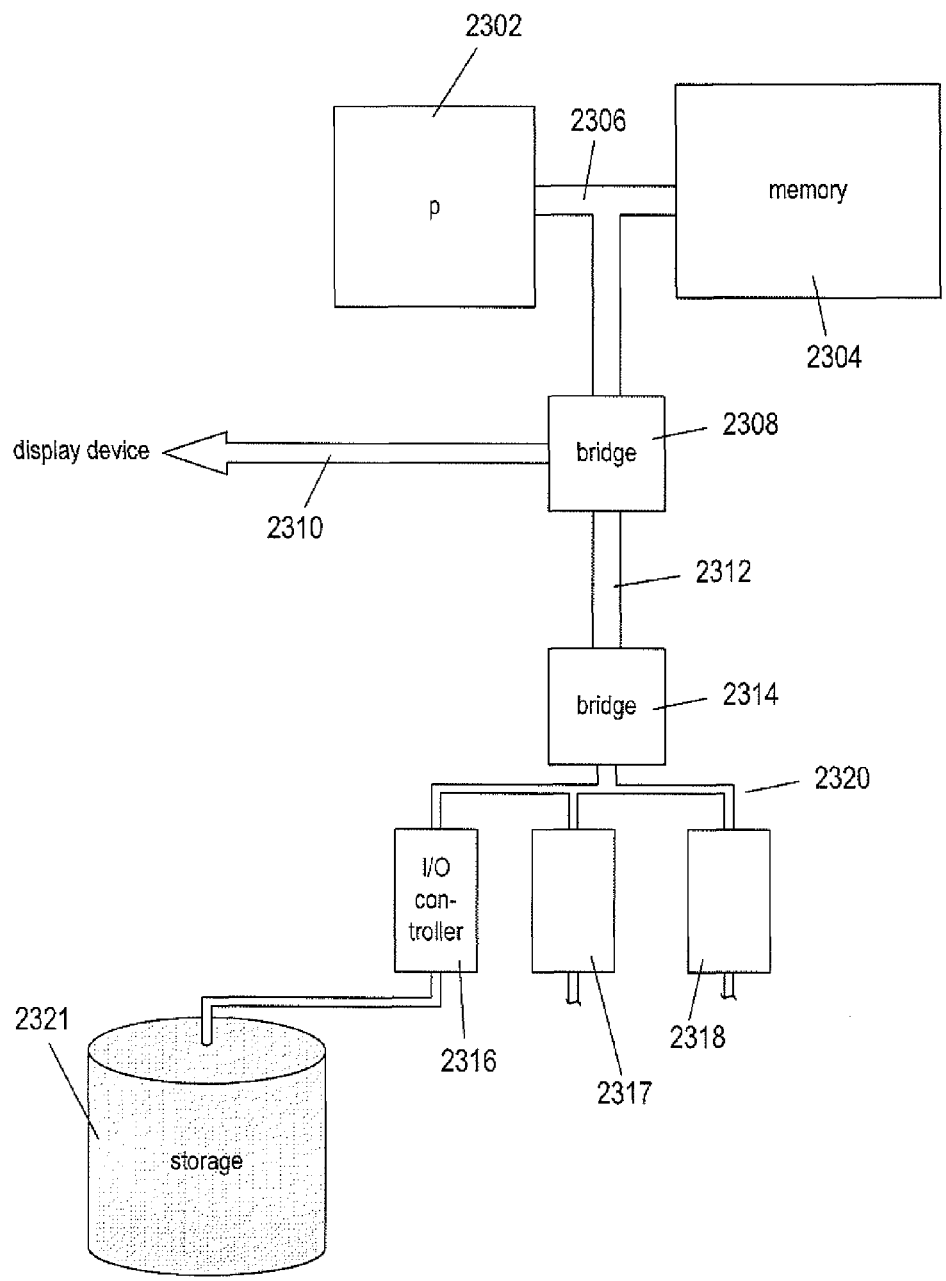
FIG. 23 provides a block diagram of a generalized computer system on which components of an attribute-based access-controlled data-storage system to which the current application is directed may be implemented.

FIG. 23 provides a block diagram of a generalized computer system on which components of an attribute-based access-controlled data-storage system to which the current application is directed may be implemented. The computer includes a processor 2302, memory 2304, a memory/processor bus 2306 that interconnects the processor, memory, and a bridge 2308. The bridge interconnects the processor/memory bus 2306 with a high-speed data-input bus 2310 and an internal bus 2312 that connects the first bridge 2308 with a second bridge 2314. The second bridge is, in turn, connected to various devices 2316-2318 via high-speed communications media 2320. One of these devices is an I/O controller 2316 that controls data exchange with a mass-storage device 2321. A software program that implements a video codec may be executed by the computer system to control video coding by the computer system. In this example, the software program is stored on the mass-storage device 2320 and paged, on an as-needed basis, into memory 2304. Instructions of the software program are fetched, by the processor 2302, from memory for execution.

In the above-discussed implementations of attributed-based access-controlled data-storage systems, a user request access to a data object by providing a data-object identifier and the users attributes to the data store. The data store returns a data object corresponding to the user-supplied data-object identifier when the attributes furnished by the user allow the user access to the data object. It is also possible for ABASDSs to provide keyword searching. Keyword searching allows users with attributes that allow write access to a data object to annotate the data object with encrypted keywords and that allows users with attributes sufficient to access a set of data objects to search for particular data objects within the set of data objects using keyword-based queries. The keywords used to annotate data objects are encrypted, as are the keywords furnished by users in keyword-searching queries and the keywords incorporated into indexes associated with HD nodes that facilitate keyword searching. Users are able to apply keyword searching to those data objects for which they have sufficient attributes to access. The data store, and owners in the case that owners are not trusted, cannot obtain clear-text representations of the encrypted keywords.

Keyword encryption is carried out, in certain implementations, using deterministic encryption ("DE"). In deterministic encryption, a message M is encrypted using an encryption key k to produce an encoded message C, as represented by the following expression:

$$C = f(k, M).$$

The original message is obtained by decryption, as represented by the following expression:

$$M = f^{-1}(k, C)$$

In this example, the secret key k is a symmetric encryption key. For short messages, the short messages can be expanded by concatenating some type of pseudo-random information R to the message to increase the size of the message space in order to enhance the security of the encryption scheme. The above two functions are modified to incorporate the addition of pseudo-random information as follows:

$$C = f(k, M|R)$$

$$M|R = f^{-1}(k, C)$$

The pseudo-random information R needs to be available both to writers and readers of data objections. In certain implementations, the pseudo-random information needs to be available to owners, as well. Pseudo-random information R can be computed, as one example, by bitwise rotation of all or a portion of the keyword being encrypted, viewed as a large number, with the number of bitwise rotations derived from all or a portion of the large number corresponding to the keyword. Many other types of pseudo-random information can also be used to enhance the security of the encryption scheme. In one implementation of an ABASDS that incorporates keyword searching, the keywords are encrypted using the HKD key for the HD node with which the data object is associated. In this scheme, each HD node corresponding to a policy conjunction is associated with, or includes, a keyword index that allows all data objects associated with a node to be searched for using keyword-based queries.

Figure 24:
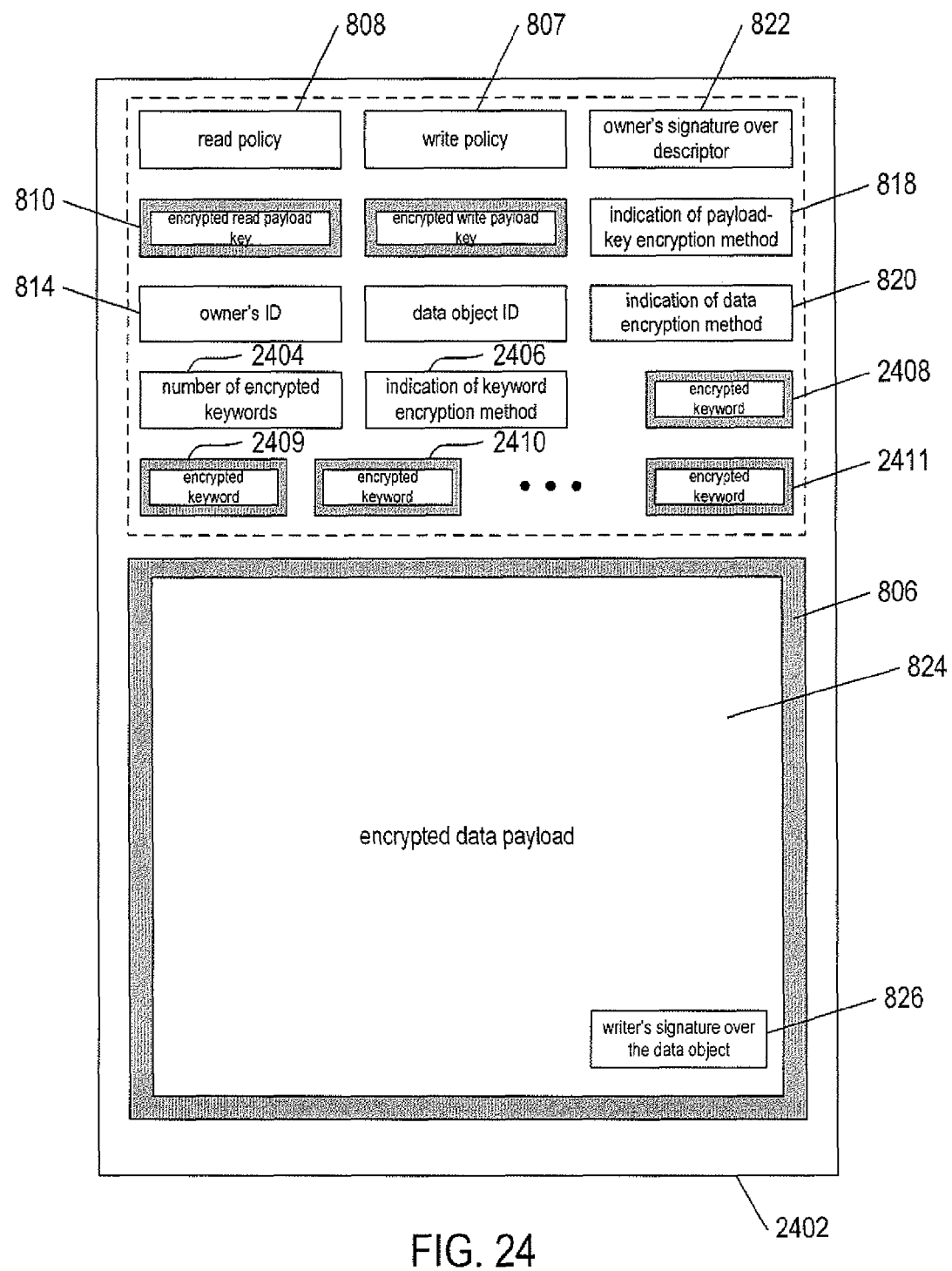
FIG. 24 illustrates, using the illustration conventions previously employed for FIG. 8, additions to the information stored in the descriptor portion of a data object in order to facilitate keyword searching.

FIG. 24 illustrates, using the illustration conventions previously employed for FIG. 8, additions to the information stored in the descriptor portion of a data object in order to facilitate keyword searching. In FIG. 24, those components of the data object previously described with reference to FIG. 8 are numerically labeled with the same numeric labels used in FIG. 8. The enhanced data object 2402 includes, in addition to the previously described information, a clear-text entry that indicates the number of keywords associated with the data object 2404, an entry that indicates the method used to encrypt the keywords 2406, which may include an indication of how the pseudo-random information R is computed and combined with the keyword, and a variable-sized list of encrypted keywords 2408-2411.

Figure 25:
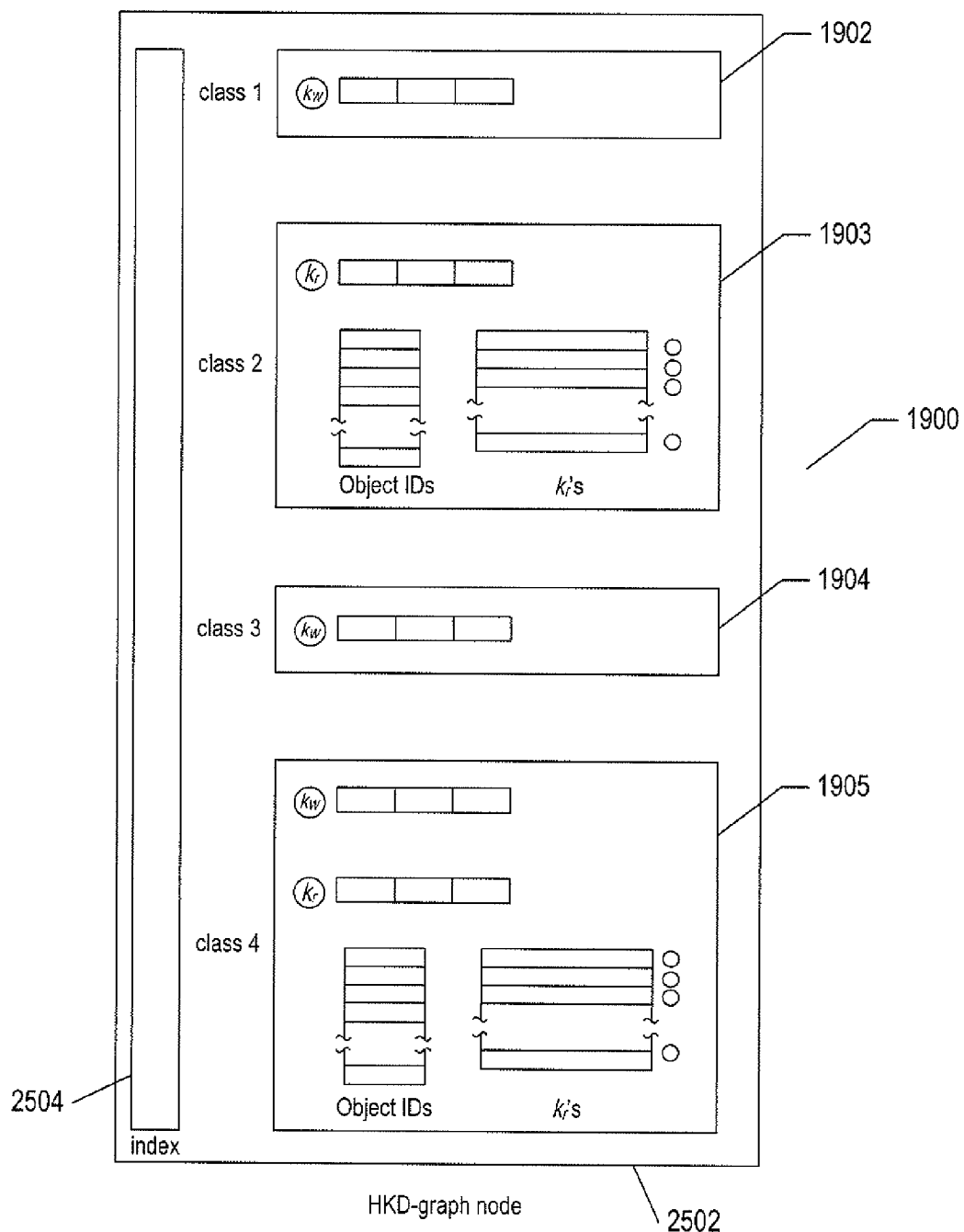
FIG. 25 illustrates an addition to the information stored within a policy HD node to facilitate keyword searching.

FIG. 25 illustrates an addition to the information stored within a policy HD node to facilitate keyword searching. As shown in FIG. 25, enhanced HD node 2502 includes a keyword index 2504. In one implementation, each policy HD node of an HD graph stored within the data store includes a partial keyword index for the data objects accessible from the HD node. When a writer user writes to a data object, the writer user may add one or more encrypted keywords to the data object, using DE encryption to encrypt the keywords. The data store, upon receiving the data object from the writer user, can then update the encrypted-keyword index so that the data object is associated, by the encrypted-keyword index, with each of the encrypted keywords included in the data object by the writer user.

In addition, the encrypted-keyword indexes of any higher-level HD nodes from which the data object is accessible may also need to be encrypted. There are numerous methods that can be implemented to carry out the updating of these additional encrypted-keyword indexes. The encrypted keywords associated with the data object generally need to be decrypted and re-encrypted with the HKD key associated with the HD node that contains or is associated with an additional encrypted-keyword index. However, it is generally desired that the data-store not have access to clear-text keywords and HKD keys. In certain implementations, the encrypted-keyword-index updating may involve a cooperative interaction between the owner of the data object and the data store, with the owner providing re-encrypted keywords for each additional updating of an encrypted-keyword index. Alternatively, a trusted third-part re-encryption service may perform the re-encryptions.

Figure 26:
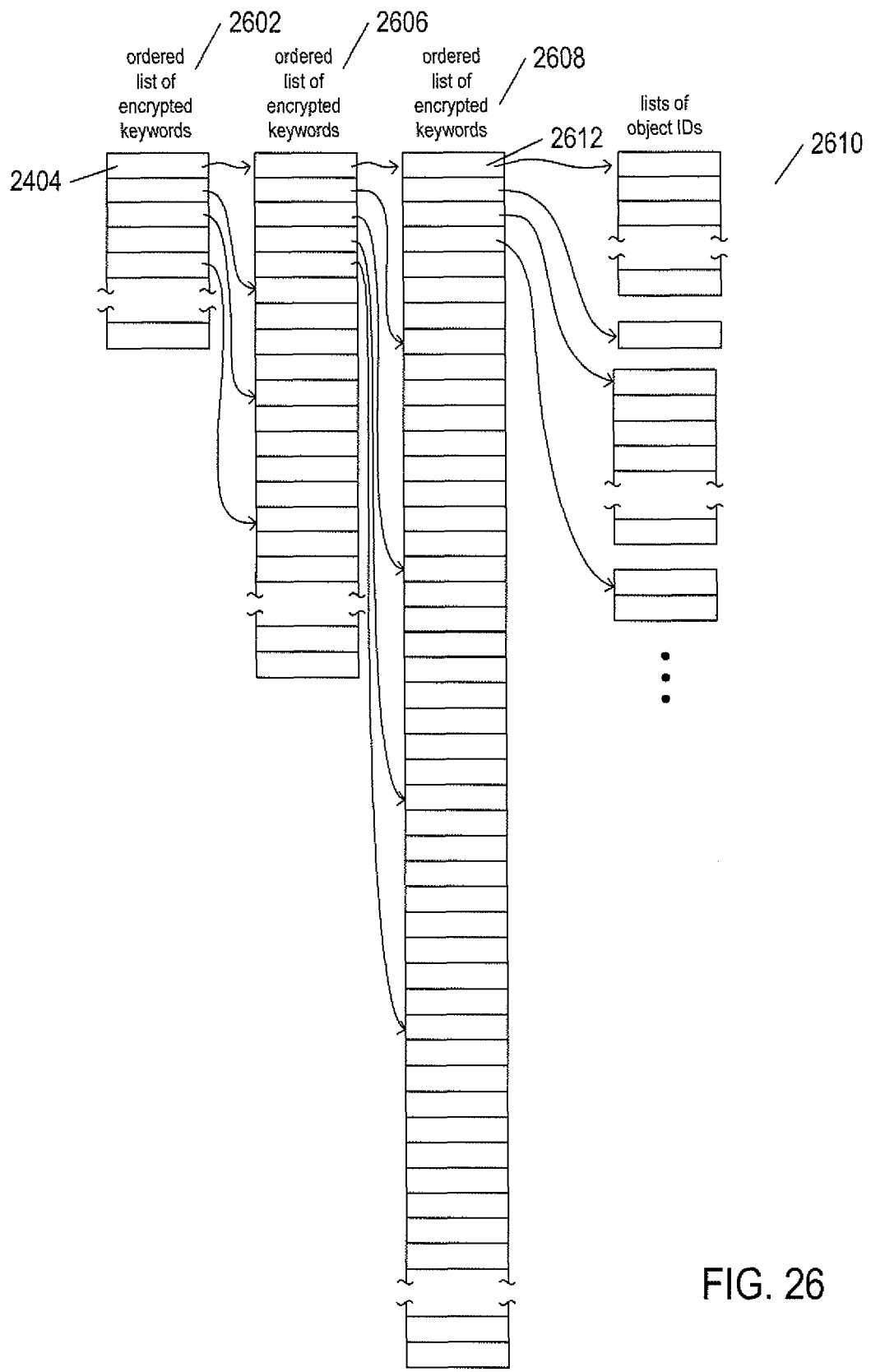
FIG. 26 illustrates one implementation of an encrypted-keyword index.

FIG. 26 illustrates one implementation of an encrypted-keyword index. The encrypted-keyword index shown in FIG. 26 includes a three-level index which references lists of data-object identifiers. A first, small encrypted-keyword index 2602 includes an ordered list of encrypted keywords, where the ordering is some type of deterministic lexicographic ordering of the encrypted keywords. Each entry, such as entry 2604, includes an encrypted keyword and a reference, or pointer, to an entry of a second-level encrypted-keyword index 2606. The entries of the second-level index 2606 include encrypted-keyword/reference pairs, with the references referencing entries of the third-level encrypted-keyword index 2608. The third-level encrypted-keyword index 2608 includes one entry for each different encrypted keyword associated with the data objects accessible from the particular HD node that includes the encrypted-keyword index. Each entry in the third-level encrypted-keyword index 2608 includes an encrypted keyword and a reference to a list of one or more object IDs, such as the list of object IDs 2610 referenced from entry 2612. The data object store can use the multi-level index shown in FIG. 26 to find object IDs associated with a specified encrypted keyword by first identifying an entry in the first-level index 2602 containing an encrypted keyword equal to specified encrypted keyword or containing an encrypted keyword closest to, but less than, the specified encrypted keyword in the lexicographic order, then using the reference in the identified entry of the first level as a starting position for searching the second level for an entry that contains an encrypted keyword equal to, or closest to but less than, the specified keyword. The reference in the entry found in the second-level index can then be used as a position to begin searching the third-level index for an entry that matches the searched-for keyword. Alternatively, a single-level index equivalent to the third-level index 2608 shown in FIG. 26 can be used along with an index-searching method that efficiently searches the index based on the lexicographic ordering of the encrypted keywords within the index. Other implementations of encrypted-keyword indexes may also be used.

Figure 27:
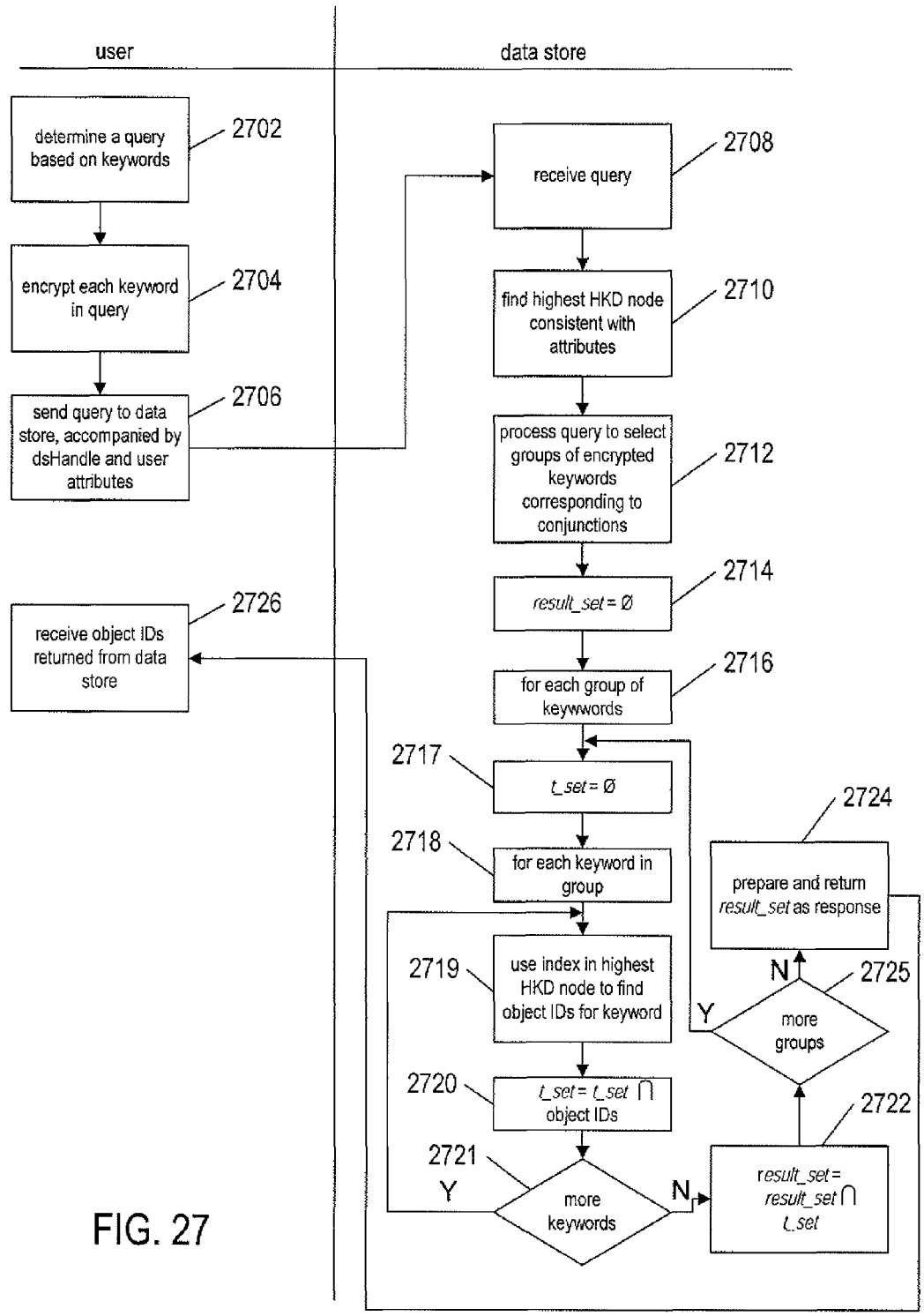
FIG. 27 illustrates, using the illustration conventions used previously in FIG. 21, a keyword search performed by a user searching for particular data objects within a data store.

FIG. 27 illustrates, using the illustration conventions used previously in FIG. 21, a keyword search performed by a user searching for particular data objects within a data store. In step 2702, the user determines a keyword-based query that the user wishes to submit to the data store. In one implementation, a keyword-based query may contain an arbitrary DNF keyword expression. Then, in step 2704, the user encrypts each keyword within the query using DE encryption, previously discussed above. This implies that the user has access to the HKD key for a highest-level HD node accessible to the user. Should the user not have that key, the user can obtain the key via a separate transaction with the data store. In step 2706, the user sends the query, including encrypted keywords, along with the user's attributes and a data-store handle to the data store. In step 2708, the data store receives the query and, in step 2710, locates the highest HD node within the HKD tree that is consistent with the user's attributes. In step 2712, the data store processes the query to select groups of encrypted keywords corresponding to conjunctions within the query. In step 2714, the data store sets a local variable result_set to the empty set. In the outer for-loop of steps 2716-2723, the data store identifies data objects corresponding to each group of encrypted keywords. In step 2717, the data store sets the local variable t_set to the empty set. Then, in the inner for-loop of steps 2718-2721, for each encrypted keyword in the currently considered group, the data store, in step 2719, uses the encrypted-keyword index in the highest HD node to find object identifiers of the data objects associated with the HD node and with the encrypted keyword. In step 2720, those object identifiers found in step 2719 not already included in the local set t_set are added to the local set t_set. Once object identifiers have been found and stored in t_set for all the encrypted keywords in the currently considered group, those object identifiers in the set t_set not already members of the set result_set are added to result_set. Once all of the groups have been processed, the data store returns the object identifiers in result_set to the user, in step 2724. In step 2726, the user receives the object identifiers returned from the data store. The user can then access these objects for writing, reading, or both reading and writing, provided that the user can furnish the necessary attributes, as discussed above with reference to FIG. 21. Of course, the data store may provide a combined type of transaction that allows users to directly access data objects based on queries. In alternative implementations, the user may specify an HD node from which the search for data objects should proceed, along with a query containing one or more keywords encrypted using the HKD key associated with that HD node.

Other types of facilities for supporting encrypted-keyword-based searching are possible. For example, certain implementations may employ a single encrypted-keyword index for all HD nodes of an HD and searching methods that return only object identifiers that are accessible to particular users. Encryption methods other than DE encryption may be employed to encrypt keywords in alternative methods.

Although the present invention has been described in terms of particular embodiments, it is not intended that the invention be limited to these embodiments. Modifications within the spirit of the invention will be apparent to those skilled in the art. For example, many different implementations of attribute-based access-control systems can be obtained by varying any of many different design and implementation parameters, including the hardware platforms on which each of the components of the attribute-based access-control systems are implemented, operating systems, programming languages used for implementing programs and routines that control operation of the hardware components, data structures, control structures, modular organization, networking protocols, attribute encoding, underlying encryption/decryption techniques, data structures used for representing HDs and other stored information, and many other similar implementation and design parameters. A variety of different specific ABE encryption/decryption implementations and HKD encryption/decryption implementations may be employed in the hybrid encryption/decryption methods used in attribute-based access-control systems.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An attribute-based access-controlled data-storage system comprising:
   a data-store system that stores data objects, in one or more electronic data-storage components and/or electronic data-storage subsystems, that each comprises an encrypted data payload and a descriptor that includes, references, or is computationally associated with a hybrid-attribute-associated/hierarchical-key-derivation-encrypted data-payload access key stored in the one or more electronic data-storage components and/or electronic data-storage subsystems; and
   an owner system on behalf of which the data-store system creates and stores data objects, the owner system
      creating access policies for data objects owned by the owner system, each access policy controlling hybrid-attribute-associated/hierarchical-key-derivation encryption of a data-payload access key for inclusion of the encrypted data-payload access key in a data object associated with the access policy, reference to the encrypted data-payload access key from the data object associated with the access policy, or association of the encrypted data-payload access key with the data object associated with the access policy, and
      storing the access policies, stored in one or more electronic data-storage components and/or electronic data-storage subsystems, within the owner system and the data-store system.

2. The attribute-based access-controlled data-storage system of claim 1 wherein data-payload keys include:
   read data-payload keys that allow a reader user system to decrypt the encrypted data payload within a data object; and
   write data-payload keys that allow a writer user system to encrypt data for storage in a data object.

3. The attribute-based access-controlled data-storage system of claim 2 wherein a read data-payload key and a write data-payload key for a class of data objects is generated by an asymmetric-cryptography-with-no-public-key-and-two-private-keys method by:
   selecting two secret prime numbers p and q;
   computing the product n of p and q;
   computing the product φ(n) of p−1 and q−1;
   selecting a large random number e and computing a number d such that ed=1 mod φ(n);
   generating the write data-payload key $k_w$ as the pair of numbers (e, n); and
   generating the read data-payload key $k_r$ as the pair of numbers (d, n).

4. The attribute-based access-controlled data-storage system of claim 3
   wherein a transform function transform( ) transforms data by reordering and padding and wherein a complementary inverse transform function transform$^{-1}$( ) regenerates data from reordered and padded data;
   wherein data D is encrypted to produce encrypted data ED for storage in a data object by a writer user system using the write data-payload key $k_w$ by $$ED = (\text{transform}(D))^{k_w} \bmod n; \text{ and}$$

wherein encrypted data ED is decrypted by a reader user system using the read data-payload key $k_r$ by D=transform$^{-1}$(EV$^{k_w}$ mod n).

5. The attribute-based access-controlled data-storage system of claim 1 wherein attribute-based/hierarchical-key-derivation encryption encrypts a hierarchical-key-derivation encryption key using the attribute-associated encryption method, producing an attribute-associated-encrypted hierarchical-key-derivation encryption key that is included in a multi-part cryptogram.

6. The attribute-based access-controlled data-storage system of claim 5 wherein attribute-based/hierarchical-key-derivation encryption encrypts a hierarchical key derivation key using an attribute-associated encryption method, producing an attribute-associated-encrypted data-payload access key that is included in the multi-part cryptogram.

7. The attribute-based access-controlled data-storage system of claim 5 wherein the multi-part cryptogram additionally contains the data-payload access key encrypted by a second encryption method that uses the hierarchical-key-derivation encryption key as an encryption key.

8. The attribute-based access-controlled data-storage system of claim 1 wherein access policies include:
read access policies that specify attributes with which a reader user system is able to decrypt and use a read data-payload key; and
write access policies that specify attributes with which a writer user system is able to decrypt and use a write data-payload key.

9. The attribute-based access-controlled data-storage system of claim 8 wherein one or more access policies are mapped to one or more nodes of a Hasse diagram, the Hasse diagram initially representing the power set of an entire set of attributes used the one or more access policies, with nodes linked by set inclusion, and the Hasse diagram subsequently pruned to include only those nodes to which the one or more access policies are mapped.

10. The attribute-based access-controlled data-storage system of claim 8 wherein an access policy is mapped to one or more nodes of the Hasse diagram by:
expressing the access policy as a Boolean expression of attribute terms comprising one of an attribute term, a conjunction of two or more attribute terms, and a disjunction of two or more conjunctions of two or more attribute terms;
when the access policy comprises an attribute term, mapping the access policy to the node in the Hasse diagram associated with only the attribute term;
when the access policy comprises a conjunction of two or more attribute terms, mapping the access policy to the node in the Hasse diagram associated with only the two or more attribute teal's; and
when the access policy comprises a disjunction of two or more conjunctions of two or more attribute terms, mapping each conjunction of the access policy to a nodes in the Hasse diagram associated with only the two or more attribute terms in the conjunction.

11. The attribute-based access-controlled data-storage system of claim 8 wherein a Hasse diagram representing an owner system's access policies is stored in an electronic device, an electronic component, and/or a data-storage subsystem within the owner system and a Hasse diagram representing an owner system's access policies is stored within the data-store system.

12. The attribute-based access-controlled data-store system of claim 11 wherein a user system accesses a data object by:

requesting access to a data object from the data-store system, supplying indications of attributes held by the user system;
receiving the requested data object from the data-store system, the requested data object including a multi-part cryptogram, the multi-part cryptogram corresponding to a node of the Hasse diagram that represents access policies for the data object;
when the user system has a current hierarchical-key-derivation key for the Hasse-diagram node corresponding to the cryptogram, decrypting the data-payload access key encrypted by the second encryption method within the multi-part cryptogram using the current hierarchical-key-derivation key for the Hasse-diagram node corresponding to the cryptogram to obtain a data-payload key for accessing the encrypted data within the data object;
when the user system has a current hierarchical-key-derivation key for a Hasse-diagram node higher than the Hasse-diagram node corresponding to the cryptogram from which there is a path in the Hasse diagram to the Hasse-diagram node corresponding to the cryptogram, deriving the hierarchical-key-derivation key, using a hierarchical-key-derivation function, for the Hasse-diagram node corresponding to the cryptogram and decrypting the data-payload access key encrypted by the second encryption method within the multi-part cryptogram using the derived hierarchical-key-derivation key to obtain the data-payload key for accessing the encrypted data within the data object;
when the user system has no current hierarchical-key-derivation key that can be used to obtain the data-payload key, using an attribute-associated decryption method to decrypt the encrypted data-payload access key, encrypted using an attribute-associated encryption method, within the multi-part cryptogram to obtain the data-payload key for accessing the encrypted data within the data object, decrypting the encrypted hierarchical-key-derivation encryption key, encrypted using the attribute-associated encryption method, and storing the hierarchical-key-derivation encryption key in memory; and
using the obtained data-payload key to access the data payload of the data object.

13. The attribute-based access-controlled data-store system of claim 11 wherein the data-store system provides a data object to a requesting user system by:
receiving a request for the data object, including indications of attributes held by the requesting user system;
determining a Hasse-diagram node to which an access policy for the data object maps and the attributes associated with which are included in the indications of attributes held by the requesting user system;
extracting a cryptogram from the Hasse-diagram node corresponding to the access policy and loading the extracted cryptogram into the data object; and
transmitting the data object to the requesting user system.

14. The attribute-based access-controlled data-store system of claim 5 wherein the attribute-associated encryption method is one of:
attribute-based encryption; and
policy encryption.

15. The attribute-based access-controlled data-store system of claim 14 wherein policy encryption encrypts a data-payload key by:
expressing an access policy that controls access to the data-payload key by as a Boolean expression in disjunctive normal form;

replacing each OR operator within the Boolean expression by a concatenation operator;

and, for each conjunction remaining in the Boolean expression, applying nested encryption using public encryption keys corresponding to the attributes in the conjunction.

16. The attribute-based access-controlled data-store system of claim 14 wherein policy encryption encrypts a data-payload key using a modified ECIES encryption based on a finite group generated from an elliptic curve by generator G by:

generating a number r∈[1, n−1] such that R=rG where R is a point on the elliptic curve;

generating an elliptic-curve point P $P=(P_x,P_y)=r(K_1+K_2+ \ldots +K_m)$ where $K_1, \ldots, K_m$ are public encryption keys;

assigning secret S to $P_x$;

transforming S using a key-derivation function to produce the symmetric-encryption key $k_E$;

encrypting the data payload key $K_{PL}$ to produce the encrypted data payload key $C_{PL}$ using a symmetric encryption method and the symmetric-encryption key $k_E$; and storing the encrypted data-payload key as R concatenated with $C_{PL}$.

17. The attribute-based access-controlled data-storage system of claim 1 further including one or more key-distribution authorities that:

provide long-cycle decryption keys to user systems; and provide short-cycle attribute-associated keys to user systems that allow user systems to decrypt data-payload keys encrypted using attribute-associated encryption.

18. The attribute-based access-controlled data-storage system of claim 17 wherein the data-payloads within data objects stored within the data-store system are not re-encrypted by the data-store system in response to provision of long-cycle decryption keys and short-cycle attribute-associated keys to user systems.

19. The attribute-based access-controlled data-storage system of claim 17 wherein two or more short-cycle attribute-associated keys are distributed by the one or more key-distribution authorities following distribution of a related long-cycle key, each effective short-cycle key related to a particular attribute generated as a modular sum of the latest and all previous short-cycle distributed attribute-associated keys related to the particular attribute distributed following a most recent distribution of the related long-cycle key.

20. The attribute-based access-controlled data-storage system of claim 1 further including one or more certificate authority systems that:

provide owner systems with owner certificates;

provide user systems with attribute certificates that each associates a user system with one or more attributes; and provide writer-user systems with certificates that each associates a writer-user system with one or more attributes.

21. The attribute-based access-controlled data-storage system of claim 1 wherein each data object comprises:

an encrypted data payload;

a descriptor that comprises
  a read access policy,
  a write access policy, and
  one or both of
    a multi-part cryptogram, or a reference to a multi-part cryptogram, that includes an attribute-associated-encrypted read data-payload decryption key, and
    a multi-part cryptogram, or a reference to a multi-part cryptogram, that includes an attribute-associated-encrypted write data-payload encryption key.

22. The attribute-based access-controlled data-storage system of claim 21
wherein the descriptor further includes:
  an owner's signature over the descriptor;
  a writer's signature over the data object;
  an indication of the attribute-associated encryption method used to encrypt one or both of the data-payload decryption key and the data-payload encryption key;
  an indication of the encryption method used to encrypt the data payload;
  a data-object ID; and
  a data-object owner's ID.

23. The attribute-based access-controlled data-storage system of claim 21 wherein the descriptor further includes:
  an indication of a number of encrypted keywords contained in, referenced by, or associated with the descriptor.

24. The attribute-based access-controlled data-storage system of claim 23 further comprising an interface through which a reader user or a writer user submits an encrypted-keyword-based query to the data store, along with a set of one or more attributes, and receives, from the data-store, an indication of one or more data objects accessible to the reader user or a writer user that satisfy the query.

25. The attribute-based access-controlled data-storage system of claim 24 wherein the encrypted keywords cannot be decrypted by the data store.

26. The attribute-based access-controlled data-storage system of claim 24 wherein the encrypted keywords cannot be decrypted by the owner system.

27. The attribute-based access-controlled data-storage system of claim 24
wherein access policies include
  read access policies that specify attributes with which a reader user system is able to decrypt and use a read data-payload key, and
  write access policies that specify attributes with which a writer user system is able to decrypt and use a write data-payload key;
wherein one or more access policies are mapped to one or more nodes of a Hasse diagram, the Hasse diagram initially representing the power set of an entire set of attributes used the one or more access policies, with nodes linked by set inclusion, and the Hasse diagram subsequently pruned to include only those nodes to which the one or more access policies are mapped; and
wherein each node of the pruned Hasse diagram includes a partial encrypted-keyword index, each entry of which identifies one or more data objects accessible from the node that are associated an encrypted keyword represented by the entry.

28. The attribute-based access-controlled data-storage system of claim 23 further comprising an interface through which a reader user or a writer user is provided access to a data object by the data store in response to a request, submitted by the reader user or a writer user to the data store, that includes a keyword-based query and a set of one or more attributes.

* * * * *